(12) United States Patent
Nakajima et al.

(10) Patent No.: US 6,932,271 B2
(45) Date of Patent: Aug. 23, 2005

(54) OPTICAL SCAN MODULE, OPTICAL SCANNER, OPTICAL SCAN METHOD, IMAGE GENERATOR AND IMAGE READER

(75) Inventors: Tomohiro Nakajima, Tokyo (JP); Akihisa Itabashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 255 days.

(21) Appl. No.: 09/769,510

(22) Filed: Jan. 26, 2001

(65) Prior Publication Data

US 2001/0035460 A1 Nov. 1, 2001

(30) Foreign Application Priority Data

| Jan. 27, 2000 | (JP) | ........................................ | 2000-019371 |
| Feb. 18, 2000 | (JP) | ........................................ | 2000-041130 |

(51) Int. Cl.[7] .............................................. G06K 7/10
(52) U.S. Cl. ............. 235/454; 235/462.32; 235/462.45; 235/462.36; 235/462.49
(58) Field of Search .......................... 235/454, 462.32, 235/462.45, 462.36, 462.49; 347/241, 242

(56) References Cited

U.S. PATENT DOCUMENTS

| 5,151,581 A | * | 9/1992 | Krichever et al. ........... 235/454 |
| 5,426,298 A | | 6/1995 | Sakuma et al. |
| 5,475,522 A | | 12/1995 | Itabashi et al. |
| 5,504,613 A | | 4/1996 | Itabashi et al. |
| 5,633,744 A | | 5/1997 | Nakajima |
| 5,648,864 A | | 7/1997 | Itabashi |
| 5,753,907 A | | 5/1998 | Nakajima et al. |
| 5,786,594 A | | 7/1998 | Ito et al. |
| 5,793,408 A | | 8/1998 | Nakajima |
| 5,936,218 A | * | 8/1999 | Ohkawa et al. ......... 235/462.01 |
| 5,936,756 A | | 8/1999 | Nakajima |
| 5,999,345 A | | 12/1999 | Nakajima et al. |
| 6,052,211 A | | 4/2000 | Nakajima |
| 6,069,724 A | | 5/2000 | Hayashi et al. |
| 6,081,386 A | | 6/2000 | Hayashi et al. |
| 6,091,534 A | | 7/2000 | Nakajima |
| 6,104,522 A | | 8/2000 | Hayashi et al. |
| 6,185,026 B1 | | 2/2001 | Hayashi et al. |
| 6,198,562 B1 | | 3/2001 | Hayashi et al. |
| 6,229,638 B1 | | 5/2001 | Sakai et al. |
| 6,260,763 B1 | * | 7/2001 | Svetal .................... 235/462.22 |
| 6,330,020 B1 | * | 12/2001 | Kamioka .................... 347/241 |
| 6,360,949 B1 | * | 3/2002 | Shepard et al. ......... 235/462.43 |
| 6,400,917 B2 | | 6/2002 | Nakazato et al. |
| 6,415,982 B2 | * | 7/2002 | Bridgelall et al. ..... 235/472.01 |
| 6,429,956 B2 | | 8/2002 | Itabashi |
| 6,469,294 B2 | * | 10/2002 | Ohkawa et al. ............. 250/235 |
| 6,469,772 B1 | | 10/2002 | Itabashi |
| 6,621,070 B2 | * | 9/2003 | Ahten et al. ................ 250/234 |

FOREIGN PATENT DOCUMENTS

| JP | 4-96014 | 3/1992 |
| JP | 4-328715 | 11/1992 |
| JP | 6-3613 | 1/1994 |
| JP | 6-255169 | 9/1994 |
| JP | 9-33844 | 2/1997 |
| JP | 9-146129 | 6/1997 |
| JP | 2668725 | 7/1997 |
| JP | 2722630 | 11/1997 |
| JP | 10-68899 | 3/1998 |
| JP | 11-95152 | 4/1999 |
| JP | 11-174355 | 7/1999 |

* cited by examiner

Primary Examiner—Steven S. Paik
(74) Attorney, Agent, or Firm—Oblon, Spivak, McClelland, Maier & Neustadt, P.C.

(57) ABSTRACT

An optical scanning apparatus scans a surface to be scanned in a main scanning direction by simultaneously using a plurality of optical spots formed of a plurality of optical beans emitted from an illuminant, comprising: a light path deflecting part deflecting a light path of at least one of the optical beams, wherein the light path deflecting part is provided in light paths of the optical beams wherein the light path deflecting part may use a liquid crystal deflecting element formed of a liquid crystal element being controllable by an electronic signal to deflect the light path of the one of the optical beams.

77 Claims, 25 Drawing Sheets

1 : OPTICAL SCAN MODULE 101
2 : OPTICAL SCAN MODULE 102
3 : OPTICAL SCAN MODULE 103

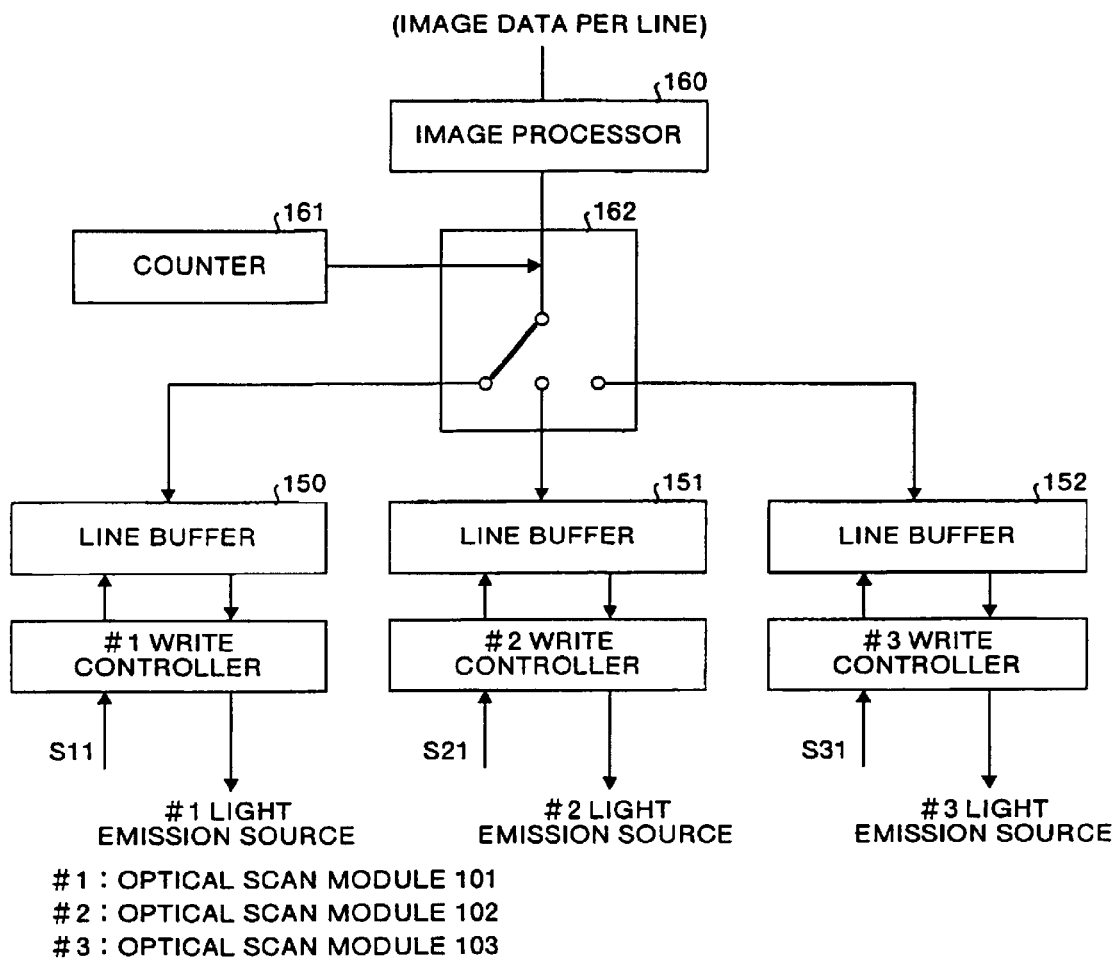
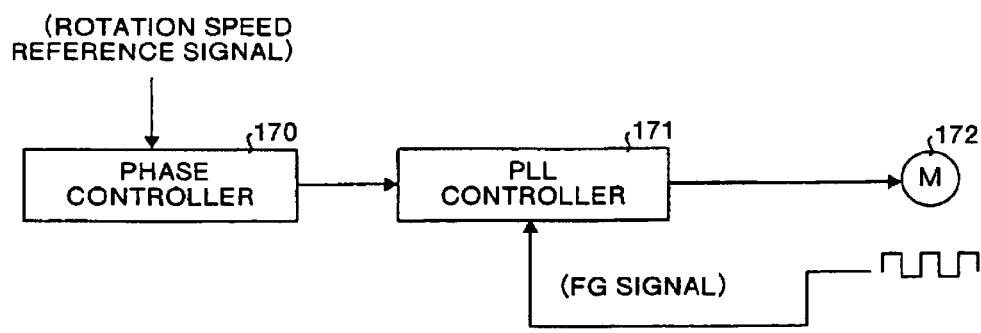

OPTICAL SCAN MODULE, OPTICAL SCANNER, OPTICAL SCAN METHOD, IMAGE GENERATOR AND IMAGE READER

FIELD OF THE INVENTION

The present invention in general relates to an optical scan module, an optical scanner, an optical scan method, an image generator, and an image reader.

BACKGROUND OF THE INVENTION

The following publications disclose the techniques relating to an optical scan unit constituted as a single integral body with a function for deflecting a light beam from a light emission source by a deflection unit to repeat scanning. That is,
a) Japanese Patent Application Laid-Open Publication No. 4-96014,
b) Japanese Patent Application Laid-Open Publication No. 4-328715,
c) Japanese Patent Application Laid-Open Publication No. 6-3613,
d) Japanese Patent Application Laid-Open Publication No. 9-146129,
e) Japanese Patent Publication No. 2668725, and
f) Japanese Patent Publication No. 2722630.
However, these publications have failed to disclose a concept of making a module of a single integral optical scan unit associated with a standard size paper sheet, nor a mounting unit for mounting to another member.

The following publications disclose the techniques relating to an optical scanner having a plurality of optical scan unit arranged in a direction as a single integral body with a function for deflecting a light beam from a light emission source by a deflection unit to repeat scanning. That is,
g) Japanese Patent Application Laid-Open Publication No. 6-255169,
h) Japanese Patent Application Laid-Open Publication No. 10-68899, and
i) Japanese Patent Application Laid-Open Publication No. 11-95152.
However, these publications have failed to disclose a mounting unit for mounting a plurality of optical scan unit to another member. Although an object is proposed to render a joint part of scan lines unobtrusive when a single scan line is divided to be simultaneously scanned with two light beams, it is difficult to grasp as a clear concrete measure for solution.

As a technique to make a joint part of two light beams unobtrusive when a single scan line is divided to be simultaneously scanned with the two light beams, there has been disclosure in Japanese Patent Application Laid-Open Publication No. 11-174355 such that, between an output time of a sensor detection output as a write position detection signal of an image data on a surface to be scanned by a first light beam and an output time of a sensor detection output as a write position detection signal of an image data on a surface to be scanned by a second light beam, a time difference data in terms of a number of faces of a rotary multi-mirror is based on to determine an average, to calculate therefrom a start position of image writing by the second light beam.

Further, the optical scanner has been used since ever as a writing optical system for an electronic photographic image generator such as a digital copier. A conventional electronic photographic image generator using a conventional optical scanner is provided with a photo-sensitive drum which is rotated at a constant speed with a main motor as a drive source. Around the photo-sensitive drum are disposed a charge collotron, the optical scanner, an image developer, a transfer collotron, and a cleaner. The charge collotron has electric charges uniformly charged on a surface of the photo-sensitive drum. The optical scanner irradiate the uniformly charged surface of the photo-sensitive drum with a light beam (laser beam) to form an electrostatic latent image. The image developer gives toner to the electrostatic latent image formed on the surface of the photo-sensitive drum, for image development. The transfer collotron transfers onto a paper sheet a toner image formed on the photo-sensitive drum surface after the image development. The cleaner collects remaining toner on the photo-sensitive drum surface after transfer of the toner image. After cleaning by the cleaner, the photo-sensitive drum surface is again charged by the charge collotron, whereby image formation is can be repeated.

The optical scanner has an optical scan unit (optical scan module) arranged therein. The optical scan unit is made up by an enclosure, and a scanning optical system disposed in the enclosure to perform light-beam generation, modulation, and deflection. A light beam output from the optical scan unit scans a mirror surface of a reflection mirror disposed in the optical scanner. A reflected light beam from the reflection mirror is repeatedly used to scan a surface of a photo-sensitive drum, as described, in parallel to an axial direction of the photo-sensitive drum. The scan direction parallel to the axial direction of the photo-sensitive drum is called a principal scan direction. The direction of movement along the photo-sensitive drum surface is called a subsidiary scan direction. The scanning optical system is constituted with a laser diode, a collimator lens, a first cylinder lens, a polygon mirror, an fθ lens, and a second cylinder lens.

In the electronic photographic image generator having an optical scanner as described, if a vibration of a body of the electronic photographic image generator is transmitted to a scanning optical system of the optical scanner, the scanning optical system of the optical scanner is vibrated, which constitutes a cause of occurrence of a band-like unevenness of image concentration, called banding, to appear in a subsidiary scan direction.

There have been proposed since ever various optical scanners to prevent an unevenness of image concentration due to vibration of a scanning optical system. Among them, an optical scanner described in Japanese Patent Application Laid-Open Publication No. 9-33844 is constituted with a light beam generator for generating a light beam, a light deflector for deflecting the light beam output from the light beam generator, a predetermined vibration-generating component generating a vibration that may have an effect on a path of the light beam, a support plate having a hole portion fitted on a body circumference of the vibration-generating component, a side wall arranged to stand on an edge portion of the support plate, a plurality of ribs configured to be in contact with the support plate and radially disposed from the hole portion toward the side wall at a predetermined level, and an optical box for accommodating at least the light deflector and the vibration-generating component. In this optical scanner, the plurality of ribs configured to be in contact with the support plate and radially disposed from the hole portion toward the side wall at the predetermined level keep the rigidity of the support plate to thereby prevent unevenness of image concentration due to vibration. In conventional optical scanners in which a single scanning optical system is disposed on a support plate, it is possible to prevent unevenness of image concentration due to vibration by keeping the rigidity of the support plate in a described manner.

However, in conventional optical scanners in which a plurality of optical scan modules (optical scan units) are arrayed on a support plate (substrate), as each optical scan module is disposed on or in vicinity of a loop of vibration when the support plate (substrate) vibrates, respective scanning optical systems are vibrated as a whole, with a failure to prevent a degrading of image due to vibration, as a problem.

For example, as shown in FIG. 32, in case an optical scanner has three optical scan modules 1301, 1302, and 1303 arrayed on a substrate 1304 and deflectors (polygon mirrors) of the optical scan modules are disposed on parts a1, b1, and c1 corresponding to loops of a vibration of the substrate 1304 illustrated by a curve 1201, then as shown in FIG. 33, respective scan lines 1305, 1306, and 1307 of the scan modules 1301, 1302, and 1303 are shifted in a subsidiary scan direction, so that joint parts of the scan lines 1305, 1306, and 1307 of the scan modules 1301, 1302, and 1303 are rendered non-connectable, causing a degrading of image, as a problem. The degrading of image due to non-connectable joint parts of the scan lines 1305, 1306, and 1307 of the scan modules 1301, 1302, and 1303 is caused by vibration of the substrate 1304, and appears as a periodical shift in the image to be recognizable by human eyes. Further, also spaces between the scan lines 1305, 1306, and 1307 of the scan modules 1301, 1302, and 1303 are made uneven as shown in FIG. 33, causing uneven concentrations, as a problem.

SUMMARY OF THE INVENTION

It is an object of the present invention to provide an optical scan module that can constitute a high-precision optical scanner with ease in accordance with the need, and to provide an optical scan method and an optical scanner as well as an image generator, an image reader, etc. that can read and write a high-quality image.

It also is an object of the present invention to provide an optical scanner with a plurality of optical scan modules arrayed on a substrate, in which a vibration of a deflector of optical scan module is effectively prevented to thereby prevent an image from being degraded.

The optical scan module according to one aspect of this invention comprises a single integral solid body with a function for deflecting a light beam from a light emission source by a deflection unit to repeat scanning. The optical scan module has an arrangement in which the light emission source, the deflection unit, and terminals connected to a drive circuit for the light emission source or a drive circuit for the deflection unit are integrally fixed to a holder. The holder is formed with an abutment portion to be brought into abutment with another member when mounted to the other member, and the terminals constitute a mounting unit for mounting the holder to the other member.

The optical scan module according to another aspect of this invention comprises a light emission source and a deflection unit which deflects a light beam from the light emission source to repeat scanning. The optical scan module has a holder provided with electrodes for electrical wiring to the light emission source and the deflection unit and configured for holding a movable portion of the deflection unit, and a sealing substrate to be provided together with the holder in a piled relationship. The light emission source and the movable portion of the deflection unit are enveloped to be tight-closed between the holder and the sealing substrate.

The optical scan module according to another aspect of this invention comprises a light emission source and a deflection unit which deflects a light beam from the light emission source to repeat scanning. On an electrode substrate for provision of electrodes connected to the light emission source and the deflection unit and a bearing of the deflection unit, a light source portion substrate applied with the light emission source and a monitor unit which detects a light quantity of light beam from the light emission source and a deflection portion substrate for holding a movable portion of the deflection unit are piled and sealed with a sealing substrate, whereby the light emission source and the movable portion of the deflection unit are enveloped and tight-closed.

The optical scanner according to another aspect of this invention comprises an optical scan module fixed on another member, the optical scan module being constituted as a single integral solid body having a function for deflecting a light beam from a light emission source by a deflection unit to repeat scanning, wherein k optical scan modules as described in any of the above mentioned aspects according to the present invention are arranged to be fixed on a circuit substrate which is constituted as the other member and identical to that formed with the light emission source and the deflection unit.

In the optical scanner according to another aspect of this invention, an identical substrate has arrayed thereon a plurality of optical scan modules constituted with optical systems which have a light emission source and a deflector for deflecting a light beam from the light emission source to repeat a scanning and which are accommodated in an identical holder frame. The deflector is disposed at a position spaced at a predetermined distance from a position where a loop of vibration occurs when the substrate vibrates.

In the optical scanner according to another aspect of this invention, an identical substrate has arrayed thereon a plurality of optical scan modules constituted with optical systems which have a light emission source and a deflector for deflecting a light beam from the light emission source to repeat a scanning and which are accommodated in an identical holder frame. The deflector is disposed at a position where a node of vibration occurs when the substrate vibrates, or in a vicinity of the node.

In the optical scanner according to another aspect of this invention, an identical substrate has arrayed thereon a plurality of optical scan modules constituted with optical systems which have a light emission source and a deflector for deflecting a light beam from the light emission source to repeat a scanning and which are accommodated in an identical holder frame. The optical scan modules are arrayed on the substrate asymmetrically to each other.

In the optical scan method according to another aspect of this invention, on a principal scan direction, a k-th optical scan module has a record width thereof corrected to perform an optical scan, by combination of a variation up to a scan finish end detection relative to a record finish end position by the k-th optical scan module and a variation up to a record start end position relative to a scan start end detection by a (k+1)-th optical scan module.

In the image generator according to another aspect of this invention, a latent image is formed by irradiation of light from an optical writing unit on a uniformly charged photosensitive body and changed to a visible image to be transferred on a record medium to have a recorded image. The optical writing unit is the optical scanner described in any one of the above mentioned aspects according to this invention.

The image reader according to another aspect of this invention comprises a placement unit for a readable text to be placed thereon, a scan unit which scans the text on the placement unit, and a read unit which reads light projected from the scan unit and reflected on the text on the placement unit. The optical scan unit is the optical scanner described in any one of the above mentioned aspects according to this invention.

Other objects and features of this invention will become apparent from the following description with reference to the accompanying drawings.

BRIEF DESCRIPTION OF THE DRAWINGS

FIG. 19 is a descriptive block diagram of an image write signal processing for optical scan modules;

FIG. 20 is a descriptive block diagram of a rotation speed control of deflection unit;

DESCRIPTION OF THE PREFERRED EMBODIMENTS

Preferred embodiments of the present invention are explained below with reference to the accompanying drawings.

The first embodiment relates to the optical scan module according to this invention.

[1-a] First Aspect of the First Embodiment

A first example of the first aspect of the first embodiment will be explained here.

Figure 1:
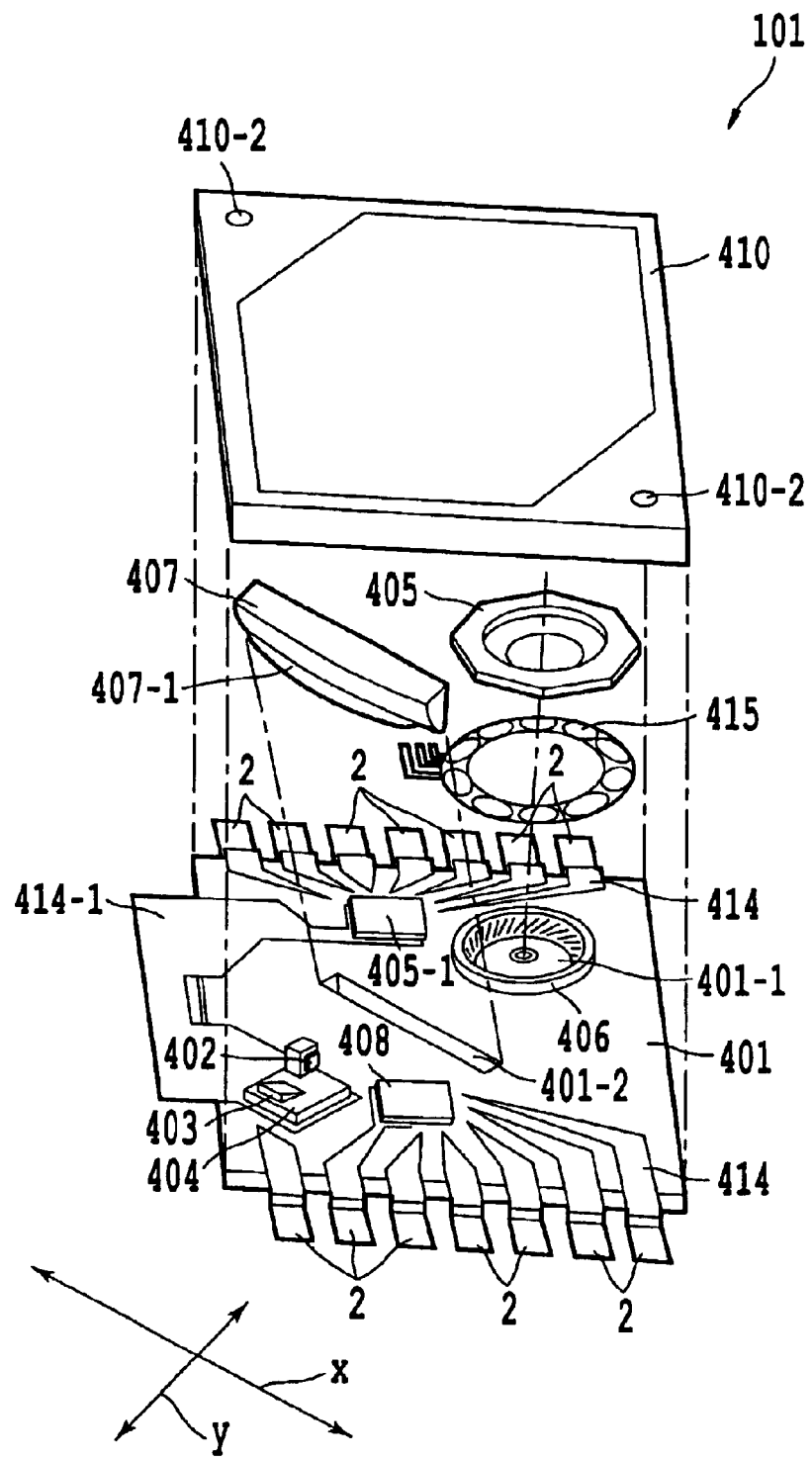
FIG. 1 is an exploded perspective view of an optical scan module.
Figure 2:
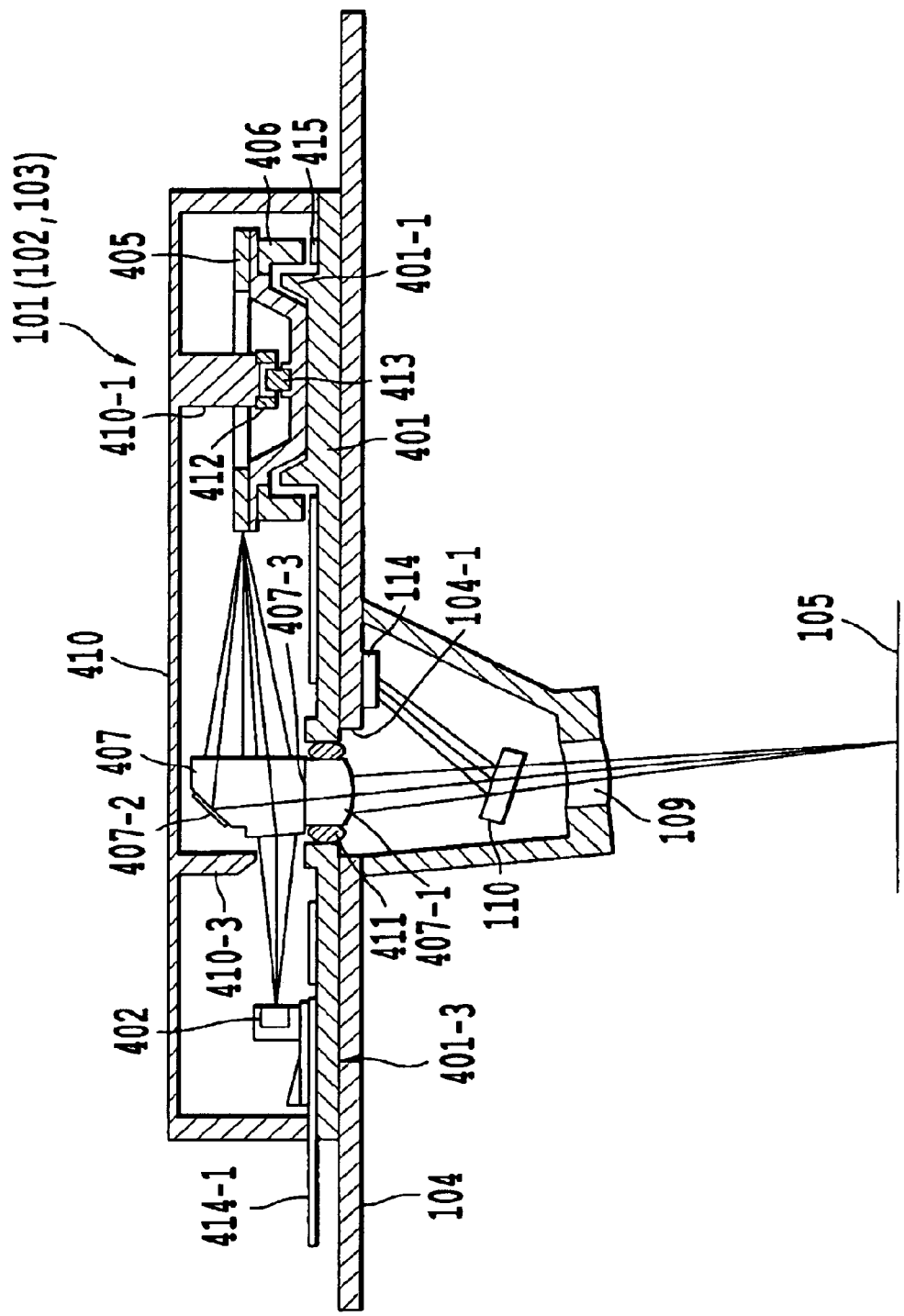
FIG. 2 is a sectional view of an optical scanner with optical scan module.

FIG. 1 shows an exploded state of an optical scan module 101 according to this example, and FIG. 2 shows a section of the optical scan module 101 in an assembled state. In these figures, designated by reference character 401 is a ceramic substrate molded in a rectangular plate form, as an electrode substrate having electrodes such as terminals and as an electrode substrate holding various members.

The electrode substrate 401 has integrally applied thereon an LD (laser diode, as used herein) chip 402 as a light emission source, a photo diode 403 joined to an LD mount 404 for monitoring a light quantity, a drive circuit formed on a bare chip 408 for use to the light emission source, a drive circuit formed on a bare chip 405-1 for use to a deflection unit, and other components such as resistors and capacitors.

The electrode substrate 401 has integrally installed thereon wiring patterns 414 made of lead frames, for electrical connection with the drive circuit formed on the bare chip 408 for light emission source, the drive circuit formed on the bare chip 405-1 for deflection unit, and other components such as resistors and capacitors. Internal wiring is made by a wire bonding or soldering.

The wiring patterns 414 made of lead frames have their ends extending outside the ceramic substrate 401, projecting like legs of a centipede a little outside of edge portions of the electrode substrate 401, such that an L-like bent part forms a flat surface portion at an identical level to a flat bottom surface 401-3 of the electrode substrate 401, constituting a mounting unit 2 for mounting another member to the electrode substrate 401.

The bottom surface of the electrode substrate 401 constitutes an abutment portion 401-3 to an upside of a circuit substrate 104, for contact between flat surfaces with a favorable closeness to achieve stability in mounting.

By provision of the abutment portion 401-3 and mounting unit 2 to the electrode substrate 401, the optical scan module 101 can be mounted with ease to another member. Moreover, the mounting unit 2 as parts of lead frames integral with the electrode substrate 401, are configured as terminals connected to the drive circuit formed on the bare chip 408 for light emission source, the drive circuit formed on the bare chip 405-1 for deflection unit, and the like, and can constitute a mounting unit without providing an extra mounting unit, allowing an extended use of components to achieve a simplified arrangement.

The mounting unit 2 are provided on opposite edges of the electrode substrate 401, with a spatial extent to permit a stable mounting to another member.

Part of lead frame has a heat radiation plate 414-1 projecting outside of an outline of the electrode substrate 401. The heat radiation plate 414-1 is joined to the LD chip 402 which generates much heat, as well as to a polygon motor drive circuit 405-1.

Thereby, at least the LD chip 402 great of heat generation is cooled. Therefore, in spite of heat generation from the LD chip 402, the ceramic substrate 401 is allowed to have a small accommodation space thereon. Moreover, the heat radiation plate 414-1 can be formed as part of a lead frame to thereby provide an optical scan module small in size and good at productivity.

A polygon mirror 405, as deflection unit which deflects a light beam from the LD chip 402 to repeat scanning, is formed by plastically deforming an aluminum plate to have a recessed central part and joining magnets 406 to the circumference, and is installed in a basin-shaped cylindrical portion 401-1 formed on the electrode substrate 401. The magnets 406 are magnetized alternately with S-poles and N-poles along the circumference, and are cooperative for generating electromagnetic forces with a sheet-like lamination coil 415 provided to the cylindrical portion.

The polygon mirror 405 has a rotation shaft thereof held in an attitude, as shown in FIG. 2 as well, by repulsion between magnets 412 and 413 provided on a projection 410-1 projecting downward of a shallow lid-like cap 410 and on a bottom of the recessed central part of the polygon mirror 405, and is rotatably supported in a contact-less manner by a dynamic air pressure bearing constituted with the basin-shaped portion that is formed with spirals (see FIG. 1) of depth of a number of μm for producing air pressures.

A coupling lens 407 shaped in a stripped sheet form is disposed in a position spaced from the LD chip 402 substantially at a distance of principal scan focus, and has a curvature designed so that divergent light flux of a light beam from the LD chip 402 is collected into substantially parallel flux in an x direction that corresponds to the principal scan direction, while, for a y direction that corresponds to the subsidiary scan direction, the flux collection is effected by the polygon mirror 405.

The coupling lens 407 is provided in a window 401-2 formed in the electrode substrate 401 in the x direction corresponding to the principal scan direction, and is fixed by filling an adhesive 411 in gaps therebetween.

As an incident light beam is eccentric relative to the center of a radius of curvature of the coupling lens 407, a projected light beam from the coupling lens 407 is oriented in a kicked-up direction, so that it is reflected by the polygon mirror 405 so as to again strike on the coupling lens 407.

The light beam striking the coupling lens 407 has a larger light flux diameter than the polygon mirror 405 in the x direction corresponding to the principal scan direction, while it is restricted in diameter, when scanned by the polygon mirror 405, in the x direction that corresponds to a principal scan direction of one face of the polygon mirror 405, and for the y direction corresponding to subsidiary scan direction perpendicular to the principal scan direction, it is restricted in diameter, when reflected on an inclined surface 407-2 after having struck on the coupling lens 407, by a width of the inclined surface 407-2.

A light beam thus restricted in diameter of light flux is projected from a projection surface 407-3 as a downside of the coupling lens 407, out of a package enclosed by the cap 410 and the electrode substrate 401, and strikes through a hole 104-1 formed in the circuit substrate 104 to a surface to be scanned. In this example, the coupling lens 407 has stuck on the projection surface 407-3 a first lens 407-1 formed with a non-spherical surface that constitutes part of a scan lens having an fθ characteristic, for cooperation with a second lens (toroidal lens) 109 to have a light beam focused on the surface to be scanned.

In FIG. 2, designated by reference character 410-3 is a partition plate integrally formed on the cap 410 for cutting unnecessary part of a divergent beam from the LD chip 402, to refrain from entering the coupling lens 407.

The electrode substrate 401 is tight-sealed to prevent oxidization of respective devices by adhesion of the cap 401 of a box-shaped resin mold, whereby it is packaged as a complete optical scan module 101.

In this example, an electrode substrate 401 has applied thereon an LD chip 402 as a light emission source and a bare chip 408 provided with a drive circuit for the light emission source. If the LD chip 402 was placed on the ceramic substrate 401 and the bare chip 408 was mounted on a member else than the electrode substrate, there should have been needed wiring for interconnection between the LD chip 402 and the bare chip 408, with a wiring distance to be long with an increased wiring resistance, which would have been unfavorable for driving of the LD that controls a minute current.

Still worse, there should have been needed draw-in wiring for image signal line and power supply line from an external controller to the LD chip 402, besides connection of image signal and power supply lines from the bare chip 408 to the LD chip 402.

In arrangement in which an LD chip 402 and a bare chip 408 are disposed on an electrode substrate 401 like this example, image signal and power supply lines between the bare chip 408 and the LD chip 402 are interconnected through lead frames, and draw-in wiring will be sufficient simply for image signal line and power supply line from an external controller to the LD chip 402.

In other words, for external electrical connection of an optical scan module in which existing lead frames constitute wiring between a light emission source and a drive circuit for the light emission source, simply an external connection for the drive circuit can do well, permitting the number of terminals to be reduced to render the optical scan module compact in size, allowing for a high-precision optical scanner to be constituted with ease in accordance with the need, and for an enhanced productivity to be achieved.

According to this example, an optical scan module 101 is provided with a polygon mirror 405 as a deflection unit, and a coupling lens 407, a first lens 407-1, and the like as a focusing unit, and can make a scan with a constant width depending on their performances. The scan width may be set with a little allowance to a size corresponding to 1/k (where k is a positive integer) of a width of a paper sheet of an arbitrary standard size. Because one side of a standard size has a set length with a regularity, such as an integer fold of k, identical optical scan modules may then be mass-produced for preparation to allow for an adequate number thereof to be combined, thereby permitting an optical scanner to be implemented with ease for adaptation to a scan of a voluntary standard size.

For example, assuming optical scan modules having a scan width of 80 mm that is ⅓ of a 210 mm as one side of an A4 size plus an allowance, three of them can be arrayed to constitute an optical scanner that can scan the 240 mm, permitting the A4 size to be scanned. One optical scan module according to the example can scan an A7 size (74 mm), and two can scan an A5 size (148 mm).

Figure 3:
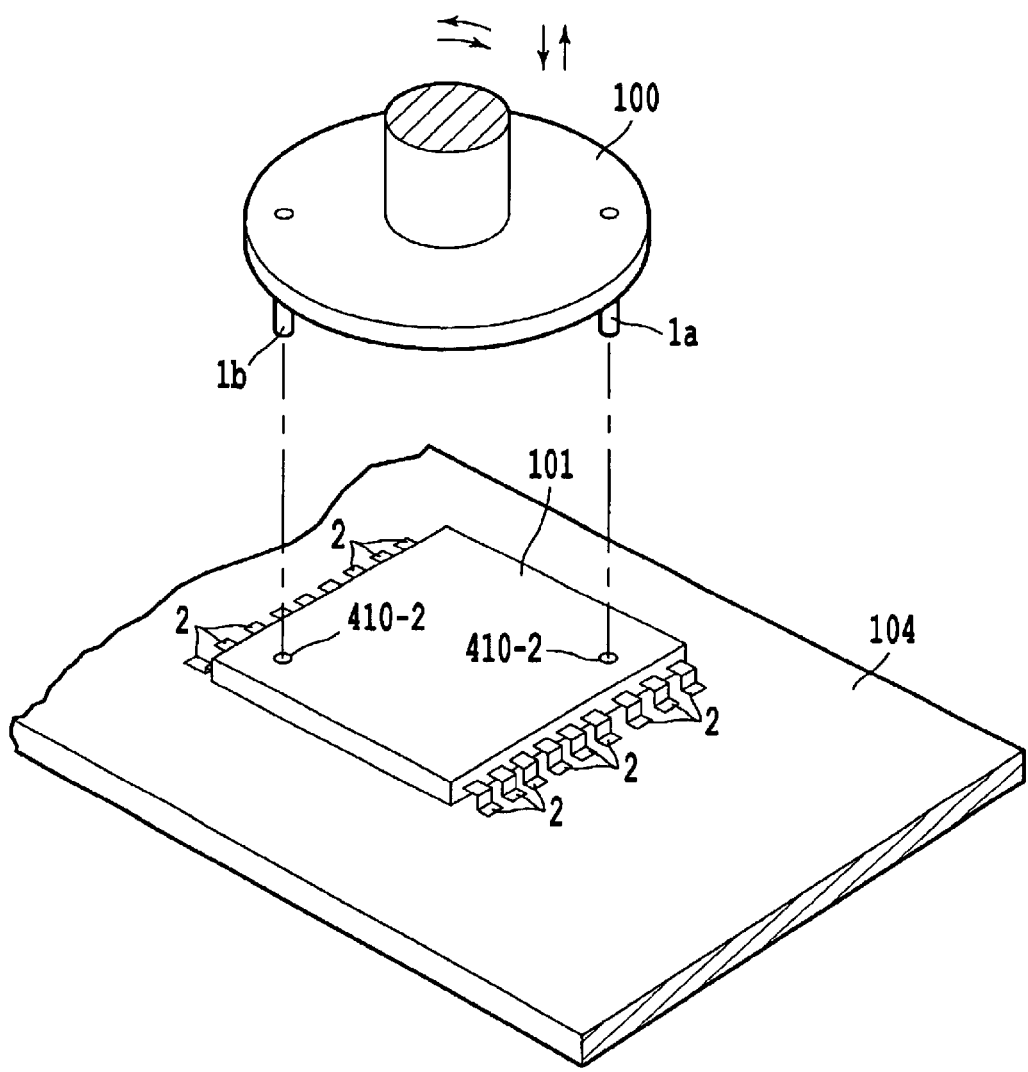
FIG. 3 is a perspective view of optical scan module in application to a circuit substrate by use of an application jig.

As shown in FIG. 1, the optical scan module 101 has two holes 410-1 and 410-2 formed in the cap 410 along the principal scan direction x. As shown in FIG. 3, in an assembly process for positioning the optical scan module 101 on the circuit substrate 104, pins 1 and 1b provided on a hand of an assembly robot are inserted into the holes 410-1 and 410-2, to push the optical scan module 101 onto the circuit substrate 104, while moving for position.

A second example of the first aspect of the first embodiment will be explained here.

In this example, there is disclosed an optical scan module that has an LD chip 402 as a light emission source and a polygon mirror 405 as a deflection unit which deflects a light beam from the light emission source to repeat scanning, as well as an electrode substrate 401 provided with electrodes for electrical wiring to the LD chip 402 and the polygon mirror 405 and configured as a holder for holding a movable portion of the polygon mirror 405, and a cap 410 as a sealing substrate to be provided together with the electrode substrate 401 in a piled relationship, while enclosing and tight-sealing the LD chip 402 and the movable portion of the polygon mirror 405 between the electrode substrate 401 and the cap 410.

It further has an inclined surface 407-2 as a second reflection unit for projecting a light beam deflection-scanned by the polygon mirror 405 in a direction that is not parallel to a lamination surface.

There may be provided a frame substrate for enclosing the movable portion of the polygon mirror 405, to be piled for provision between the electrode substrate 401 and the cap 410, and to have an inclined surface 407-2 integrally formed on the frame substrate. In this example, however, in place of the frame substrate, the cap 410 is used to enclose the movable portion of the polygon mirror 405, and the inclined surface 407-2n is integrally provided with a coupling lens 407 (focusing unit) interposed between the LD chip 402 and the polygon mirror 405.

By integration of the second reflection unit with the focusing unit, a focus system is simplified in arrangement, and because of the prefabrication by integration, also the accuracy of optical disposition is allowed to have a high precision in comparison with the case of mounting by individual positioning.

The cap 410 may be integrally provided part of a first lens 407-1 as a scan lens for focusing a light beam deflection-scanned by the polygon mirror 405. In this example, however, it is provided on the electrode substrate 401, and part of the first lens 407-1 is integrally provided on the coupling lens 407 (focusing unit).

By integration of the scan lens with the focusing unit, the focus system is simplified in arrangement, and because of the prefabrication by integration, also the accuracy of optical disposition is allowed to have a high precision in comparison with the case of mounting by individual positioning.

A third example of the first aspect of the first embodiment will be explained here.

Figure 4:
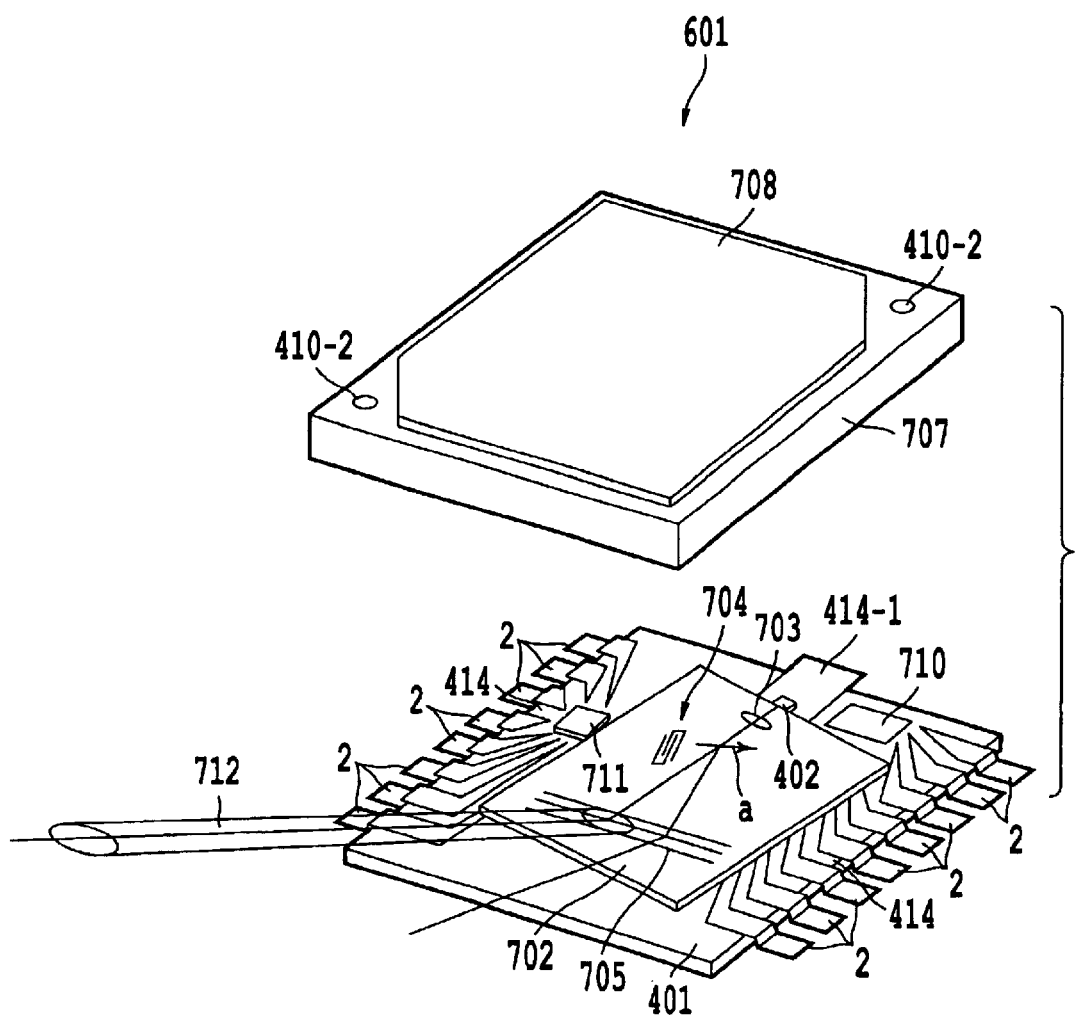
FIG. 4 is an exploded perspective view of an optical scan module.

FIG. 4 illustrates an optical scan module according to this example. In FIG. 4, an entirety of the optical scan module is designated by reference character 601, while functionally like members to FIG. 1 and FIG. 2 are designated by like reference characters.

In FIG. 4, an electrode substrate 401 has installed thereon wiring patterns 414 made of lead frames, and has applied an LD chip 402 and an optical wave guide path 702. The LD chip 402 is disposed on a heat radiation plate 414-1. The heat radiation plate 414-1 projects outside of an outline of the ceramic substrate 401, and is joined to the LD chip 402.

Thereby, the LD chip 402 great of heat generation is cooled. Therefore, in spite of heat generation from the LD chip 402, the electrode substrate 401 is allowed to have a small accommodation space thereon. Moreover, the heat radiation plate 414-1 can be formed as part of a lead frame to thereby provide an optical scan module small in size and good at productivity.

A light beam projected from the LD chip 402 is enclosed within the optical wave guide path 702 formed with a thin film of depth of a number of $\mu$m, and is transmitted as substantially parallel light flux in a direction corresponding to a principal scan direction, by forming on the optical wave path 702 a mode index lens portion 703 as a focusing unit having continuously varied refractive indices.

The transmitted light has a surface elastic wave excited to occur by a comb electrode 704 constituting a transducer formed on the optical wave guide path 702, with a light path flexed to be scanned in a direction of arrow a in dependence on the frequency.

The scanned transmitted light is projected through a projection grating 705 with a predetermined focusing property at a predetermined upwardly oblique angle in a direction (transmission direction) corresponding to a subsidiary scan direction. In this example, a light beams 712 is projected from a window 708 formed in a cap 707. In the figure, designated by reference character 710 is a bare chip formed with a drive circuit for the light emission source, and 711 is a bare chip formed with a drive circuit for a transducer as a deflection unit.

In this example also, the electrode substrate 401 has fixed thereto an LD chip 402 as a light emission source, a bare chip 710 as a drive circuit for light emission source and a comb electrode 704 as a deflection unit, a bare chip 711 as a drive circuit for deflection unit, and the like. Wiring patterns 414 made of lead frames have their ends extending outside the electrode substrate 401, projecting like legs of a centipede a little outside of edge portions of the electrode substrate 401, such that an L-like bent part forms a flat surface portion at an identical level to a flat bottom surface 401-3 (same as FIG. 2) of the electrode substrate 401, constituting a mounting unit 2 for mounting another member to the electrode substrate 401.

The electrode substrate 401 is tight-sealed to prevent oxidization of respective devices by adhesion of the cap 707 of a box-shaped resin mold, whereby it is packaged as a complete optical scan module 601.

In this example also, by provision of an abutment portion 401-3 and mounting unit 2 to the electrode substrate 401, the optical scan module 601 can be mounted with ease to another member. Moreover, the mounting unit 2 as parts of lead frames integral with the electrode substrate 401, are configured as terminals connected to the drive circuit formed on the bare chip 710 for light emission source, the drive circuit formed on the bare chip 711 for deflection unit, and the like, and can constitute a mounting unit without providing an extra mounting unit, allowing an extended use of components to achieve a simplified arrangement.

The mounting unit 2 are provided on opposite edges of the electrode substrate 401, with a spatial extent to permit a stable mounting to another member.

The heat radiation plate 414-1 projects outside of an outline of the electrode substrate 401, and is joined to the LD chip 402. Thereby, the LD chip 402 great of heat generation is cooled. Therefore, in spite of heat generation from the LD chip 402, the ceramic substrate 401 is allowed to have a small accommodation space thereon. Moreover, the heat radiation plate 414-1 can be formed as part of a lead frame to thereby provide an optical scan module small in size and good at productivity.

In arrangement in which an LD chip 402 and a drive circuit for a light emission source are formed on an electrode substrate 401 like this example, for external electrical connection of an optical scan module in which existing lead frames constitute wiring between the light emission source and the drive circuit for the light emission source, simply an external connection for the drive circuit can do well, permitting the number of terminals to be reduced to render the optical scan module compact in size, allowing for a high-precision optical scanner to be constituted with ease in accordance with the need, and for an enhanced productivity to be achieved, like the first example.

Further, identical optical scan modules may be mass-produced for preparation to allow for an adequate number thereof to be combined, thereby permitting an optical scanner to be implemented with ease for adaptation to a scan of a voluntary standard size.

[1-b] Second Aspect of the First Embodiment

Figure 5:
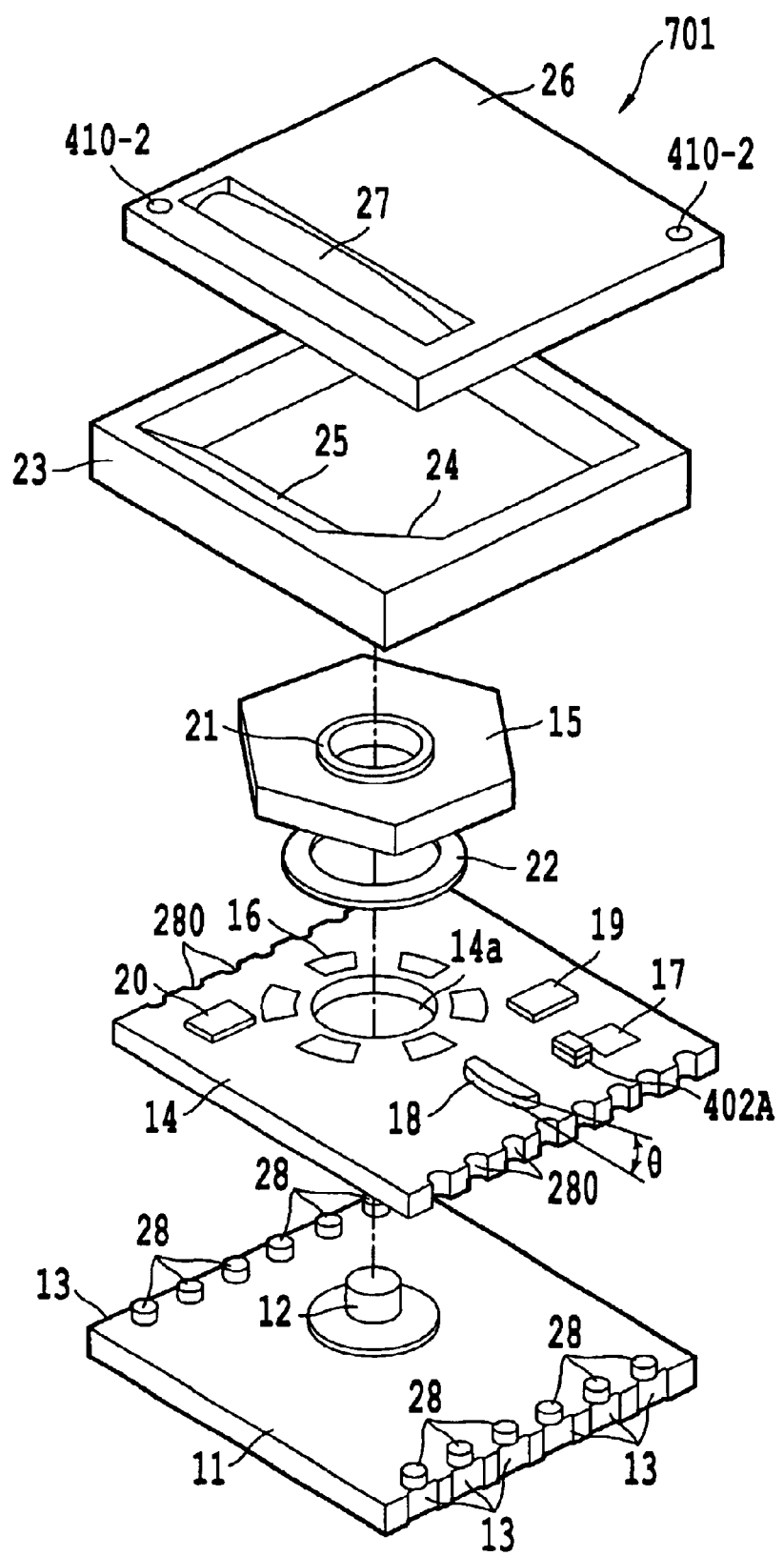
FIG. 5 is an exploded perspective view of an optical scan module.

FIG. 5 shows an exploded state of an optical scan module 701 according to the second aspect of the first embodiment. In FIG. 5, an electrode substrate 11 ceramic-molded in a rectangular plate form has integrally formed thereon a rotation shaft 12 of a polygon mirror 15 and terminals 13.

On the electrode substrate 11 is piled a silicon substrate 14 of a rectangular plate form, which is integrated with the electrode substrate 11 to constitute an electrode substrate. The silicon substrate 14 is formed with unshown electrodes and wiring patterns by vacuum deposition of metallic coating films and connected to unshown lead terminals at the edges by wire bonding or the like.

When the silicon substrate 14 is piled on the electrode substrate 11, the rotation shaft 12 protrudes from a hole 14a formed in the silicon substrate 14. Also a coil part 16 for driving a polygon motor as a drive source of the polygon mirror 15 is formed in a volute pattern as part of wiring pattern on the silicon substrate 14, while in this the second aspect of the first embodiment the volute pattern is formed as combination of three layers shifted in phase in a direction of rotation, with interposed insulation layers such as nitride layers, for application of currents different of phase to thereby drive the polygon mirror 15.

The LD chip as a light emission source may be provided on the silicon substrate 14 by direct deposition of an ALGaAs layer using an epitaxial technique to form a clad layer and an active layer that constitute a semiconductor laser. In this the second aspect of the first embodiment, however, a separate semiconductor laser array chip fabricated with a plurality of light emission sources is applied as an LD chip 402A, with an interposed sub mount, so that the light emission sources are arrayed in parallel on an application surface. On the other hand, a photo diode 17 for monitoring to detect back light of the LD chip 402A is formed on the silicon substrate by direct deposition of a GaAs layer. Therefore, in this the second aspect of the first embodiment, the silicon substrate 14 constitutes a light emission source substrate.

A coupling lens 18 is formed by direct deposition such as of a polyimide film or SiO2 film, whereas in this the second aspect of the first embodiment, for a light flux diameter of 0.5 mm to be secured and to avoid a bad production efficiency, it is separately fabricated and applied on the silicon substrate 14. This coupling lens 18 is made of a dielectric substance such as a quartz, with a refractivity distribution in a perpendicular direction to the application surface, in a stripped sheet form of a 0.5 mm height diced into a non-spherical configuration in a parallel direction thereto, thereby constituting an anamorphic lens with different focus distances in the respective directions.

The LD chip 402A has two light emission sources formed with a 100 $\mu$m spacing, and by providing a center position of the refractivity distribution of the coupling lens 18 with an inclination angle $\theta$ relative to the application surface, the two light emission sources are allowed to have their projection directions different from each other, so that on a scanned surface their beam spots are arrayed at predetermined intervals in a perpendicular direction (subsidiary scan direction) to the application surface, thereby constituting two lines to be simultaneously scanned. The number of light emission sources on the semiconductor laser may be other than two to obtain like effects, for example it may be 1.

Light flux of a projected beam from the coupling lens 18 is collected, by layout, to be parallel in a direction corresponding to a principal scan direction (at the parallel side to the lamination surface), and to be once focused in a vicinity of a reflection surface of the polygon mirror 15 in a direction corresponding to a subsidiary scan direction.

In FIG. 5, a drive circuit 19 for light emission source is for control of current supply to the LD chip 402A, and a drive circuit 20 for deflection unit is for control of current supply to the coil part 16 which drives the polygon mirror 15. They are directly formed on the silicon substrate 14.

The polygon mirror 15 is formed by pressing an aluminum plate, with respective side surfaces mirror-processed, and has a sleeve 21 inserted to be fixed in a central hole. At a downside of the polygon mirror 15, a plate-like magnet 22 is joined thereto in opposition to the coil part 16, and the rotation shaft 12, which is formed by an integral ceramic molding to protrude over the silicon substrate 14 through the hole 14a, is supported by engagement with the sleeve 21 with a clearance of few $\mu$m or near to allow rotation. The sleeve 21 may be provided with internal Herring born grooves to thereby constitute a dynamic air pressure bearing.

A frame substrate 23 to be piled for fixation on the silicon substrate 14 is configured in a frame form, with a first reflection unit 24 constituted as a mirror surface for guiding a light beam from the LD chip 402A to the polygon mirror 15, and a second reflection unit 25 constituted as a mirror surface for projecting a deflection-scanned light beam from the polygon mirror 15 in a direction that is not parallel to the lamination surface of the semiconductor laser, with a space secured for rotation of the polygon mirror 15. In this the second aspect of the first embodiment, for the frame substrate 23 also, a single crystalline Si substrate is used, and by an anisotropic etching thereto, respective mirror surfaces of the first reflection unit and the second reflection unit 25 are formed.

By integral formation of the first reflection unit 24 on the frame substrate 23, it is allowed to have a precision of projection direction to be secured by a simple layer-like piling without troublesome positioning, thus permitting a simplified fabrication process with an enhanced production efficiency.

By provision of the second reflection unit 25 constituted as a mirror surface for projecting a deflection-scanned light beam from the polygon mirror 15 in a direction that is not parallel to the lamination surface of the semiconductor laser, it is allowed, when soldering the terminals 13 of the optical scan module 601 for fixation to the application surface, to adjust scan line inclinations and scan positions on a scanned surface with ease by adjusting the application angle and position on the application surface, with eliminated needs such as screw fastening, thus permitting a simplified fabrication process with an enhanced production efficiency.

A sealing plate 26 to be put for integration onto the frame substrate 23 is made of a transparent material, and adapted at a projection window 27 thereof to have a function of a lens constituting part of a scan lens for focusing a light beam on a surface to be scanned, for example, a function for correction of plane inclination.

In this the second aspect of the first embodiment, the projection window 27 is formed as an opening part of a non-spherical shape by a photolithography with varied concentrations on the surface of a glass substrate. It may however be a diffraction lattice or refractivity-distributed lens, or may have simply a lens part stuck together. No lens function may be given, as a matter of course. In the case a lens function is given, there can be secured a precision of disposition between a scan lens and a limit emission source and a deflection unit, simply by a piling into lamination without troublesome positioning, thus permitting a simplified fabrication process with an enhanced production efficiency.

The electrode substrate 11, silicon substrate 14, frame substrate 23, and sealing plate 27 are laminated in order and integrally joined together to constitute the optical scan module 701, having LD chip 402A, polygon mirror 15 and their accessory members tight-sealed for accommodation. The accommodation space may have gases such as nitrogen sealed in to prevent oxidization, or may have a reduced air pressure relative to the ambient atmosphere to reduce effects of air resistance.

In the above arrangement, the terminals 13 are connected shaft-like conductors 28, and the conductors 28 are fitted in recesses 280 formed in side parts of the silicon substrate 14, with an insulation material in between, and connected at their distal ends to lead terminals located upside of edges of the silicon substrate 14. Circuits on upside of the silicon substrate 14 have connections, such as to the drive circuit 19 for light emission source or the drive circuit 20 for deflection unit. Thus, the terminals 13 are electrically connected via the conductors 28 to the lead terminals of the silicon substrate 14, with extensions such as to the drive circuit 19 for light emission source or the drive circuit 20 for deflection unit.

Between the electrode substrate 11 and the sealing plate 26, there are enclosed various elements to be sealed in, such as movable parts of the rotation shaft 12 and the polygon mirror 15, as well as the drive circuit 19 for light emission source and the drive circuit 20 for deflection unit. In particular, in this the second aspect of the first embodiment, the movable parts are tight-sealed for a enhanced security, while using terminals 13 and conductors 28 provided on the electrode substrate 11 and lead terminals provided on the ceramic substrate 14 for facilitated electrical interconnections between the tight-sealed portion and the outside.

The terminals 13 are exposed at side parts of the electrode substrate 11, for concurrent use as mounting unit to other members. The terminals as mounting unit can be used for mounting the optical scan module 701 with ease to other members. The terminals 13 provided, as shown in FIG. 5, on opposite edges of the electrode substrate 11, with a spatial extent for stable mounting to other members.

Though not shown in FIG. 5, there may be provided a heat radiation plate similar to the heat radiation plate 414-1 of FIG. 1, projecting outside an outline of the electrode substrate 11, to be joined to the LD chip 402A. Thereby, the LD chip 402A great of heat generation may be cooled, to make smaller the accommodation space of the electrode substrate 11. The heat radiation plate may be formed as part of a lead frame to thereby provide an optical scan module small in size and good at productivity.

In arrangement in which an LD chip 402A and a drive circuit 19 for light emission source are disposed on a silicon substrate 14 like this the second aspect of the first embodiment, for external electrical connection of an optical scan module in which existing lead frames constitute wiring between a light emission source and a drive circuit for the light emission source, simply an external connection for the drive circuit can do well, permitting, like the first aspect of the first embodiment, the number of terminals to be reduced to render the optical scan module compact in size, allowing for a high-precision optical scanner to be constituted with ease in accordance with the need, and for an enhanced productivity to be achieved.

Identical optical scan modules may be mass-produced for preparation to allow for an adequate number thereof to be combined, thereby permitting an optical scanner to be implemented with ease for adaptation to a scan of a voluntary standard size.

In this aspect, the LD chip 402A as a light emission source and the photo diode 17 as a monitor unit which detects a light quantity of a light beam from the light emission source are applied on the silicon substrate 14 as a light emission part substrate, which is piled between the electrode substrate 11 as a holder and the sealing plate 26.

Because the silicon substrate 14 is piled on the electrode substrate 11, the conductors 28 can serve for electrical wiring between the electrode substrate 11 and the silicon substrate 14. Moreover, because the piled silicon substrate 14 on the electrode substrate 11 is integrated thereto, there is secured with ease a precision of disposition between the silicon substrate 14 on which the LD chip 402A with an integrated light emission source is mounted and the electrode substrate 11 on which the polygon mirror 15 is mounted, thus permitting a simplified fabrication process with an enhanced production efficiency.

[1-c] Third Aspect of the First Embodiment

A first example of the third aspect of the first embodiment will be explained here.

Figure 6:
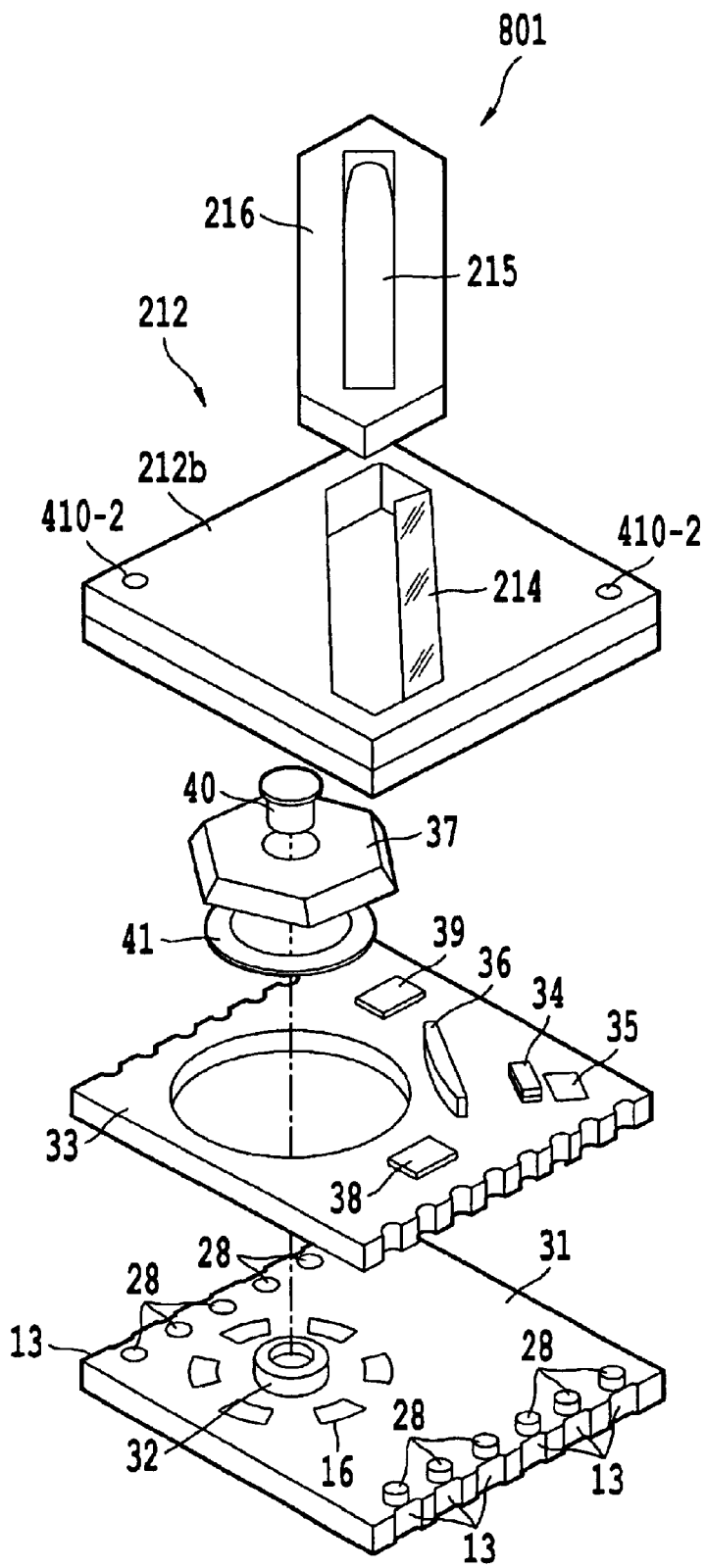
FIG. 6 is an exploded perspective view of an optical scan module.
Figure 7:
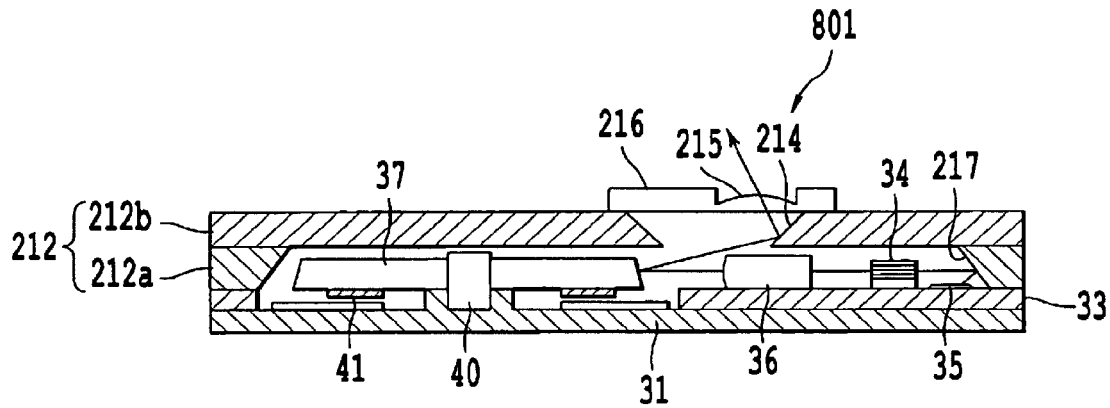
FIG. 7 is a sectional view of optical scan module.

FIG. 6 shows an exploded state of an optical scan module 801 according to this example, and FIG. 7 shows a section of the optical scan module 801 in an assembled state. In FIG. 6 and FIG. 7, an electrode substrate 31 ceramic-molded in a rectangular plate form has integrally formed thereon a rotation shaft 32 of a polygon mirror 37, terminals 13, conductors 28, etc.

On the electrode substrate 31 as a holder is formed, by trimming a metallic coating film, a coil part 16 for driving a polygon motor, as a combination of three layered patterns like the second aspect of the first embodiment explained with reference to FIG. 5. On a silicon substrate 33 as a light emission part substrate to be piled on the electrode substrate 31 are formed unshown wiring patterns, and for connections thereto such as by a wire bonding, there are applied an LD chip 34 as a light emission source, a photo diode 35 for monitoring back light of a semiconductor laser (LD), and the like. A coupling lens 36 is made of a dielectric substance, like the second aspect of the first embodiment, with a refractivity distribution in a perpendicular direction to the application surface, in a stripped sheet form diced into a non-spherical configuration in a parallel direction thereto, thereby constituting an anamorphic lens with different focus distances in the respective directions. Light flux of a projected beam from the coupling lens 18 is adjusted by layout to have a larger diameter than the area of a single face of the polygon mirror 37, and simply a reflected fraction of incident light flux to the polygon mirror 37 is scanned.

In FIG. 6, a drive circuit 38 for light emission source is for control of current supply to the LD chip 34, and a drive circuit 39 for deflection unit is for control of current supply to the coil part 16 which drives the polygon mirror 37. They are directly formed on the silicon substrate 33. Those control circuits may be applied as bare chips on the electrode substrate 31.

The polygon mirror 37 is formed by pressing an aluminum plate, with respective side surfaces mirror-processed, and has a shaft 40 inserted to be fixed in a central hole. At a downside of the polygon mirror 37, a plate-like magnet 41 is joined thereto in opposition to the coil part 16, and the shaft 40 projecting at the rear side is supported by a bearing 32.

A frame 212 to be piled on the silicon substrate 33 is made by joining two plates. A first frame 212a as a lower layer is formed with a first reflection unit 217 constituted as a mirror surface for making back light of the semiconductor laser of the LD chip 34 strike on the photo diode 35, and is configured to constitute a deflection part substrate for enclosing and holding the movable part of the polygon mirror 37, securing a space.

A second frame 212b as an upper layer is formed, like the second aspect of the first embodiment, by using a single crystalline Si substrate and an anisotropic etching thereto, with a second reflection unit 214 constituted as a mirror surface for projecting a deflection-scanned and kicked-up light beam from the polygon mirror in a direction (leftwardly upward oblique direction in FIG. 7) that is not parallel to the lamination surface of the semiconductor laser of the LD chip 34. A sealing plate 216 is made of a transparent material, and adapted at a projection window 215 thereof to have a function of a lens constituting part of a scan lens for focusing a light beam on a surface to be scanned. The projection window 215 concurrently serves as a scan lens for focusing a deflection-scanned light beam from the polygon mirror, on a surface to be scanned.

The light beam from the second reflection unit 214 is projected out of the projection window 215, toward the surface to be scanned. The electrode substrate 31, silicon substrate 33, frame 212, and sealing plate 216 are laminated in order and joined together to constitute the optical scan module 801.

In this example, the silicon substrate 33 as a light emission source part substrate is piled on the electrode substrate 31, thereby allowing a vertically overlapping disposition of a light emission source and a deflection unit, permitting the apparatus to be compact in size.

The silicon substrate 33 as a light emission source part substrate and the first frame 212a as a deflection part substrate are piled on the electrode substrate 31, and sealed by the sealing substrate 216, whereby the LD chip 34 as a light emission source and the polygon mirror 37 are enclosed and tight-sealed, with an enhanced security and facilitated electrical connection.

The first frame 212a, which is integrally formed with the first reflection unit 217 for guiding a light beam from the LD chip 34 to the polygon mirror 37, is provided in a piling relationship between the electrode substrate 31 and the sealing substrate 216, whereby, in a vertical piling disposition of LD chip 34 and polygon mirror 37, the transmission of light beam can be set simply by way of lamination, without troublesome positioning, thus permitting the production process to be simplified, with an enhanced production efficiency.

The polygon mirror 37 to be rotated is constituted with a movable part, and the first frame 212a that accommodates the movable part is piled to be interposed between the electrode substrate 31 and the sealing substrate 216, while the first frame 212a is integrally formed with the first reflection unit 217, whereby it is allowed to have a precision of projection direction to be secured by a simple layer-like piling without troublesome positioning, thus permitting a simplified fabrication process with an enhanced production efficiency.

By provision of the second reflection unit 214 for projecting a deflection-scanned light beam from the polygon mirror 37 in a direction that is not parallel to the lamination surface of the semiconductor laser, it is allowed, when soldering the terminals 13 of the optical scan module 801 for fixation to the application surface, to adjust scan line inclinations and scan positions on a scanned surface with ease by adjusting the application angle and position on the application surface, with eliminated needs such as screw fastening, thus permitting a simplified fabrication process with an enhanced production efficiency.

The projection window 215 integrated to or integrally provided with the sealing substrate 216 concurrently serves as a scan lens for focusing a deflection-scanned light beam from the polygon mirror 37 on a surface to be scanned, thus allowing common use of the parts, as well as for the LD chip 34 as a light emission source and the polygon mirror 37 as a deflection unit to have a precision of disposition secured by a simple layer-like piling without troublesome positioning, permitting a simplified fabrication process with an enhanced production efficiency.

Though not shown in FIG. 6, there may be provided a heat radiation plate similar to the heat radiation plate 414-1 of FIG. 1, projecting outside an outline of the electrode substrate 11, to be joined to the LD chip 34. Thereby, the LD chip 34 great of heat generation may be cooled, to make smaller the accommodation space of the silicon substrate 33. The heat radiation plate may be formed as part of a lead frame to thereby provide an optical scan module small in size and good at productivity.

In arrangement in which an LD chip 34 and a drive circuit 38 for light emission source are disposed on a silicon substrate 33 like this example, for external electrical connection of an optical scan module in which existing lead frames constitute wiring between a light emission source and a drive circuit for the light emission source, simply an external connection for the drive circuit can do well, permitting, like the first aspect of the first embodiment, the number of terminals to be reduced to render the optical scan module compact in size, allowing for a high-precision optical scanner to be constituted with ease in accordance with the need, and for an enhanced productivity to be achieved.

Identical optical scan modules to this example may be mass-produced for preparation to allow for an adequate number thereof to be combined, thereby permitting an optical scanner to be implemented with ease for adaptation to a scan of a voluntary standard size.

In this example, the LD chip 34 as a light emission source and the photo diode 35 as a monitor unit which detects a light quantity of a light beam from the light emission source are applied on the silicon substrate 33 as a light emission part substrate, which is piled between the electrode substrate 31 as a holder and the sealing plate 216.

Because the silicon substrate 33 is piled on the electrode substrate 31, the conductors 28 can serve for electrical wiring between the electrode substrate 31 and the silicon substrate 33. Moreover, because the piled silicon substrate 33 on the electrode substrate 31 is integrated thereto, there is secured with ease a precision of disposition between the silicon substrate 33 on which the LD chip 34 with an integrated light emission source is mounted and the electrode substrate 31 on which the polygon mirror 37 is mounted, thus permitting a simplified fabrication process with an enhanced production efficiency.

A second example of the third aspect of the first embodiment will be explained here.

Figure 9:
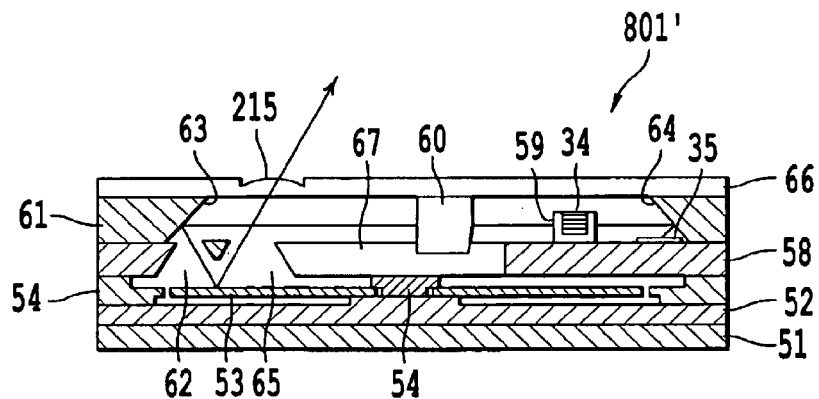
FIG. 9 is a sectional view of optical scan module.
Figure 8:
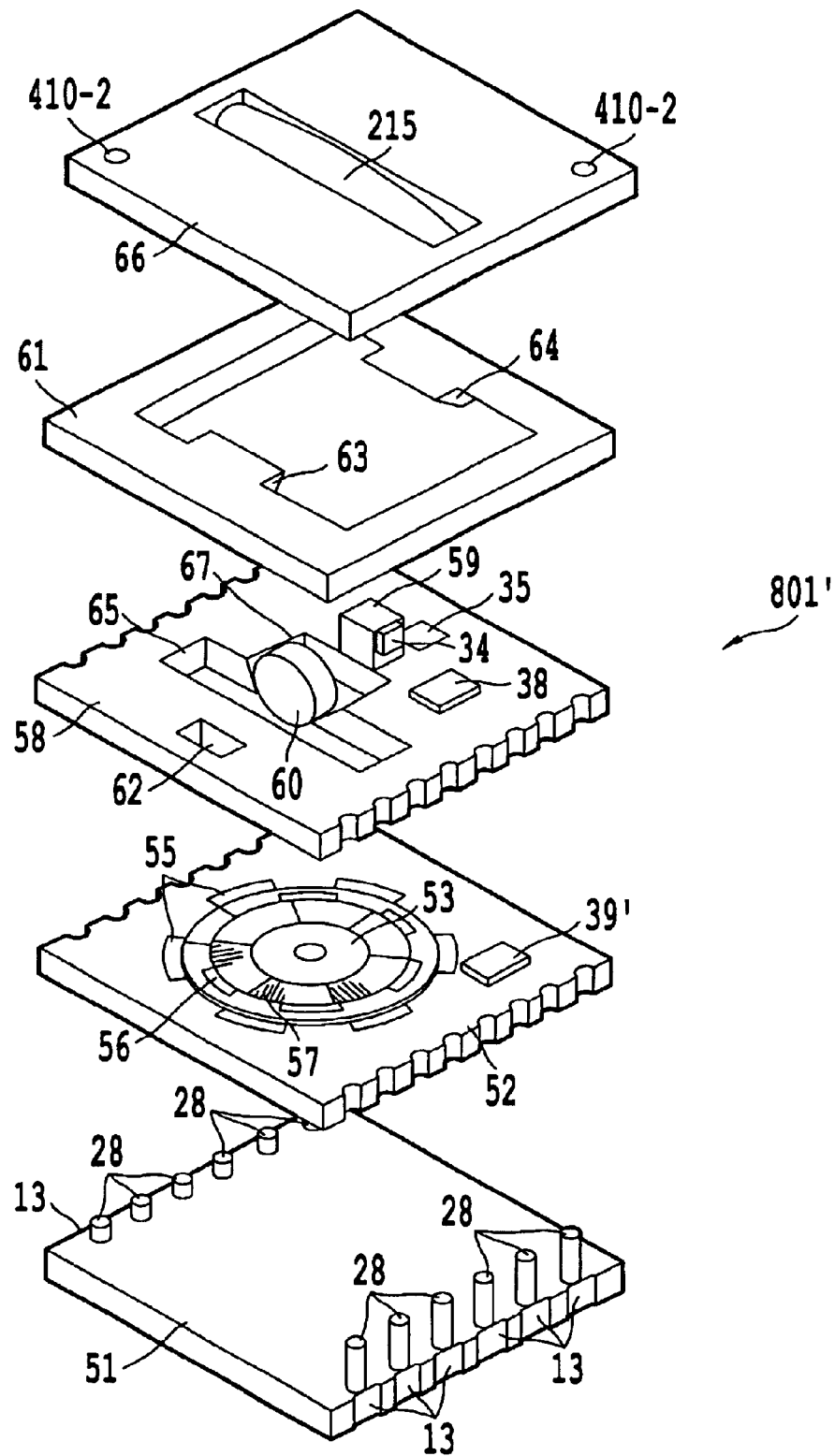
FIG. 8 is an exploded perspective view of an optical scan module.

This example is a modification of the first example of the third aspect of the first embodiment. FIG. 8 shows an exploded state of an optical scan module 801' according to this example, and FIG. 9 shows a section of the optical scan module 801' in an assembled state. In FIG. 8 and FIG. 9, those members functionally like to members in FIG. 5 to FIG. 7 are designated by like reference characters.

An electrode substrate 51 ceramic-molded in a rectangular plate form has thereon conductors 28 and terminals 13. On a first silicon substrate 52 integrally piled on the electrode substrate 51, there is a bearing part integrally formed thereon, as shown in FIG. 9, by a process in which from a polycrystalline Si layer deposited on the electrode substrate 51 a deflection disc 53 as a deflection unit is cut out by an etching, to be separated from a stator part, and thereafter, simply on a clearance part of bearing, an oxidized film is formed, and further polycrystalline Si is deposited, thereby forming a shaft part 54.

On the stator part 54 is evaporated a metallic coating film, to have a plurality of electrodes 55 radially formed thereon to constitute a stator, and in correspondence thereto, also on a circumference of the deflection disc 53, there are formed electrodes 56. For the driving to be effected by electrostatic forces, current application to the stator is sequentially switched.

The deflection disc 53 has circumferentially oriented undulations formed by the etching to constitute a diffraction lattice 57, which is coated by the metallic coating film at the same time. An incident light beam is scanned in dependence on an angle of the lattice, at a reflection angle of approx. 1.5 folds thereof, as the lattice angle varies with rotation of the deflection disc 53. A surface of the diffraction lattice 57 is circumferentially split into a plurality of regions, and in this example, one rotation gives a scan of six faces.

On a second silicon substrate 58 to be piled for fixation on the first silicon substrate 52 are formed unshown wiring patterns by evaporation of metallic coating films, for connections such as to the conductors 28 or by a wire bonding. As an LD chip 34 to be provided on the second silicon substrate 58, like the previous example, there is used a semiconductor laser array chip having a plurality of separately fabricated light emission sources, which is mounted by a sub-mount 59 so that the light emission sources are arrayed perpendicular to the application surface.

A photo diode 35 for monitoring back light of the semiconductor laser is directly formed on the second silicon substrate 58. A coupling lens 60 is constituted as an anamorphic lens of a cylindrical form different of curvature between a parallel direction and a perpendicular direction to the application surface, and is installed in a V-groove 67 formed in the silicon substrate, with the circumference in partial abutment thereon. The V-groove is formed so that a central axis of the coupling lens coincide with a radiation center of the semiconductor laser.

The semiconductor laser in the LD chip 34 has two light emission sources formed at an interval of 14 μm. On a scanned surface, respective beam spots are arrayed at a predetermined interval in a perpendicular direction (subsidiary scan direction) to the application surface, for simultaneous scan of two lines.

Like the previous example, by layout, a light beam projected from the coupling lens 60 is focused in a vicinity of a deflection surface in a direction corresponding to the subsidiary scan direction, and deviations of optical axis such as by vibration of the disc are corrected on the surface to be scanned.

A frame 61 to be piled for fixation on the second silicon substrate 58 is formed with a reflective part 63 for guiding a light beam projected from the coupling lens 60 to the deflection disc 53 via an aperture 62 formed in the second silicon substrate 58, and a reflective part 64 for guiding back light of the semiconductor laser to a photo diode 35. In this example, like the previous example, the reflective parts are formed by using a single crystalline Si substrate and an anisotropic etching thereto. The aperture 62 arranges light flux of the light beam, and shields disturbing light.

A light beam deflection-scanned by the deflection disc 53 passes through an opening 65 formed in the second silicon substrate 58, to be projected.

A sealing plate 66 to be piled for fixation on the frame 61 is made of a transparent material, and adapted at a projection window 215 thereof to have a function of a lens constituting part of a scan lens for focusing a light beam on a surface to be scanned, for example, a function for correcting a reflection angle at the diffraction lattice in response to wavelength variation.

In the figure, a drive circuit 38 for light emission source is for control of current supply to the LD chip 34, and a drive circuit 39' for deflection unit is for control of current supply to the stator electrodes 55. They are directly formed on the first silicon substrate 52.

The electrode substrate 51, first silicon substrate 52, second silicon substrate 58, frame 61, and sealing plate 66 are laminated in order and joined together to constitute the optical scan module 801'.

This example has the following advantages in line with the first example of the third aspect of the first embodiment.

The second silicon substrate 58 as a light emission source part substrate is piled via the first silicon substrate 52 on the electrode substrate 51, thereby allowing a vertically overlapping disposition of a light emission source and a deflection unit, permitting the apparatus to be compact in size.

The first silicon substrate 52, the second silicon substrate 58, and the like are piled on the electrode substrate 51, and sealed by the sealing substrate 66, whereby the LD chip 34 as a light emission source, and deflection unit such as deflection disc 53, and reflective parts 63 and 64 are enclosed and tight-sealed, with an enhanced security and facilitated electrical connection.

The frame 61, which is integrally formed with the reflective parts 63 and 64 for guiding a light beam from the LD chip 34 to the photo diode 35 and the deflection disc 53, is provided in a piling relationship between the electrode substrate 51 and the sealing substrate 66, whereby, in a vertical piling disposition of LD chip 34 and deflection unit (deflection disc 53, reflective parts 63 and 64, etc.), the transmission of light beam can be set simply by way of lamination, without troublesome positioning, thus permitting the production process to be simplified, with an enhanced production efficiency.

The deflection disc 53 to be rotated is constituted with a movable part, and the first silicon substrate 52 that accommodates the movable part is piled to be interposed between the electrode substrate 51 and the sealing substrate 66, while the frame 61 is integrally formed with the reflective parts 63 and 64, whereby it is allowed to have a precision of projection direction to be secured by a simple layer-like piling without troublesome positioning, thus permitting a simplified fabrication process with an enhanced production efficiency.

By provision of the reflective part 63 for projecting a deflection-scanned light beam from the deflection disc 53 in a direction that is not parallel to the lamination surface of the semiconductor laser, it is allowed, when soldering the terminals 13 of the optical scan module 801' for fixation to the application surface, to adjust scan line inclinations and scan positions on a scanned surface with ease by adjusting the application angle and position on the application surface, with eliminated needs such as screw fastening, thus permitting a simplified fabrication process with an enhanced production efficiency.

The projection window 215 integrated to or integrally provided with the sealing substrate 66 concurrently serves as a scan lens for focusing a deflection-scanned light beam from the deflection disc 53 on a surface to be scanned, thus allowing common use of the parts, as well as for the scan lens, the LD chip 34 as a light emission source, and the deflection disc 53 as a deflection unit to have a precision of disposition secured by a simple layer-like piling without troublesome positioning, permitting a simplified fabrication process with an enhanced production efficiency.

In this example, the LD chip 34 is formed on the second silicon substrate 58 relatively good of heat conductivity, and there is not provided a heat radiation plate similar to the heat radiation plate 414-1 of FIG. 1. The second silicon substrate 58 may however be provided with a heat radiation plate joined thereto, or have larger dimensions than outline of the electrode substrate.

In arrangement in which an LD chip 34 and a drive circuit 38 for light emission source are disposed on a second silicon substrate 33 like this example, for external electrical connection of an optical scan module in which existing lead frames constitute wiring between a light emission source and a drive circuit for the light emission source, simply an external connection for the drive circuit can do well, permitting, like the first aspect of the first embodiment, the number of terminals to be reduced to render the optical scan module compact in size, allowing for a high-precision optical scanner to be constituted with ease in accordance with the need, and for an enhanced productivity to be achieved.

Optical scan modules identical in size to this example may be mass-produced for preparation to allow for an adequate number thereof to be combined, thereby permitting an optical scanner to be implemented with ease for adaptation to a scan of a voluntary standard size.

In this example, the LD chip 34 as a light emission source and the photo diode 35 as a monitor unit which detects a light quantity of a light beam from the light emission source are applied on the second silicon substrate 58 as a light emission part substrate, which is piled between the electrode substrate 51 as a holder and the sealing plate 66.

Because the second silicon substrate 58 is piled on the electrode substrate 51 via the first silicon substrate 52, the conductors 28 can serve for electrical wiring between the electrode substrate 51 and the first silicon substrate 52 and second silicon substrate 58. Moreover, because the first silicon substrate 52 and second silicon substrate 58 are piled to be integrated on the electrode substrate 51, there is secured with ease a precision of disposition between the second silicon substrate 58 on which the LD chip 34 with an integrated light emission source is mounted and the first silicon substrate 52 on which the deflection disc 53 is mounted, thus permitting a simplified fabrication process with an enhanced production efficiency.

A third example of the third aspect of the first embodiment will be explained here.

Figure 10:
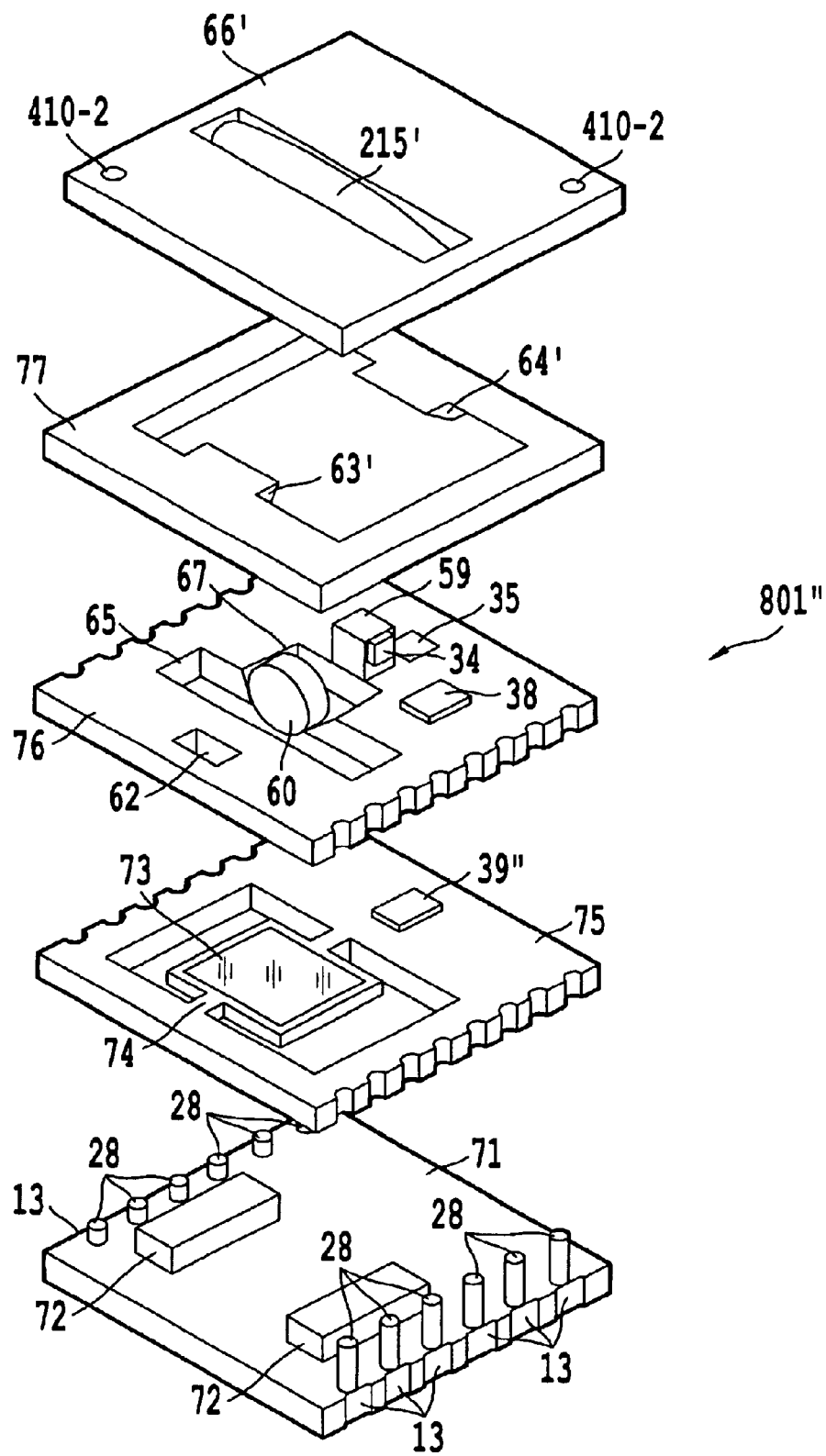
FIG. 10 is an exploded perspective view of an optical scan module.
Figure 11:
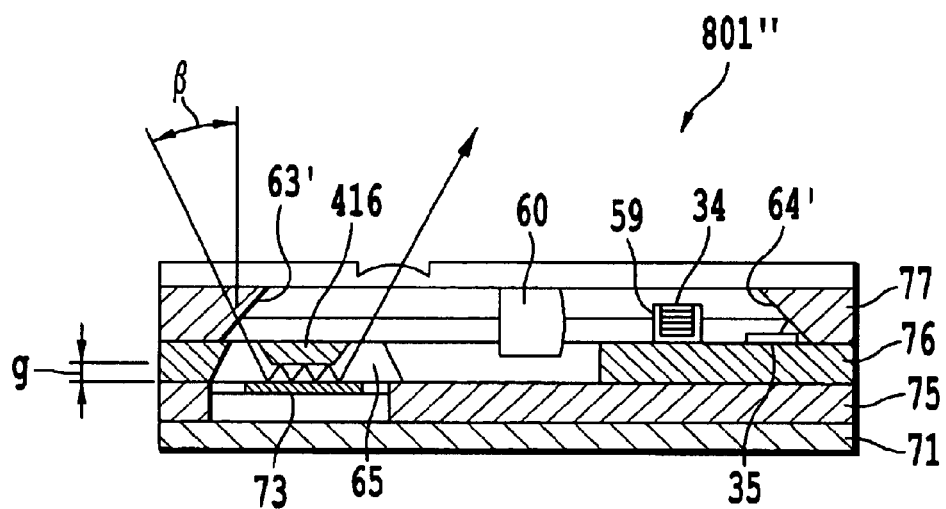
FIG. 11 is a sectional view of optical scan module.

This example is a modification of the first example of the third aspect of the first embodiment. FIG. 10 shows an exploded state of an optical scan module 801" according to this example, and FIG. 11 shows a section of the optical scan module 801" in an assembled state. In FIG. 10 and FIG. 11, those members functionally like to members in FIG. 5 to FIG. 7 are designated by like reference characters.

A ceramic-molded electrode substrate 71 has a pair of magnets 72 provided thereon and conductors 28 and terminals 13 provided on edge parts thereof. A first silicon substrate 75 integrally piled on the electrode substrate 71 is provided with a mirror 73 which is formed, by an anisotropic etching, to be shaft-supported by two twist beams 74 as shown in FIG. 11. On peripheral edges of the mirror 73 is vaporized a metallic coating film, to thereby form a coil part, through which an electric current is conductive to have electromagnetic forces interactive with the magnets 72 disposed outside thereof, whereby the mirror 73 can be swung about the twist beams 74 as rotation axes.

A central part of the mirror 73 is formed as a reflective surface with the metallic coating film. The mirror 73 constitutes a deflection unit, and the twist beams 74 may be set in size so that the mirror 73 has a deflection speed matching with the resonance frequency, allowing for the mirror 73 to swing with a reduced load.

On a second silicon substrate 76 to be piled for fixation on a first silicon substrate 75 are formed unshown wiring patterns by evaporation of metallic coating films, for connections such as to the conductors 28 or by a wire bonding. As an LD chip 34 to be provided on the second silicon substrate 76, like the previous example, there is used a semiconductor laser array chip having a plurality of separately fabricated light emission sources, which is mounted by a sub-mount 59 so that the light emission sources are arrayed perpendicular to the application surface.

A photo diode 35 for monitoring back light of the semiconductor laser is directly formed on the second silicon substrate 76. A coupling lens 60 is made in a cylindrical form, and is installed in a V-groove 67 formed in the second silicon substrate 76, with the circumference in partial abutment thereon.

A frame 77 to be piled for fixation on the second silicon substrate 76 is formed, by using a single crystalline Si substrate and an anisotropic etching thereto, with a reflective part 63' for guiding a light beam projected from the coupling lens 60 to the mirror 73 via an aperture 62 formed in the second silicon substrate 76, and a reflective part 64' for guiding back light of the semiconductor laser to a photo diode 35.

A light beam deflection-scanned by the mirror 73 is reflected by a reflective part 416, which is provided in opposition thereto with a gap g of several hundreds $\mu$m on a rear side of the second silicon substrate 76 as shown in FIG. 11, to reciprocate therebetween R=4 times in this example, before its projection through an opening 65.

In this example, the mirror 73 has an amplitude angle of approx. 3°, and is allowed to extend the scan angle up to $3° \times 2R = 24°$ by gradually shifting the reflection point in a subsidiary scan direction by the four times of reflection.

Letting g be the gap between the mirror 73 and the reflective part 64', β be an incidence angle of a light beam to the mirror 73 in the subsidiary scan direction, and ω be a diameter of incident light flux in the subsidiary scan direction (diameter of the aperture 62 in this example), at least a relationship of g·tan β>ω is met, to thereby obtain a scan angle to be symmetrical about the rotation axis.

A sealing plate 66' to be piled for fixation on the frame 77 is made of a transparent material, and adapted at a projection window 215' thereof to have a function of a lens constituting part of a scan lens for focusing a light beam on a surface to be scanned, for example, a function for correcting a curved scan line associated with an oblique incidence to the mirror part.

In FIG. 10, a drive circuit 38 for light emission source is for control of current supply to the LD chip 34 and is directly formed on the second silicon substrate 76, and a drive circuit 39" for deflection unit is for control of current supply to the coil part formed by evaporation of metallic coating film on peripheral edges of the mirror 73 and is directly formed on the first silicon substrate 52.

The electrode substrate 71, first silicon substrate 75, second silicon substrate 76, frame 77, and sealing plate 66' are laminated in order and joined together to constitute the optical scan module 801".

This example has the following advantages in line with the first example of the third aspect of the first embodiment.

The second silicon substrate 76 as a light emission source part substrate is piled via the first silicon substrate 75 on the electrode substrate 71, thereby allowing a vertically overlapping disposition of a light emission source and a deflection unit, permitting the apparatus to be compact in size.

The first silicon substrate 75, the second silicon substrate 76, and the like are piled on the electrode substrate 71, and sealed by the sealing substrate 66', whereby the LD chip 34 as a light emission source, and deflection unit such as mirror 73, and reflective parts 63' and 64' are enclosed and tight-sealed, with an enhanced security and facilitated electrical connection.

The frame 77, which is integrally formed with the reflective parts 63' and 64' for guiding a light beam from the LD chip 34 to the photo diode 35 and the mirror 73, is provided in a piling relationship between the electrode substrate 71 and the sealing substrate 66', whereby, in a vertical piling disposition of LD chip 34 and deflection unit (mirror 73, reflective parts 63' and 64', etc.), the transmission of light beam can be set simply by way of lamination, without troublesome positioning, thus permitting the production process to be simplified, with an enhanced production efficiency.

The mirror 73 to be rotated is constituted with a movable part, and the first silicon substrate 75 that accommodates the movable part is piled to be interposed between the electrode substrate 71 and the sealing substrate 66', while the frame 77 is integrally formed with the reflective parts 63' and 64', whereby it is allowed to have a precision of projection direction to be secured by a simple layer-like piling without troublesome positioning, thus permitting a simplified fabrication process with an enhanced production efficiency.

By provision of the reflective part 63' for projecting a deflection-scanned light beam from the mirror 73 in a direction that is not parallel to the lamination surface of the semiconductor laser, it is allowed, when soldering the terminals 13 of the optical scan module 801" for fixation to the application surface, to adjust scan line inclinations and scan positions on a scanned surface with ease by adjusting the application angle and position on the application surface, with eliminated needs such as screw fastening, thus permitting a simplified fabrication process with an enhanced production efficiency.

The projection window 215' integrated to or integrally provided with the sealing substrate 66' concurrently serves as a scan lens for focusing a deflection-scanned light beam from the mirror 73 on a surface to be scanned, thus allowing common use of the parts, as well as for the scan lens, the LD chip 34 as a light emission source, and the mirror 73 as a deflection unit to have a precision of disposition secured by a simple layer-like piling without troublesome positioning, permitting a simplified fabrication process with an enhanced production efficiency.

Though not shown in FIG. 10, there may be provided a heat radiation plate similar to the heat radiation plate 414-1 of FIG. 1, projecting outside an outline of the electrode substrate 71, to be joined to the LD chip 34. Thereby, the LD chip 34 great of heat generation may be cooled, to make smaller the accommodation space of the second silicon substrate 76. The heat radiation plate may be formed as part of a lead frame to thereby provide an optical scan module small in size and good at productivity.

In arrangement in which an LD chip 34 and a drive circuit 38 for light emission source are disposed on a second silicon substrate 76 like this example, for external electrical connection of an optical scan module in which existing lead frames constitute wiring between a light emission source and a drive circuit for the light emission source, simply an external connection for the drive circuit can do well, permitting, like the first aspect of the first embodiment, the number of terminals to be reduced to render the optical scan module compact in size, allowing for a high-precision optical scanner to be constituted with ease in accordance with the need, and for an enhanced productivity to be achieved.

Optical scan modules identical in size to this example may be mass-produced for preparation to allow for an adequate number thereof to be combined, thereby permitting an optical scanner to be implemented with ease for adaptation to a scan of a voluntary standard size.

In this example, the LD chip 34 as a light emission source and the photo diode 35 as a monitor unit which detects a light quantity of a light beam from the light emission source are applied on the second silicon substrate 76 as a light emission part substrate, which is piled between the electrode substrate 71 as a holder and the sealing plate 66'.

Because the second silicon substrate 76 is piled on the electrode substrate 71 via the first silicon substrate 75, the conductors 28 can serve for electrical wiring between the electrode substrate 71 and the first silicon substrate 75 and second silicon substrate 76. Moreover, because the first silicon substrate 75 and second silicon substrate 76 are piled to be integrated on the electrode substrate 71, there is secured with ease a precision of disposition between the second silicon substrate 76 on which the LD chip 34 with an integrated light emission source is mounted and the first silicon substrate 75 on which the mirror 73 is mounted, thus permitting a simplified fabrication process with an enhanced production efficiency.

The second embodiment will be explained now. This embodiment covers examples in which the above-noted optical scan module is mounted on another member, for example on a circuit substrate, to constitute the optical scanner according to this invention.

A first example of the second embodiment will be explained here.

Figure 12:
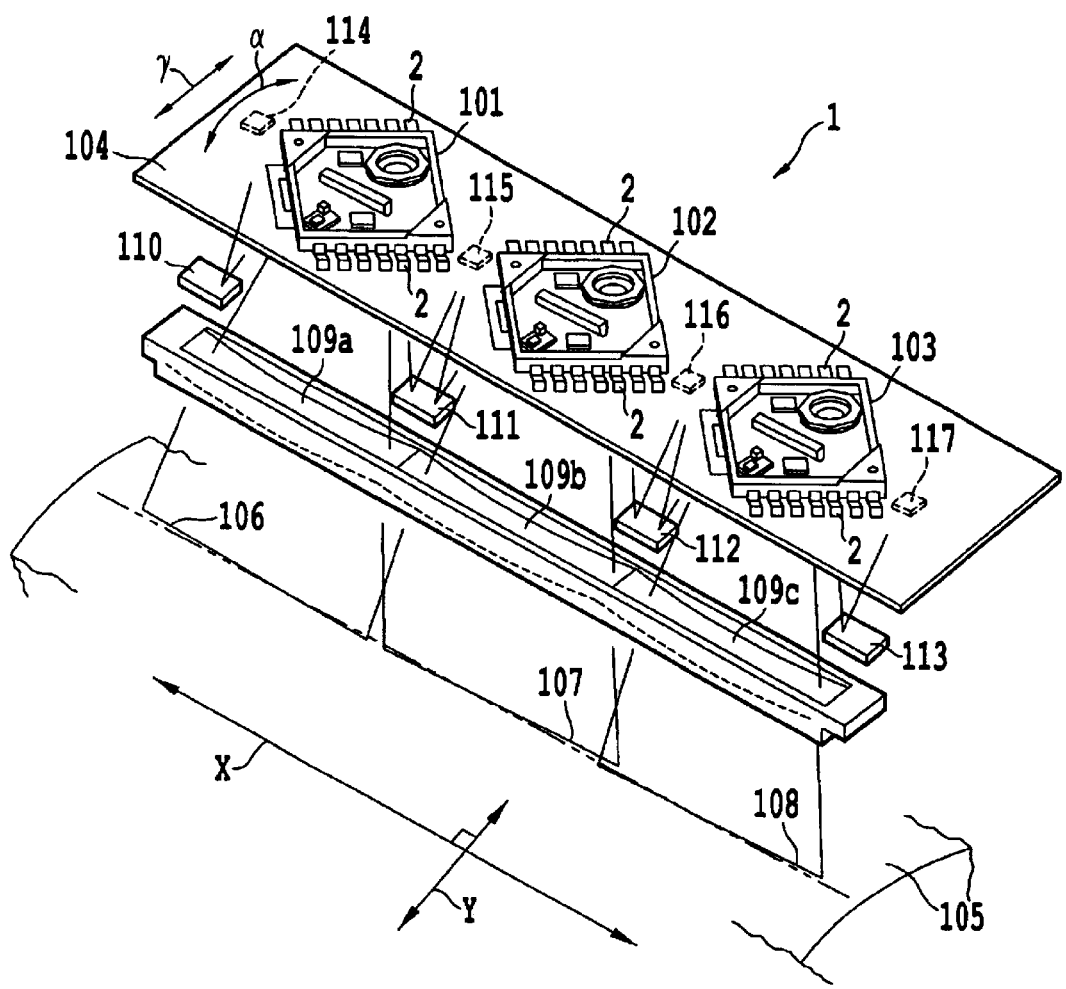
FIG. 12 is a perspective view of an optical scanner.

FIG. 12 shows an example of an optical scanner 1 constituted with a combination of k=3 optical scan modules 101 described with reference to FIG. 1 and FIG. 2. FIG. 2 shows a section of an optical scan module 101 in FIG. 1. The optical scan module 101 of FIG. 1 and FIG. 2 and optical scan modules 102 and 103 quite identical to the optical scan module 101 are arrayed along a principal scan direction X, and applied on a circuit substrate 104, with a matching scan direction, to provide the example. In FIG. 12, the optical scan modules 101, 102, and 103 are depicted as they are seen through their caps 410 shown in FIG. 1.

The optical scan modules 101, 102, and 103 have their LD chips 402 as limit emission sources, coupling lenses 407, polygon mirrors 405 as deflection unit, etc. accommodated, like hybrid IC's, in packages such as by ceramic or epoxy resin make electrode substrates 401 or caps 410, and their drive circuits of the LD chips 402 formed in the packages, as well as their drive circuits of motors for rotating the polygon mirrors 405, and connections between the drive circuits and circuitry formed on the circuit substrate 104 are made by multiple mounting unit 2 integrally formed thereon so as to penetrate inside and outside the packages.

The optical scan modules 101, 102, and 103 are fixed by soldering the mounting unit 2 to the circuitry formed on the circuit substrate 104. This is done, under concurrent checks for respective inclinations, as well as positions in a subsidiary scan direction Y, of scan lines 106, 107, and 108 of the optical scan modules 101, 102, and 103 on a surface 105 to be scanned, by determining positions of back sides of the packages, that is, when taking the optical scan module 101 as an example, the abutment part 401-3 (refer to FIG. 1), along an upside of the circuit substrate 104, in the $\alpha$ direction and the $\gamma$ direction shown, by the way described in FIG. 3, so that the scan lines are aligned to a single straight line. Incidentally, in this example, optical scan modules are disposed on the circuit substrate 104, whereas effects would be analogous on any substrate else if it has an identical plane.

The optical scan modules 101, 102, and 103 are thus arrayed on the same circuit substrate 104, with a matching scan direction, whereas in a process of adjusting their relative inclinations of installation on the circuit substrate 104, scan line inclinations between a plurality of optical scan modules can be corrected with ease and sure, permitting fixation under best adjusted state, so that it is possible to provide an optical scanner with image quality repressed against degrading at joints, allowing image generation with high quality.

Like this, on the same circuit substrate 104 provided with circuits for driving LD chips 402 and polygon mirrors 405 to be controlled, the three optical scan modules are fixed by wiring for connection between the mounting unit 2 and the circuit substrate 104, to thereby constitute the optical scanner 1. The mounting unit 2 concurrently serve as terminals simple in configuration, and the wiring and fixation are concurrently effected. Identical optical scan modules may be mass-produced for preparation to allow for an adequate number thereof to be combined, thereby permitting an optical scanner to be implemented with ease for adaptation to a scan of a voluntary standard size.

In this example, one optical scan module has a record width of approx. 80 mm, and three optical scan modules are provided for scanning an A4 width. Like this, in this example, a single line is divided into a plurality to be scanned in the principal scan direction. However, they may not be necessarily aligned to the same single straight line, and may be overlapped by way a timing-controlled scan of jumped lines.

Light beams projected from the optical scan modules 101, 102, and 103 are spot-like focused on the scanned surface 105 via second lenses 109a, 10b, and 109c as a set of focus elements having toroidal lens faces configured to effect flux collection in the subsidiary scan direction Y and continuously molded in the principal scan direction.

Like this, by provision of the second lenses 109a, 109b, and 109c that have an effect of focusing a light beam projected from an optical scan module at least in the subsidiary scan direction Y and are integrated continuously in an array direction of the optical scan modules, there can be maintained a precision of disposition between focus lines of the second lenses 109a, 109b, and 109c, so that it is possible to provide an optical scanner with image quality repressed against degrading at joints between scan lines of optical scan modules, allowing image generation with high quality.

Respective scan regions to be scanned by the optical scan modules 101, 102, and 103 somewhat overlap, and outside the scan regions, light flux is reflected by mirrors 110, 111, 112, and 113, and strikes toward sensors 114, 115, 116, and 117 as photo detection unit provided at the back side of the circuit substrate 104, so that a respective light beam is detected at a scan start end and at a scan finish end.

By such provision of the sensors 114, 115, 116, and 117, as will be described later, variations of scan times between the sensors are fed back to the optical scan modules, to thereby control a record width, so that it is possible in the principal scan direction as well to provide an optical scanner with image quality repressed against degrading at joints between scan lines, allowing image generation with high quality.

Although two sensors may be provided for each of the optical scan modules 101, 102, and 103, this example has an arrangement in which the sensor for a scan start end and the sensor for a scan finish end are common between neighboring optical scan modules. For example, there is used a common sensor 115 between a scan finish end of the optical scan module 101 and a scan start end of the optical scan module 102, as well as a common sensor 116 between a scan finish end of the optical scan module 102 and a scan start end of the optical scan module 103.

The mirrors 110, 111, 112, and 113 are disposed just in front of the second lenses 109a, 109b, and 109c, for a concurrent service to restrict the scan range, thereby preventing an invasion of light beam to a neighboring lens face.

The mirrors 110, 111, 112, and 113 as scan width restriction unit for restricting scan widths of the optical scan modules are provided in light paths from the polygon mirrors 405 as deflection unit to the second lenses 109a, 109b, and 109c, upstream the second lenses 109a, 109b, and 109c, whereby between neighboring optical scan modules, even when a record finish end position and a neighboring record start position are brought near, there can be prevented an invasion of light beam to the neighboring second lens 109a, 109b, or 109c, so that by effect of continuous integration of the second lenses 109a, 109b, and 109c it is enabled to provide an optical scanner with image quality repressed against degrading at joints between lines, allowing image generation with high quality.

Figure 13:
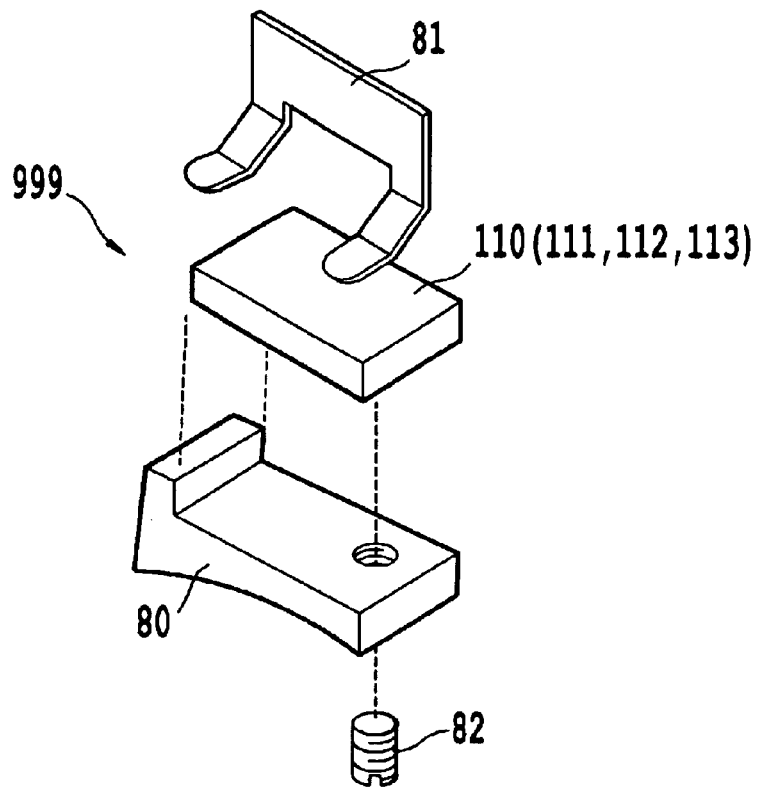
FIG. 13 is an exploded perspective view of a detection position control unit.

As shown in FIG. 13, the mirrors 110, 111, 112, and 113 as scan width restriction unit are each arranged to be brought into abutment at one side edge thereof on a housing 80 supported by the circuit substrate 104, and to be pressed from above with a plate spring 81, to be thereby supported such that the inclination angle is adjustable by rotation of a screw 82 driven into the housing 80. This adjustment unit is referred to as a detection position adjustment unit 999.

The scan width restriction unit comprised of the mirrors 110, 111, 112, and 113 is configured for detection of light beam by the sensors 114, 115, 116, and 117, of which a result can be based on to render close distances between a record finish end position and a scan finish end detection position and between a record start position and a scan start end detection position. Thereby, a difference between a record width and a detected scan width is reduced, to predict an accurate variation of the record width, so that it is possible to provide an optical scanner with image quality repressed against degrading at a joint of neighboring lines, allowing image generation with high quality.

A second example of the second embodiment will be explained here.

Figure 14:
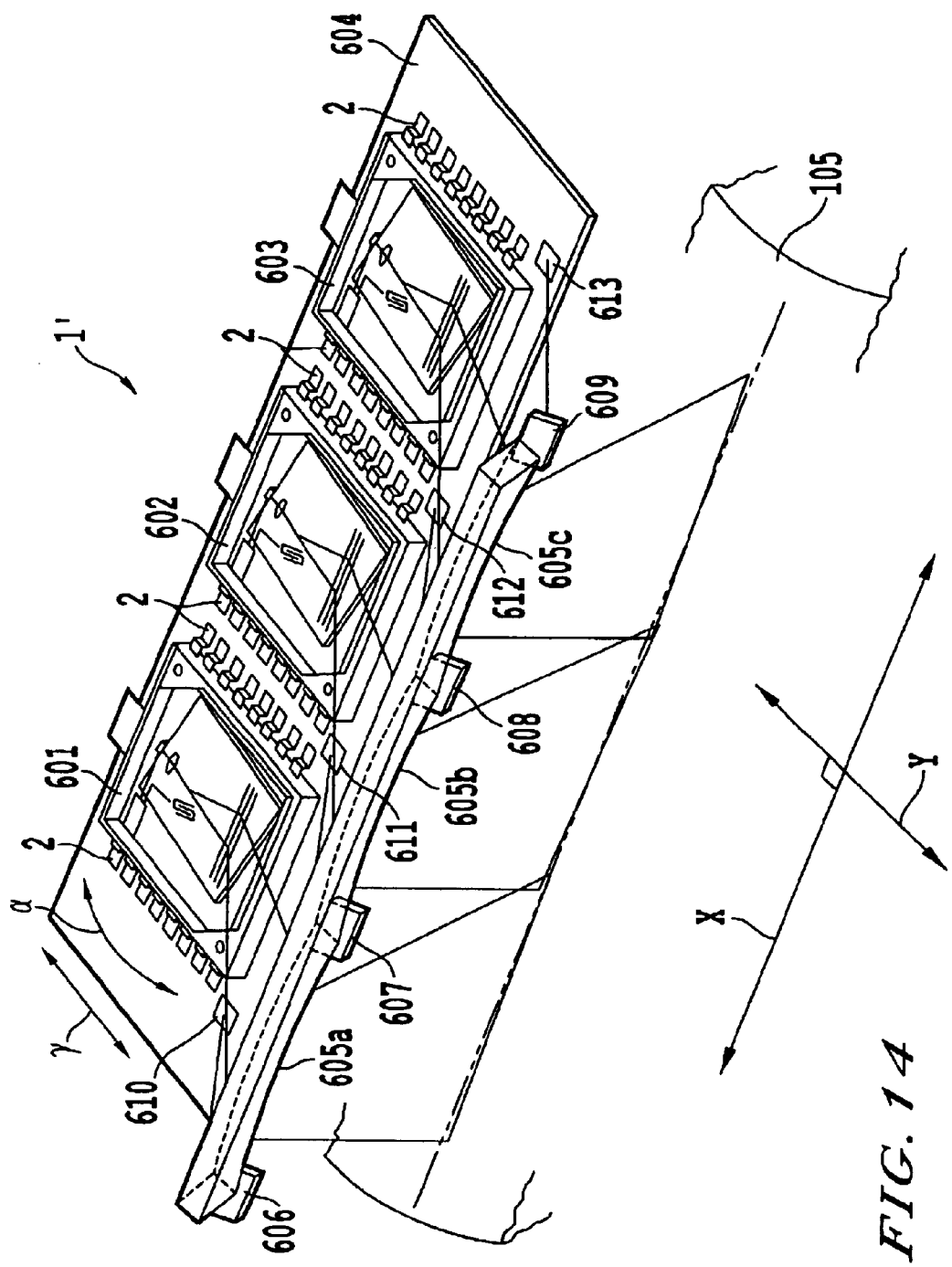
FIG. 14 is a perspective view of an optical scanner.

FIG. 14 shows an example of an optical scanner 1' constituted with a combination of k=3 optical scan modules 601 described with reference to FIG. 4. In optical scan module of this example, as described with reference to FIG. 4, a light beam by a laser is let through an optical guide path, and a transducer for exciting a surface elastic wave is used as a deflector.

An optical scan module 601 and identical optical scan modules 602 and 603 are arrayed, like FIG. 12, on a circuit substrate 604, along a principal scan direction X, and fixed after positional adjustment.

On the other hand, as a focusing optical system, there is employed a set of focus elements as fθ-characteristic toroidal mirrors continuously arranged as focus mirrors 605a, 605b, and 605c, unlike the example of FIG. 12 using a lens arrangement of the second lenses 109a, 109b, and 109c.

Likewise, the optical scan modules 601, 602, and 603 have on their both sides sensors 610, 611, 612, and 613 as photo detection unit disposed on an upside of the circuit substrate 604, and mirrors 606, 607, 608, and 609 disposed just before focus mirrors 605a, 605b, and 605c, causing light beams each to reciprocate between a scan start end and a scan finish end, to be detected there.

In this example shown in FIG. 14, the sensors 610, 611, 612, and 613 correspond to the sensors 114, 115, 116, and 117 in FIG. 12, the mirrors 606, 607, 608, and 609 correspond to the mirrors 110, 111, 112, and 113, and the focus mirrors 605a, 605b, and 605c correspond to the second lenses 109a, 109b, and 109c, respectively. They have like functions to those described in conjunction with FIG. 12.

A third example of the second embodiment will be explained here.

Figure 15:
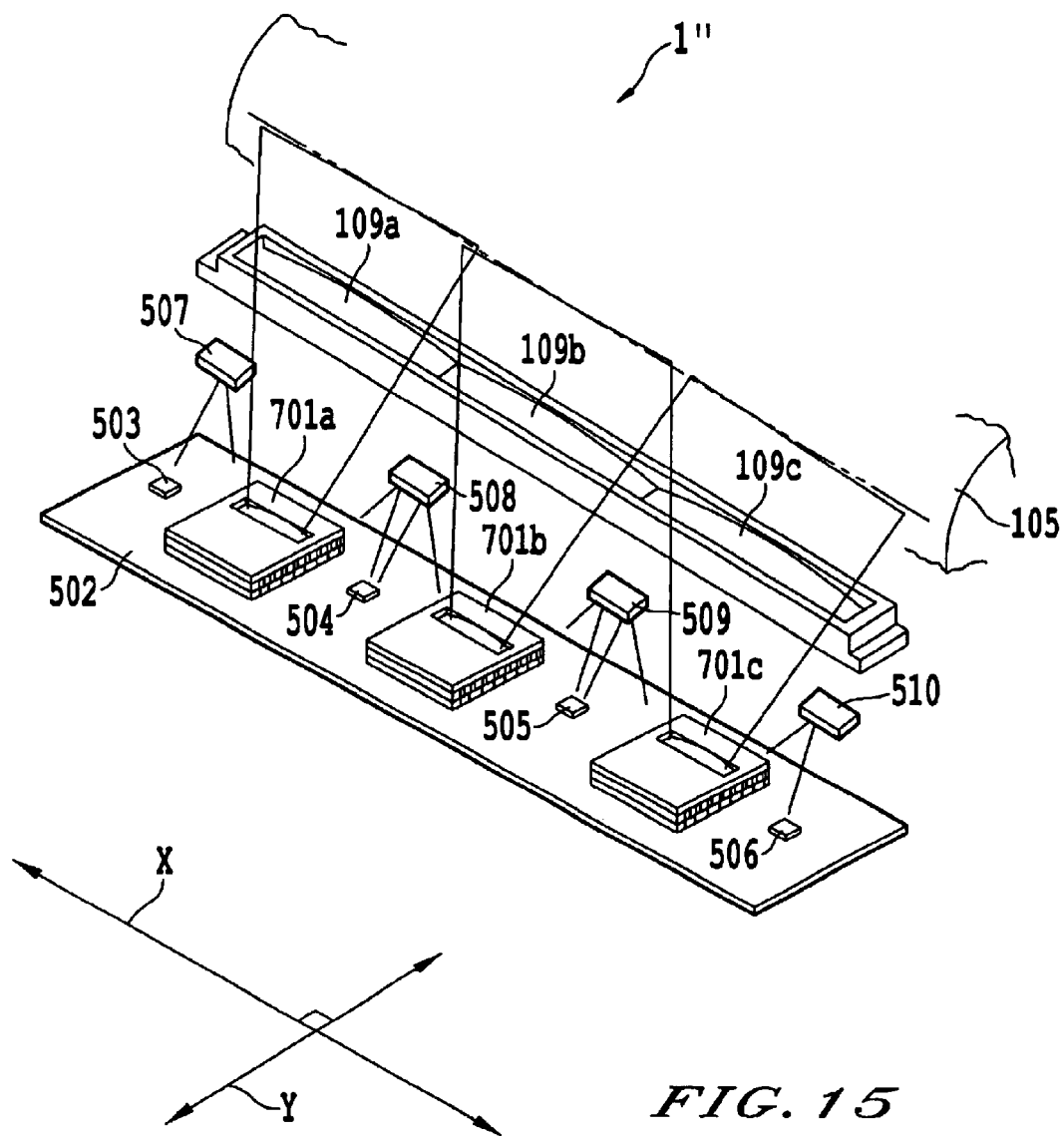
FIG. 15 is a perspective view of an optical scanner.

FIG. 15 shows an example of an optical scanner 1" constituted with a combination of k=3 optical scan modules 701 described with reference to FIG. 5. Optical scan modules 701a, 701b and 701c identical to the optical scan module 701 are arrayed, like FIG. 12, on a circuit substrate 502, along a principal scan direction X, and after positional adjustment, are fixed to the circuit substrate 502, using terminals 13, by soldering.

On the other hand, as a focusing optical system, there is employed like second lenses 109a, 109b, and 109c to the example of FIG. 12. Also the functions are like to those of FIG. 12. Likewise, the optical scan modules 701a, 701b, and 701c have on their both sides sensors 503, 504, 505, and 506 as photo detection unit disposed on an upside of the circuit substrate 503, and mirrors 507, 508, 509, and 510 disposed just before the second lenses 109a, 109b, and 109c, causing light beams each to reciprocate between a scan start end and a scan finish end, to be detected there.

In the example shown in FIG. 15, the sensors 503, 504, 505, and 506 correspond to the sensors 114, 115, 116, and 117 in FIG. 12, respectively, and the mirrors 507, 508, 509, and 510 correspond to the mirrors 110, 111, 112, and 113, respectively. They have like functions to those described in conjunction with FIG. 12.

Incidentally, in respect of the optical scan module 801 shown in FIG. 7, the optical scan module 801' shown in FIG. 8 and FIG. 9, or the optical scan module 801" shown in FIG. 10 and FIG. 11, as well, three identical ones may be disposed in place of the optical scan modules 701a, 701b, and 701c, to thereby constitute an optical scanner.

Like this, by providing optical scan modules according to the invention on a circuit substrate, an optical scanner can be constituted irrespective of the focusing optical system or deflector system.

The third embodiment will be explained now. This embodiment is principally addressed to the optical scanner this invention.

In usual system in which a deflector is used for scanning a light beam to record an image, a distance from the deflector to a surface to be scanned increases in proportion to the dimension of a record width, resulting in an enlarged apparatus scale that needs the aperture of a scan lens as well as a deflector to be enlarged, as a disadvantage. To the contrary, as described, compact design can be achieved by arranging a plurality of optical scan modules on a common circuit substrate, and dividing a total record width to be scanned. Moreover, the record width can be increased by simply changing the number of optical scan modules to be joined together, without increasing the distance to a surface to be scanned.

However, at a respective optical scan module, there is recorded an image data of a division of one line. Because deflection unit are asynchronously rotated, there is given no particular order of occurrence for each synchronism detection signal to determine the timing of a record start of image data. Recording may thus be started at its individual timing.

It may do for a respective scan module to prepare image data of one page in advance. However, joint positions may then be always unique, with a good regularity, so that the joint tends to be conspicuous, as a problem.

To this point, in this third embodiment, there is provided an optical scanner in which a plurality of optical scan modules are arrayed on a straight line, a total record width is divided to be scanned, and for every line, a partial image data corresponding to a respective optical scan module is read in its order of array and, at a joint of the line, the image data of a neighboring part is associated so as to enable a dot position or pulse width control to effect a so-called shade-off at the joint, so that a positional deviation in a subsidiary scan direction is inconspicuous.

The optical scanner 1 shown in FIG. 12 will now be explained. It should however be noted that like embodiment can be implemented of any optical scanner else using an optical scan module described, such as the optical scanner 1' described with reference to FIG. 14, or the optical scanner 1" described with reference to FIG. 15.

Figure 16:
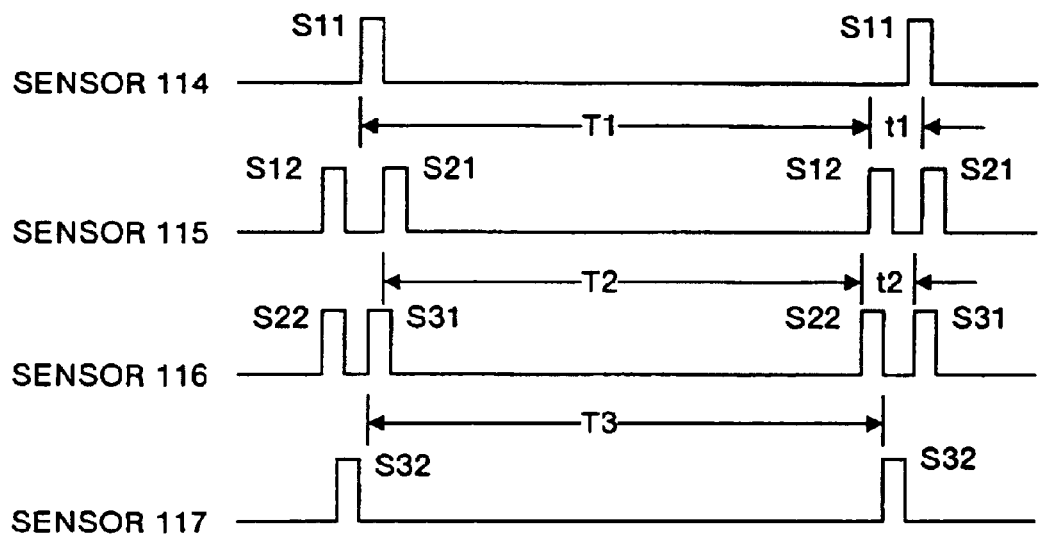
FIG. 16 is a time chart of timings for photo detection by sensors disposed at scan starting ends and scan finishing ends of optical scan modules.

FIG. 16 shows timings of photo detection by sensors disposed at a scan start end and at a scan finish end of a respective optical scan module. There are shown detection signals by sensors 114, 115, 116, and 117 in a descending order from the top.

Designated by reference character S11 is a detection signal of a start end of a scan by the optical scan module 101, and S12 is a detection signal of a finish end of the scan. Reference character S21 is a detection signal of a start end of a scan by the optical scan module 102, and S22 is a detection signal of a finish end of the scan. Reference character S31 is a detection signal of a start end of a scan by the optical scan module 103, and S32 is a detection signal of a finish end of the scan.

An interval of time T1 from the detection signal S11 to the detection signal S12 denotes a scan time of the polygon mirror 405 in the optical scan module 101. An interval of time T2 from the detection signal S21 to the detection signal S22 denotes a scan time of the polygon mirror 405 in the optical scan module 102. An interval of time T3 from the detection signal S31 to the detection signal S32 denotes a scan time of the polygon mirror 405 in the optical scan module 103.

As described, between neighboring optical scan modules, or more specifically, between the optical scan module 101 and the optical scan module 102, the sensor 115 is used in common at the scan finish end and at the scan start end, and likewise, between the optical scan module 102 and the optical scan module 103, the sensor 116 is used in common at the scan finish end and at the scan start end, having the same detection position, respectively. Therefore, at the sensor 115, as well as at the sensor 116, there time-sequentially appear detection signals of different optical scan modules.

The detection signals S11, S12, and S13 at the scan start ends of the respective optical scan modules are used as so-called synchronism detection signals, and after lapse of a prescribed time therefrom, image signals are put on light beams to start recording on the scanned surface 105. Therefore, record start positions soon after a scan start hardly experience variations due to disturbance, and are free of errors. However, record finish positions tend to have changes, such as by thermal effects, in wavelength of laser diode as well as in magnification of focus lens, causing errors. As a result, between scan lines by neighboring optical scan modules, the joint may go spaced or overlap.

To this point, in this third embodiment, a pixel clock frequency of an optical scan module preceding in scan is optimized for a match to be achieved between a record finish position of the preceding optical scan module and a record start position of a succeeding optical scan module.

In other words, a record width L, which can be expressed such that the record width L=scan speed V×recording pixel number N/pixel clock frequency f, is regulated by regulating the pixel clock frequency f. Therefore, by selecting an optimal pixel clock frequency for each optical scan module, positions of record finish ends can be corrected to match scan lines at the joints. Letting now the scan speed V=a distance D from scan start end to scan finish end/scan time T, it is assumed that the distance D from scan start end to scan finish end and the number N of recording pixels be constant without variations.

Figure 21:
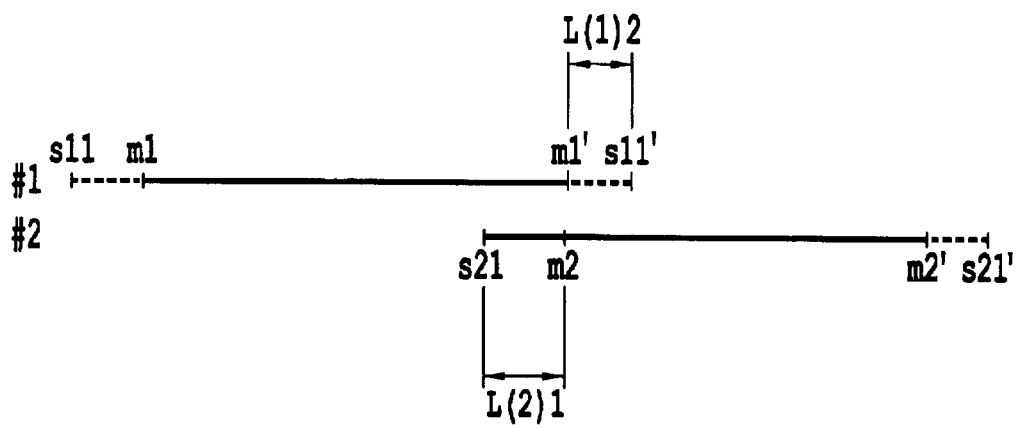
FIG. 21 is a schematic descriptive diagram of relationships between scan starting and finishing ends and record starting and finishing ends of neighboring scan modules.

It is observed that, with a lapse of time also, the wavelength of semiconductor laser as well as the magnification of focus lens changes depending on a changed circumstance, causing the positions of record finish ends to vary. However, as in FIG. 21, when taking for example the optical scan module 101 (#1) and the optical scan module 102 (#2) into consideration, a virtual distance L(1) 2 from a record finish end m1' to a scan finish end S11' of the optical scan module 101 at a respective time point can be predicted by using a scan speed V(1) determined by a distance from a scan start end S11 to a scan finish end S11' of the optical scan module 101 and a scan time T(1) thereof.

Likewise, a virtual distance L(2) 1 from a scan start end S21 to a record start end m2 of the optical scan module 102 at the respective time point can be predicted by using a scan speed V(2) determined by a distance from a scan start end S21 to a scan finish end S21' of the optical scan module 102 and a scan time T(2) thereof.

Then, by comparing such predicted values with respective distances corresponding thereto at the time point of an initial optimization, the pixel clock frequency f of the optical scan module 101 is re-set such that the virtual distance L(1) 2 and the virtual distance L(2) 1 have a constant sum, whereby the record width can be corrected so that the record finish end m1' is connected to the record start end m2, without excess nor short.

Generally, with respect to an arbitrary n-th optical scan module, a virtual distance L(n) 2 from a record finish end to a detected scan finish end and a virtual distance L(n+1) 1 from a detected scan start end to a record start end are respectively predicted from scan speeds V(n) and V(n+1) respectively determined from scan times T(n) and T(n+1) from respective scan start ends to respective scan finish ends of associated optical scan modules, and compared with respective distances at a time point of an initial optimization, thereby re-setting a pixel clock frequency f(n) of the n-th optical scan module so that a sum of L(n) 2+L(n+1) 1 is always constant, whereby the record width can be corrected for control to keep the position of a record finish end and the position of a neighboring scan record start end from being deviated, so that the neighboring optical scan modules have their scan lines always matching at the joint.

This is simplified in this third embodiment such that, assuming variations of record widths at respective optical scan modules to be equivalent in proportion, for an n-th optical scan module, the record width control is performed by simply using a time difference between a scan finish end of the n-th optical scan module and a scan start end of a neighboring (n+1)-th scan module, as they are detected by the same sensor.

In other words, a change from a record finish end position to a scan finish end detection of the n-th optical scan module and a change from a scan start end detection to a record start end position of the (n+1)-th optical scan module are combined, for use in correction of record width of the n-th optical scan module.

Figure 17:
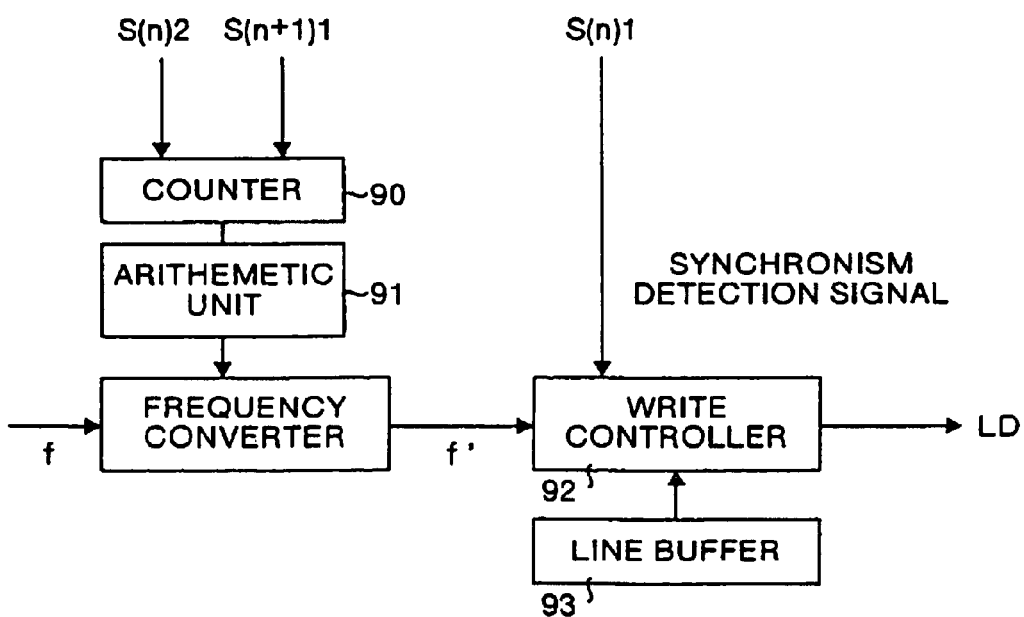
FIG. 17 is a block diagram of a control unit for record width control of optical scan module.

FIG. 17 shows in block diagram a control unit for the above-noted control. In this Figure, a detection signal S(n)2 of scan finish end and a detection signal S(n+1)1 of scan start end are input to a counter 90, and a time difference t(n)' is determined at a calculator 91, where it is compared with an initially set value t(n) to calculate a variation. On this basis, a set value f of the pixel clock frequency is substituted by a corrected value f', which is input to a write controller 92, where it is recorded by using a synchronism detection signal given as a trigger in terms of detection signal S(n)1. Incidentally, though not shown, also these control circuits are applied on the circuit substrate 104 (refer to FIG. 12).

The counter 90 and the calculator 91 constitute a measurement unit for measuring a change of the timing of occurrence between a photo detection signal at a scan finish end of light by a respective optical scan module and a photo detection signal at a scan start end of light by a neighboring optical scan module at the scan finish end side.

By provision of such a measurement unit, there is measured a change of time interval between a photo detection signal of a light beam at a scan finish end of a respective optical scan module and a photo detection signal at a scan start end of a neighboring optical scan module at the scan finish end side, to thereby correct an image record width, under conditions to be sufficient with a short distance and a minimum measurement time, allowing a counter resolution to be enhanced, so that it is possible to provide an optical scanner with image quality repressed against degrading at joints, allowing image generation with high quality.

Figure 18:
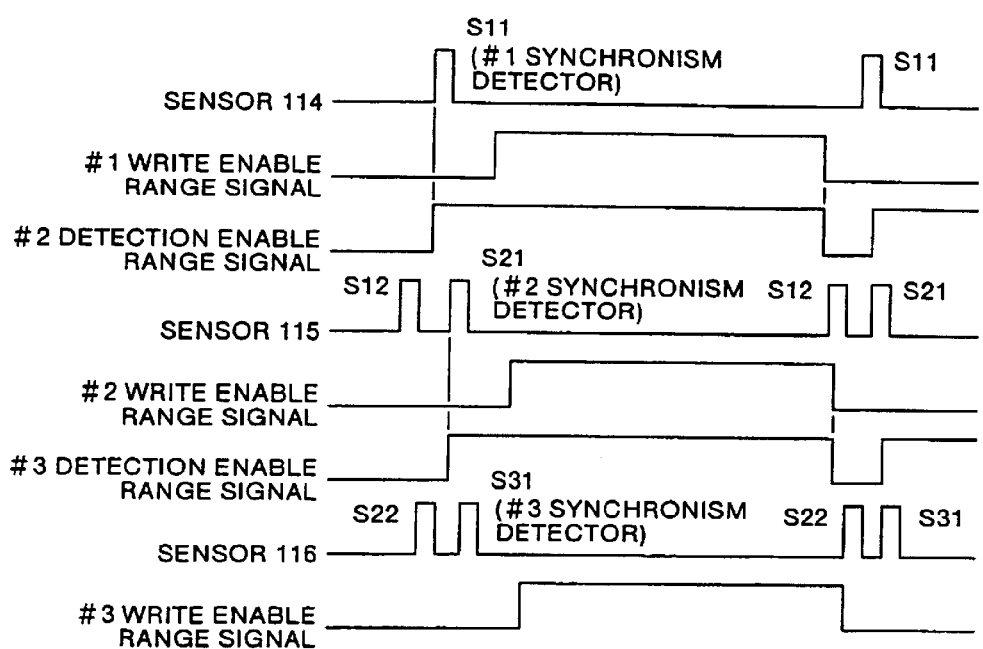
FIG. 18 is a descriptive chart of timings of various signals at write controllers of optical scan modules.

FIG. 18 is a chart showing timings of various signals at write controllers of the respective optical scan modules. In FIG. 18 and FIG. 19, designated by reference character #1 is the optical scan module 101, #2 is the optical scan module 102, and #3 is the optical scan module 103.

At the sensor 114, there occurs a synchronism detection signal S11 of the first optical scan module 101. Based thereon, at the write controller, a write enable region signal is raised to be active with an image record enable state to read an image data from a line buffer 93 shown in FIG. 17. Depending on the read image data, the LD is modulated for image recording. Further, using the synchronism detection signal S11 as a trigger, a detection enable region signal is kept active until the write enable region signal ends. The range in which the detection enable region signal is active is a detection enable interval.

Like this, for a respective optical scan module, a synchronism detection signal of a neighboring optical scan module at the scan start side is used as a trigger to provide a detection enable interval for every line, and simply a detection signal detected in the detection enable interval is used to effect a read control of image data from buffer unit such as the line buffer 93.

Like this, the respective optical scan module is adapted to use a synchronism detection signal of a neighboring optical scan module at the scan start side as a trigger to provide a detection enable interval per line, and simply a detection signal detected in the detection enable interval to effect a read control of image data from the buffer unit, whereby an image recording can be performed in order of array of the optical scan modules, so that it is possible to provide an optical scanner that can generate a high-quality image with inconspicuous positional deviations in a subsidiary scan direction.

In this third embodiment, simply when the above-noted signal is active, a synchronism detection signal S21 of the second optical scan module 102 is allowed to be effective. Likewise, a synchronism detection signal of the third optical scan module 103 is allowed to be effective, simply when a detection enable region signal using the synchronism detection signal S21 as a trigger is active, so that respective segments of a divided single line are sequentially recorded.

Therefore, there occurs a record start of the optical scan module 102 within an interval from a record start to a record finish end of the optical scan module 101, and a record start of the optical scan module 103 within an interval from the record start to a record finish end of the optical scan module 102, with positional deviations ensured to be under one line pitch in the subsidiary scan direction.

Although there is the need for a synchronism detection signal of a respective optical scan module to be detected within an active range of the detection enable region signal, it can be implemented by adjustment of principal scan angles of the mirrors 111 and 112, by use of the detection position control unit 999 described with reference to FIG. 13.

Like this, a respective optical scan module has a detection position control unit 999 for controlling a principal scan position of an incident beam to a photo detection unit (sensors 114, 115, 116, and 117) so that the synchronism detection signal of the optical scan module is detected at least with a delay from the synchronism detection signal of a neighboring optical scan module on a scan start side, whereby synchronism detection signals of optical scan modules are ensured to occur in order of the array, so that it is possible to provide an optical scanner that can generate a high-quality image with inconspicuous positional deviations in a subsidiary scan direction. It should be noted that in place of the detection position control unit 999, a rotation phase of the deflection unit maybe controlled t achieve like effects.

FIG. 20 is a block diagram for rotation speed control of deflection unit such as the polygon mirror 405, using a general PLL control system. Between an FG signal representing a rotation speed fed back from the polygon mirror 405 and a rotation speed reference signal given from a control unit of the optical scanner 1, in order to render the phase difference always constant, a drive signal controlled at the PLL controller 171 is input to a motor 172 for driving the polygon mirror 405 to rotate.

Therefore by use of a phase controller 170 as a phase control unit for controlling a phase of the rotation speed reference signal, a respective optical scan module is adapted to control the phase of rotation speed reference signal for the deflection unit so that the synchronism detection signal of the optical scan module is detected at least with a delay from the synchronism detection signal of a neighboring optical scan module on a scan start side, whereby synchronism detection signals of optical scan modules are ensured to occur in order of the array, so that it is possible to provide an optical scanner that can generate a high-quality image with inconspicuous positional deviations in a subsidiary scan direction. It should be noted that in place of the detection position control.

In this third embodiment, as described, the same sensor is used for a scan start end detection of an optical scan module and that of a neighboring optical scan module, with the need of separating detected signals. The detection enable region signal can be used as a mask signal therefor, too.

FIG. 19 is a diagram describing flow of image data to the respective optical scan modules. The optical scan modules are provided line buffers 150, 151, and 152 simply for image data they are responsible. Read data per line from a page memory are processed by an image processor 160, where on basis of information of neighboring images at divide positions their dot positions as well as pulse widths (modulation duties) of respective dots are optimized, and thereafter, controlled fractions of data to be recorded are sequentially distributed to write controllers of the optical scan modules, such that, while measuring a pixel number from scan start side to subsequent divide position by a counter 161, associated data are transferred via a switch 162, firstly to the first line buffer 150 until the divide position is reached, when the destination of transfer is switched to the second line buffer 151, concurrently clearing the counter 161.

Then, at the time when a transfer to the third line buffer 152 is finished, the flow goes to the next line to likewise read data therefrom, this being repeated. Like this, there are provided a plurality of buffer unit for temporarily storing image data in correspondence to optical scan modules, a switch for dividing image data of one line to be allotted to the optical scan modules, for distribution to the buffer unit, and a counting unit for counting a number of allotted image data, whereby fractions of image data corresponding to the optical scan modules can be written in order of the array, to be processed line by line, and positional deviations in a subsidiary scan direction are ensured to be repressed within one line, allowing pulse widths and dot numbers of joints to be increased or decreased every line, so that it is possible to make the joints inconspicuous, and to provide an optical scanner that can generate a high-quality image.

According to the third embodiment, the same substrate (circuit substrate 104) integrally holds thereon a plurality of optical scam modules 101, 102, and 103 and sensors 114, 115, 116, and 117 as photo detection unit for detecting synchronism detection signals, eliminating the need of re-adjustment of mutual relationship between the optical scan modules 101, 102, and 103 even when replacing the optical scanner 1, which relationship can be maintained long with the time also, and it is possible to provide an optical scanner that can generate a high-quality image with inconspicuous positional deviations in a subsidiary scan direction.

The fourth embodiment will be explained now. This embodiment is principally addressed to the image generator according to this invention.

A first example of the fourth embodiment will be explained here.

This example relates to a monochrome image generator using an optical scanner 1 (1', 1") described, such as in FIG. 12, FIG. 14, or FIG. 15.

Figure 22:
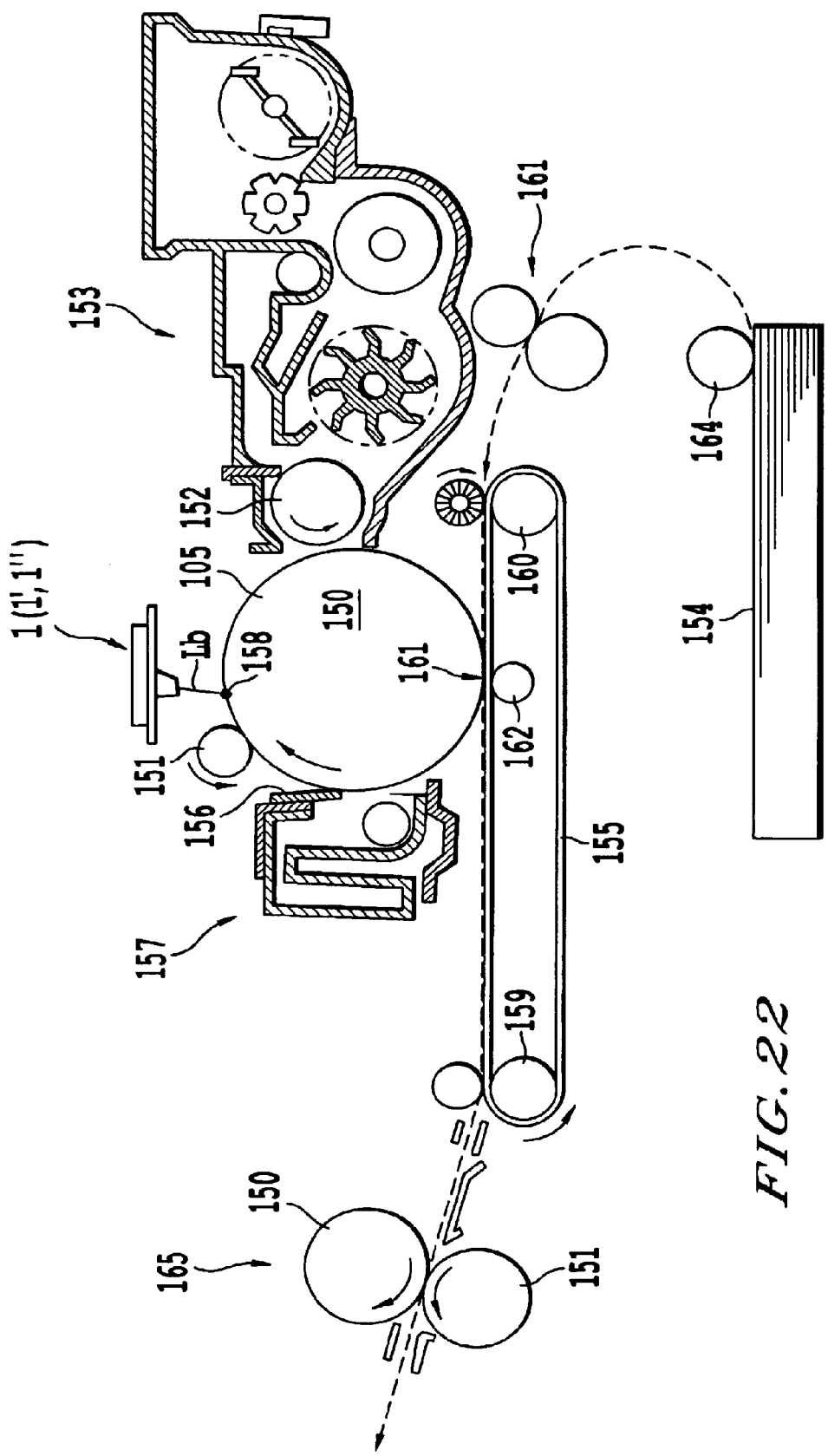
FIG. 22 is an illustration of arrangement of an image generator.

FIG. 22 shows a section of essential parts of a digital image generator. In FIG. 22, a photo-sensitive body 150 comprised of a drum-shaped rotary member has its peripheral surface, which constitutes the surface 105 to be scanned in FIG. 12, FIG. 14, FIG. 15, etc.

Around the photo-sensitive body 150, there are disposed, in order of arrangement in a clockwise sense of rotation indicated by arrow, a charger 151 comprised of a charged roller, an optical scanner 1 (1', 1") as an optical writing unit, a developer unit 153 provided with a developer roller 152, a transfer conveyor belt 155 for holding and conveying a transfer sheet as a record medium 154, and a cleaning unit 157 provided with a blade 156 to be brought into sliding contact on the peripheral surface of the photo-sensitive body 150.

A light beam Lb is radiated from the optical scanner 1 (1', 1") toward the photo-sensitive body 150, and scanned in an axial principal scan direction, irradiating a position on the photo-sensitive body 150, between the charger 151 and the developer roller 152. The irradiate position of the light beam Lb is called an exposed part 158.

The transfer conveyor belt 155 is an endless-shaped belt supported by two support rollers 159 and 160. On an intermediate region of the transfer conveyor belt 155 supported by the support rollers 159 and 160 is contacting a lower surface of the photo-sensitive body 150. The contacting region is a transfer part 161. At the backside of the transfer part 161 of the transfer conveyor belt 155, there is provided a transfer roller 162 as a transfer unit for applying a transfer bias.

The transfer conveyor belt 155 is arranged to be driven to rotate counterclockwise as indicated by arrow. Relative to an upstream end of an upper belt portion of the transfer conveyor belt 155, at a yet upstream position, there is provided a pair of resister rollers 161. A record medium 154 accommodated to an unshown sheet feed tray is sent out by a sheet feed roller 164, and guided by an unshown conveyance guide, toward the resistor rollers 161. Relative to a downstream end of the upper belt portion of the transfer conveyor belt 155, at a yet downstream position, there is disposed a fixer 165.

At an upstream end part of the upper belt portion of the transfer conveyor belt 155, above the support roller 160 supporting the transfer conveyor belt 155, there is provided a brush roller 166 as an absorption unit quasi-abutting on the transfer conveyor belt 155, to be driven to rotate clockwise as indicated by arrow.

As the brush roller 166 rotates, a brush is brought into sliding contact on the transfer conveyor belt 155. The brush roller 166 is adapted to have an electric potential for the bias current to be applied thereto, from an unshown bias application unit, with a polarity for absorbing the record medium 154 to the transfer conveyor belt 155.

In this image generator, image generation occurs as follows. The photo-sensitive body 155 starts rotation, and during the rotation, the photo-sensitive body 155 is uniformly charged by the charger 151 in dark place, and then a light beam Lb irradiating an exposed part 158 is scanned to thereby form a latent image corresponding to an image to be prescribed. As the photo-sensitive body 150 rotates, the latent image arrives at the developer 153, where it is changed to a visible image by a toner, thereby forming a toner image.

On the other hand, as a feed by the sheet feed roller 164 is started, a record medium 154 on the sheet feed tray is fed via a conveyance path shown by broken lines to a position of the paired resister rollers 161, where it once stops, waiting for a timing to be fed, so that it can coincide with a toner image on the photo-sensitive body 150 at the transfer part 161. When such a good timing has come, the record medium 154, which has been at the resister rollers 161 till then, is fed from the resister rollers 161.

The record medium 154 fed from the resister rollers 161 is pinched between the transfer conveyor belt 155 and the brush roller 166, and pressed by an electrostatic force due to the bias and resilient forces of the brush, whereby it is absorbed onto the transfer conveyor belt 155, to be conveyed to the transfer part 161, along with movement of the transfer conveyor belt 155.

The record medium 154 coincides with the toner image on the photo-sensitive body 150, at the transfer part 161, where the toner image is transferred to the record medium 154 by an electric field due to a potential difference between the photo-sensitive body 150 and a bias imposed on the transfer conveyor belt 155 from the transfer roller 162.

The record medium 154 having a toner image thus received from an image generating part about the photo-sensitive body 150 is conveyed by the transfer conveyor belt 155, and in due course, at the downstream end of the upper belt portion of the transfer conveyor belt 155, it is separated from the transfer conveyor belt 155, to be sent toward the fixer 165. The record medium 154 carrying the toner image passes the fixer 165, where the toner image is fixed to the record medium 154, and is discharged to an unshown sheet discharge part.

The photo-sensitive body 150 has remaining toner left thereon, without being transferred at the transfer part 161, which is carried by the rotating photo-sensitive body 150 to the cleaner 157 and cleaned, when passing the cleaner 157, to be prepared for a subsequent image formation.

Like this example, by using the optical scanner 1 (1', 1") as an optical writing unit, it is possible to provide an image generator that is compact in size, high of image quality, and has advantages of the optical scanner, as well as of the optical scan modules described.

A second example of the fourth embodiment will be explained here.

This example relates to a full-color image generator of a tandem system using an optical scanner 1 (1', 1") described, such as in FIG. 12, FIG. 14, or FIG. 15.

Figure 23:
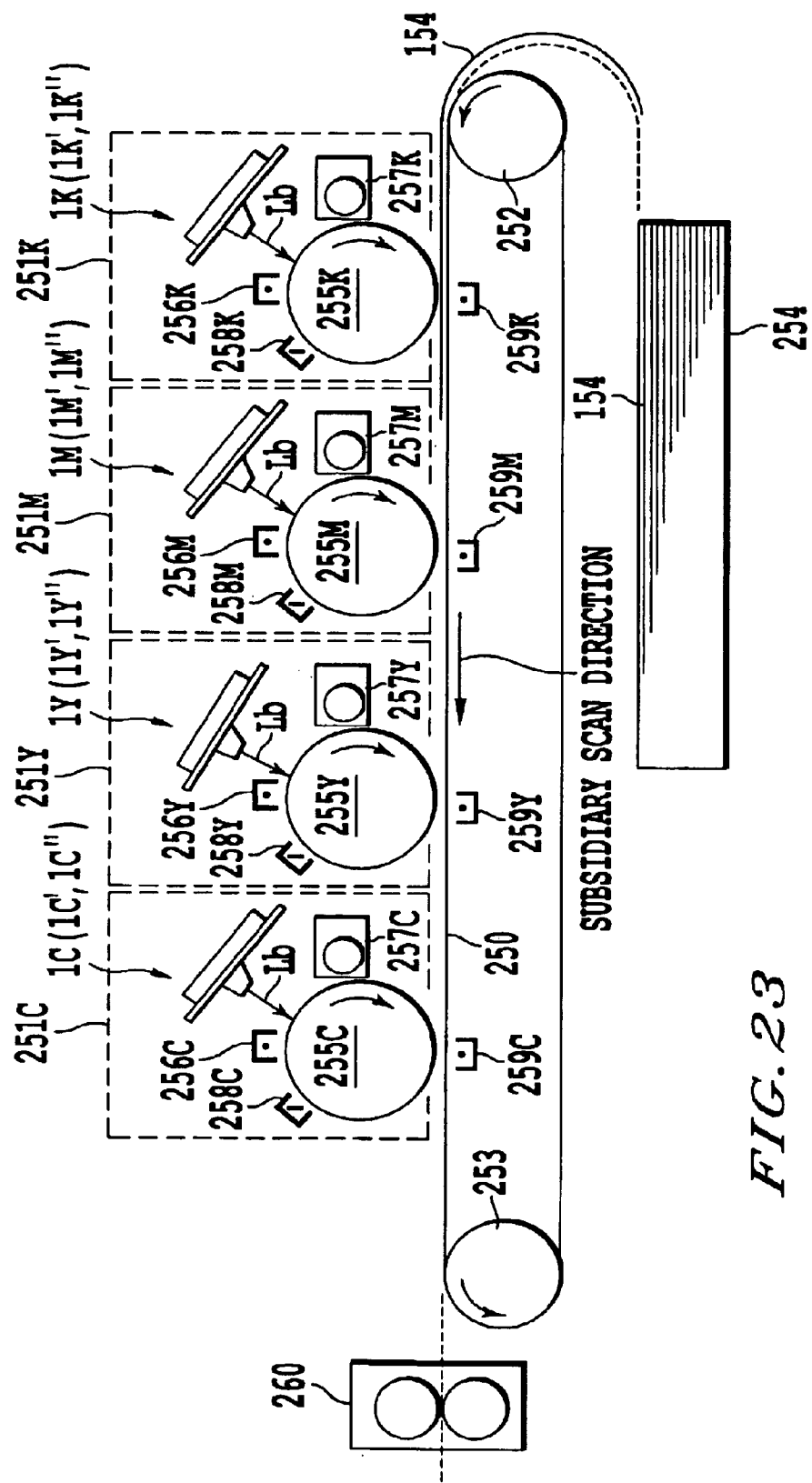
FIG. 23 is an illustration of arrangement of an image generator.

Referring now to FIG. 23, the color image generator, which is a so-called tandem type, has arrayed, along a conveyor belt 250 for conveying a record medium 154, in order from an upstream end of a moving direction (conveying direction) of the conveyor belt, a plurality of electronic processors 251K, 251M, 251Y, and 251C. The electronic processors function as image generating parts. The image to be generated at the electronic processor 251K is a black, the electronic processor 251M is a magenta, the electronic processor 251C is a cyanic, and the electronic processor 251Y is a yellow, and although the electronic processors are different simply in color of the image to be generated, their internal arrangement is common. Accordingly, in the following description, the electronic processor 251K is specifically described, and for the other electronic processors, their components are simply depicted in the Figure, with reference characters having M, Y, or C in place of K for components of the electronic processor 251K.

The transfer conveyor belt 250 is configured as an endless belt rotatably supported by conveyor rollers 252 and 253, either to be a drive roller and the other to be a driven roller, so as to rotate in the sense of arrow together with rotation of the conveyor rollers. Under the conveyor belt 250 is provided a sheet feed tray 254 having record media 154 accommodated therein.

Among the record media 154 accommodated in the sheet feed tray 254, a record medium at a top position is fed for use in image generation, and absorbed on the conveyor belt 250 by electrostatic absorption. The record medium 154 thus absorbed on the conveyor belt 250 is conveyed to the first electronic processor 251K, where it has a black image transferred thereon.

The electronic processor 251K is constituted with a photo-sensitive body 255K configured into a drum form as an image carrier with a peripheral surface that constitutes the surface 105 to be scanned in FIG. 12, FIG. 14, FIG. 15, etc., and with components disposed around the drum of photo-sensitive body 255K, such as a charger 256K, an optical writer 1K (1K', 1K") comprised of an optical scanner 1 (1', 1") as an optical writing unit, a developer 257K, and a photo-sensitive body cleaner 258K.

For the image generation, a peripheral surface of the photo-sensitive body 255K is uniformly charged by the charger 256K in dark place, and thereafter, is irradiated by a light beam Lb from the optical scanner 1K corresponding to the black of image, to thereby form a latent image. The latent image is changed at the developer 257K to a visible image by a black toner, so that a black toner image is formed on the photo-sensitive body 255K.

At a so-called transfer position where the photo-sensitive body 255K contacts on the record medium 154 on the conveyor belt 253, the black toner image is transferred to the record medium 154 by the function of a transfer device 259K, so that a monochrome (black) image is formed on the record medium 154. After the transfer, the photo-sensitive body 255K has remaining toner left on the peripheral surface thereof, and unnecessary toner is removed by the photo-sensitive body cleaner 258K, to be prepared for a subsequent image formation.

The record medium 154 having thus received a monochrome (black) transfer at the electronic processor 251K is conveyed by the conveyor belt 250 to the next electronic processor 251M. At the electronic processor 251M, by like process to the electronic processor 251K, a magenta toner image is formed on a photo-sensitive body 255M and transferred therefrom to be superposed on the black toner image on the record medium 154.

This record medium 154 is further conveyed to the next electronic processor 251Y, where likewise a yellow toner image is formed on a photo-sensitive body 255Y and transferred therefrom to be superposed on the black and magenta toner images that have already been transferred on the record medium 154. Yet likewise, at the next electronic processor 251C, a cyanic toner image is transferred in a superposing manner, to obtain a full-colored color image.

Past the electronic processor 251C, the record medium 154 having a full-color superposed image thus formed thereon is peeled off from the conveyor belt 250, and fixed by a fixer 260, before discharge.

As stated in this example, by using an optical scanner 1 (1', 1") as an optical writer, aforementioned optical scan module or a small and high quality full-color image generator which has an advantage of the optical scanner is provided.

A third example of the fourth embodiment will be explained here.

This example relates to a full-color image generator of an intermediate transfer system using an optical scanner 1 (1', 1") described, such as in FIG. 12, FIG. 14, or FIG. 15.

Figure 24:
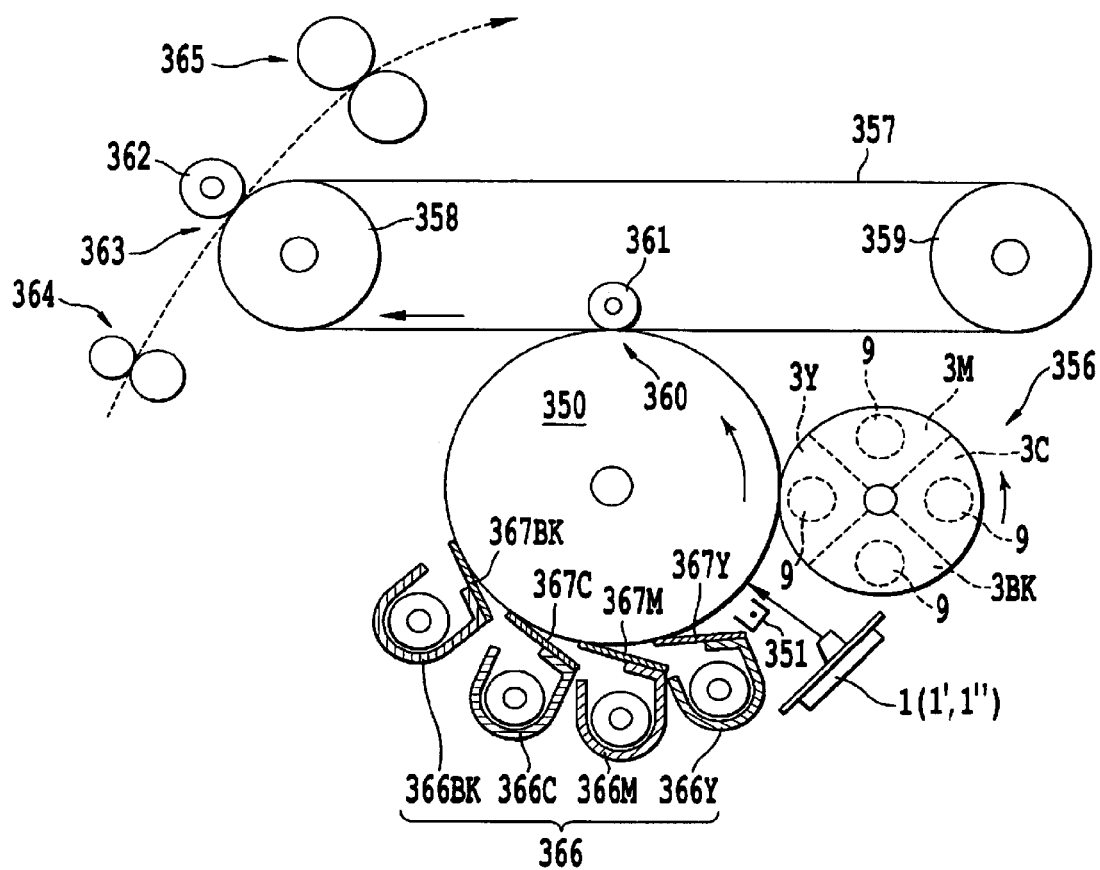
FIG. 24 is an illustration of arrangement of an image generator.

In FIG. 24, designated by reference character 350 is a drum-shaped photo-sensitive body as an example of a latent image carrier that has a peripheral surface constituting the surface 105 to be scanned in FIG. 12, FIG. 14, FIG. 15, etc. Around the photo-sensitive body 350, there are disposed, like a system employed in a well-known color image generator, a charger 351, the optical scanner 1 (1', 1") as an optical writing unit, a developer 356, an intermediate transfer belt 357, a cleaning unit 366, etc.

The intermediate transfer belt 357 is configured to be supported by pulleys 358 and 359 so as to move at the same speed and in the same direction as the photo-sensitive body 350, in opposition at a close distance thereto, that is, at an intermediate transfer part 360, it opposes the photo-sensitive body 350, in a close position thereto, and when in a process for a toner image on the photo-sensitive body 350 to be transferred, a transfer roller 361 for application of a transfer bias is moved, whereby the intermediate transfer belt 357 is brought into contact with the photo-sensitive body 350. In this contact condition, the transfer bias is applied to the transfer roller 361, and the toner image on the photo-sensitive body 350 is transferred onto the intermediate transfer belt 357.

As to generation of a full-color image, a general process for the color electronic photography applies. That is, the photo-sensitive body 350 is charged by the charger 351, and in case a latent image is formed for yellow for example, the latent image is made visible by a yellow toner developing device as a developer apparatus constituting the developer 356, and then this image is transferred onto the intermediate transfer belt 357. After the transfer, remaining yellow toner on the photo-sensitive body 350 is subject to a cleaning of a yellow-oriented cleaner 366Y in the cleaning unit 366.

Then, the photo-sensitive body 350 has a latent image likewise formed thereon for magenta, which latent image is made visible by a magenta toner developing device as a developer apparatus constituting the developer 356, and then this magenta toner image is transferred to be superposed onto the yellow image that has already been formed on the intermediate transfer belt 357.

Like this, a toner image of a respective color of yellow, magenta, cynic, and black is formed one after one on the photo-sensitive body 350, and transferred from time to time onto the intermediate transfer belt 357, thereby forming a full-colored superposition of toner images on the intermediate transfer belt 357. This full-color toner image is transferred together onto a record medium.

The intermediate transfer belt 357 is configured to be supported by the pulleys 358 and 359 so as to move at the same speed and in the same direction as the photo-sensitive body 350, in opposition at a close distance thereto, so that at the intermediate transfer part 360, it opposes the photo-sensitive body 350, in a close position thereto, as described. The intermediate transfer belt 357 is adapted, when in the process for a toner image on the photo-sensitive body 350 to be transferred, to be brought into contact with the photo-sensitive body 350a by movement of the transfer roller 361 for application of a transfer bias. In this contact condition, the transfer bias is applied to the transfer roller 361, and the toner image on the photo-sensitive body 350 is transferred onto the intermediate transfer belt 357.

The toner image transferred onto the intermediate transfer belt 357 is transferred therefrom onto an unshown record medium that is fed via register rollers 364 along broken line, at a secondary transfer part 363 provided with a secondary transfer roller 362, which rotates in opposition to the pulley 358 supporting the intermediate transfer belt 357, with the intermediate transfer belt 357 in between, in a pressingly contacting manner. The record medium with the transferred toner image thereon passes a fixer 365, where the toner image is fixed, to be discharged onto an unshown sheet discharge tray.

The developer 356 is a so-called revolver type. As its principal component, there is provided a drum-shaped developer, which is partitioned into four radiate chambers about an axis of rotation, to thereby constitute four developing devices 3Y, 3M, 3C, and 3BK.

There is accommodated combination of carrier and yellow toner in the developing device 3Y, carrier and magenta toner in the developing device 3M, carrier and cyanic toner in the developing device 3C, and carrier and black toner in the developing device 3BK.

These developing devices have their respective axial slits formed in the peripheral part, which rotate in accordance with a color image forming process, so that the slits are brought one after one in a position opposing the photo-sensitive body 350, where it temporarily stops, and during this stopping interval, among developing path rollers 9 provided in opposition to the slits in the developing devices 3Y, 3M, 3C, and 3BK, respectively, a corresponding one is rotated, to thereby make a latent image on the photo-sensitive body 350 visible with a toner of a corresponding color.

On the other hand, after a development process, remaining toner on the photo-sensitive body 350 is carried, as the photo-sensitive body 350 rotates, to a position of the cleaning unit 366, where it is removed by a cleaner disposed there in correspondence to the toner color. For example, in the case the development is made by the yellow developing device 3Y, the remaining toner is subjected to a cleaning by a yellow cleaner 366Y, as described.

The cleaner 366Y is provided with a blade 367Y. At a timing the remaining yellow toner arrives, the blade 367Y, which has been spaced off from the photo-sensitive body 350 till then, is brought into contact thereon, to make the cleaning of the remaining toner.

Likewise, there is provided a cleaner 366M in correspondence to the magenta developing device 3M, a cleaner 366C in correspondence to the cyanic developing device 3C, and a cleaner 366BK in correspondence to the black developing device 3BK. These cleaners 366M, 366C, and 366BK also have their blades 367M, 367C, and 367BK, which are each respectively adapted to be brought into contact with the photo-sensitive body 350, for a necessary interval of time for cleaning to clean the photo-sensitive body of remaining toner thereon.

Like this example, by using the optical scanner 1 (1', 1") as an optical writing unit, it is possible to provide a full-color image generator that is compact in size, high of image quality, and has advantages of the optical scanner, as well as of the optical scan modules described.

The optical scanner 1 (1', 1") has applications such as to various printers, copiers, and facsimiles, besides various image generators described.

The fifth embodiment will be explained now. This embodiment is principally addressed to the image reader according to this invention.

The fifth embodiment relates to an image reader using an optical scanner 1 (1', 1") described, such as in FIG. 12, FIG. 14, or FIG. 15.

Figure 25:
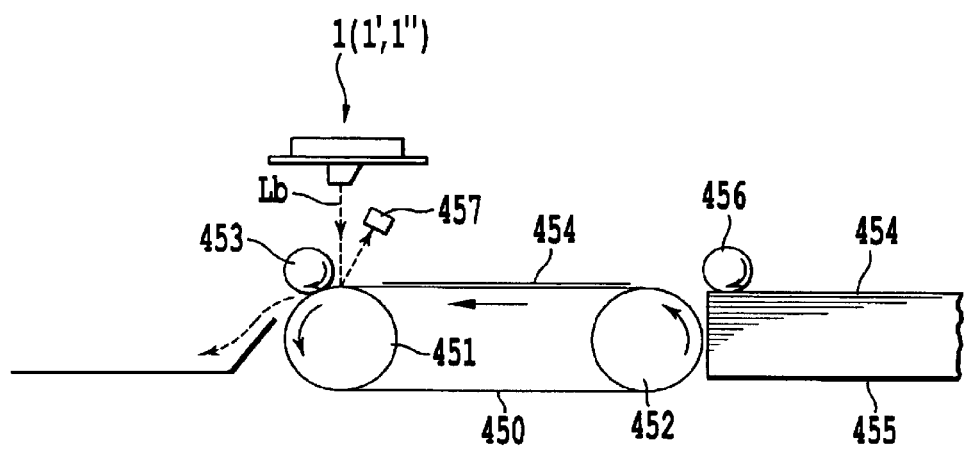
FIG. 25 is an illustration of arrangement of an image reader.

In FIG. 25, designated by the reference character 540 is a conveyor belt supported for rotation between support rollers 451 and 452. At an upstream position of the conveyor belt 450, there is provided a tray 455 as a placement unit for placement of a text 454 to be read, as it is separable sheet by sheet to be fed by a feed roller 456 onto the conveyor belt 450.

The support roller 451 has a text feed roller 453 brought into pressing contact thereon to be thereby driven to rotate. At a position just upstream the text feed roller 453, there is disposed the optical scanner 1 (1', 1") as an optical scan unit for radiating a light beam Lb onto a reading text 454, as it is conveyed there by the conveyor belt 450. When the reading text 454 is irradiated by a light beam Lb from the optical scanner 1 (1', 1"), a reflected beam passes a position for reception, where an image pick-up element 457 is disposed.

The conveyor belt 450 serves as the placement unit for placement of a text to be read, and concurrently as a conveying unit for a reading text 454, which receives irradiation of a light beam Lb from the optical scanner 1 (1', 1") during a feed by the conveyor belt 450, to be read by the image pick-up element 457. After the reading, the read text 454 is sent on a tray 458.

Like this example, by using the optical scanner 1 (1', 1"), it is possible to provide an image reader that is compact in size, high of image quality, and has advantages of the optical scanner, as well as of the optical scan modules described.

The sixth embodiment will be explained now.

Figure 26:
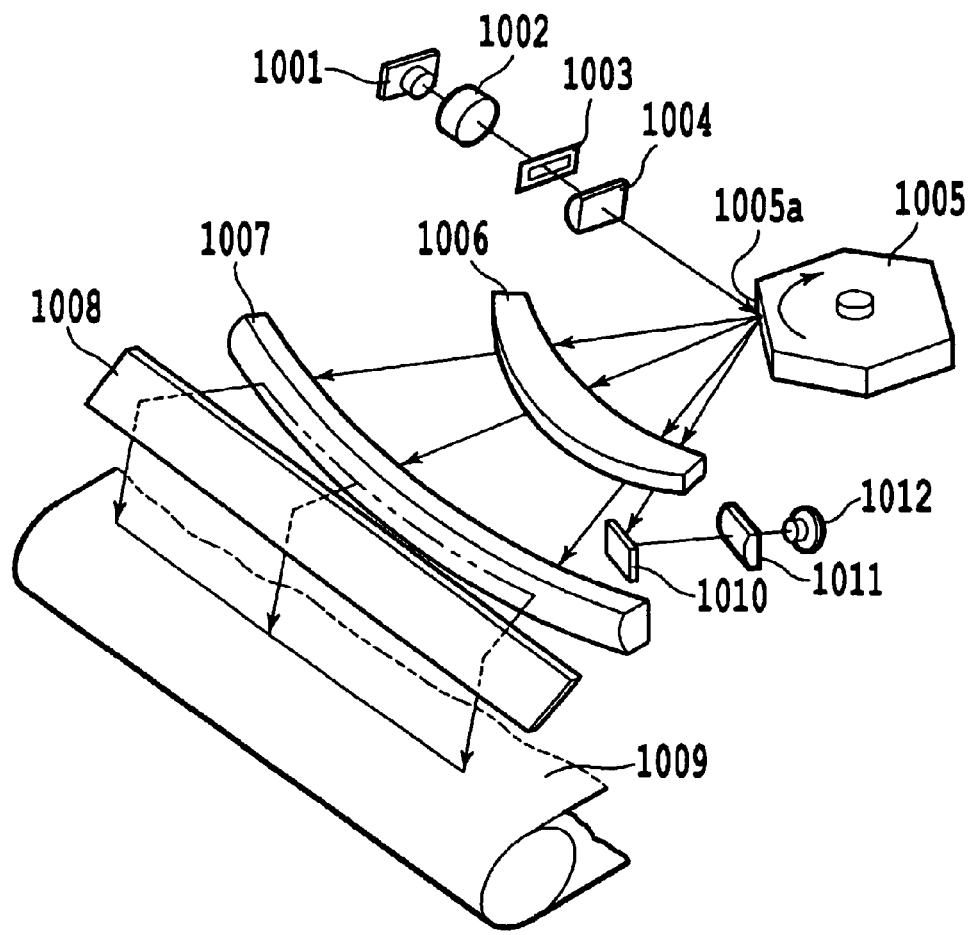
FIG. 26 is a perspective view of a basic arrangement of a scanning optical system of an optical scanner according to a sixth embodiment of this invention.
Figure 27:
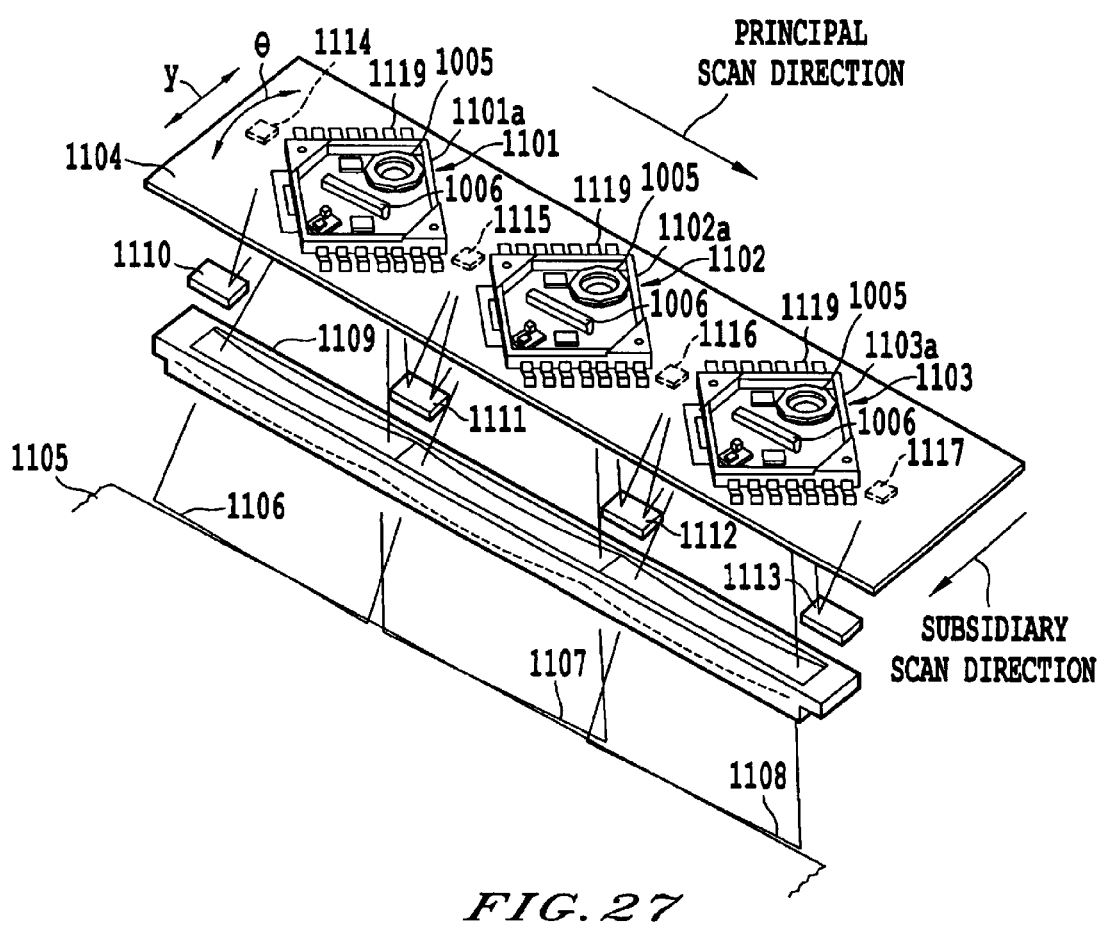
FIG. 27 is a perspective view of the optical scanner of the sixth embodiment having a plurality of uncapped optical scan modules.

FIG. 26 is a perspective view of a basic arrangement of a scanning optical system constituting an optical scanner according to the sixth embodiment. FIG. 27 is a perspective view of a plurality of uncapped optical scan modules of an optical scanner according to the sixth embodiment. As shown in FIG. 26, the scanning optical system according to this embodiment has a light source 1001, a coupling lens 1002, an iris member 1003, a linear image focusing optical system 1004, a deflector 1005, an fθ lens 1006, an elongate lens 1007, and a mirror 1008. The light source 1001 radiates divergent flux of light. A beam of light projected from the light source 1001 has substantially parallel flux of light past transmission through the coupling lens 1002, which flux of light is restricted in diameter by the iris member 1003. A light beam transmitted through their is member 1003 is focused by the linear image focusing optical system 1004 having a refractive power in a subsidiary scan direction, as a linear image elongate in a principal scan direction in a vicinity of a deflecting reflective surface 1005a of the deflector 1005. At the deflector 1005, an incident light beam from the linear image focusing optical system 1004 is deflected in an angular velocity equalizing manner. A light beam from the deflector 1005 is focused by combination of the fθ lens 1006, elongate lens 1007, and mirror 1008, on a medium 1009 to be scanned. As the deflector 1005 rotates, a light beam is scanned in the principal scan direction on the scanned medium 1009. The light beam projected from the light source 1001 may have converged flux or divergent flux of light, past the transmission through the coupling lens 1002.

The scanning optical system as an optical scanner has a mirror 1010, a focusing element 1011, and a synchronism sensor 1012. At the mirror 1010, a light beam from the deflector 1004 is reflected to strike on the focusing element 1011. The focusing element 1011 guides a light beam striking thereon toward the synchronism sensor 1012. This combination of mirror 1010, focusing element 1011, and synchronism sensor 1012 is for synchronization of a timing of scan relative to other scanning optical systems.

Next, the optical scanner according to the sixth embodiment is described with reference to FIG. 27. As shown in FIG. 27, the optical scanner has a circuit substrate 1104, and a plurality of optical scan modules (optical scan units) 1101, 1102, and 1103 arrayed on the circuit substrate 1104 with a predetermined spacing in a principal scan direction. The optical scan modules 1101, 1102, and 1103 have their ceramic or epoxy resin make holding frames (packages) 1101a, 1102a, and 1103a, and each holding frame 1101a, 1102a, or 1103a respectively has accommodated therein, as in FIG. 26, a combination of a light source 1001, a coupling lens 1002, an iris member 1003, a linear image focusing optical system 1004, a deflector 1005, an fθ lens 1006, and a mirror 1008 (simply the deflector 1005 and the fθ lens 1006 being depicted in FIG. 27). Outside the circuit substrate 1104, at a predetermined distance from the substrate 1104, there is disposed an elongate lens 1109. The elongate lens 1109 corresponds to the elongate lens 1007 of FIG. 26. The light source 1001 is comprised of a laser diode. The deflector 1005 is constituted with a polygon mirror.

The holding frames 1101a, 1102a, and 1103a accommodate various circuits. At side edges of the holding frames 1101a to 1103a are provided pluralities of lead terminals 1119. A drive circuit (not shown) for the light sources 1001 and a drive circuit (not shown) for the deflectors 1005 are connected by lead terminals 1119 to the respective circuits in the holding frames 1101a to 1103a. The holding frames 1101a to 1103a of the optical scan modules 1101 to 1103 are fixed to the circuit substrate 1104 by soldering the lead terminals 1119 to the above-noted circuits formed on the circuit substrate 1104. The fixing of the holding frames 1101a to 1103a to the circuit substrate 1104 is done, under concurrent checks for respective inclinations, as well as positions in the subsidiary scan direction, of scan lines 1106, 1107, and 1108 of the optical scan modules 1101, 1102, and 1103, on surfaces 105 to be scanned, such as a surface of a photo-sensitive body, by determining positions of back sides of the holding frames 1101a to 1103a along an upside of the circuit substrate 104, in an θ direction and a y direction, so that the scan lines 1106, 1107, and 1108 are aligned to a single straight line.

It should be noted that, in this sixth embodiment, the optical scan modules 1101 to 1103 are disposed on the single circuit substrate 1104, whereas the optical scan modules 1101 to 1103 may be disposed on an identical flat plane of a substrate having no circuits. Each of the optical scan modules 1101 to 1103 has a record width of approx. 80 mm for example, and assuming the sixth embodiment as an application to an A4 width, the optical scan modules 1101 to 1103 are provided three. Like this, in this sixth embodiment, a single line is divided into a plurality to be scanned in the principal scan direction. However, they may not be necessarily aligned to the same single straight line, and may be overlapped by way a timing-controlled scan of jumped lines.

Light beams projected from the optical scan modules 1101 to 1103 are spot-like focused on a scanned surface 1105 by the elongate lens 1109 as a set of toroidal lens faces configured to effect flux collection in the subsidiary scan direction and continuously molded in the principal scan direction. Respective scan regions are scanned so as to have some overlaps, and outside the scan regions, light beams are reflected by mirrors 1110, 1111, 1112, and 1113. At both ends of scan direction of the optical scan modules 1101 to 1103, there are disposed synchronism sensors 1114, 1115, 1116, and 1117. The synchronism sensors 1114, 1115, 1116, and 1117 are arranged so as to detect light beams at scan start ends and scan finish ends of the scan regions of the optical scan modules 1101 to 1103. Although two synchronism sensors may be provided for each of the optical scan modules 1101 to 1103, the depicted embodiment has an arrangement in which the synchronism sensor 1115 or 1116 for a scan start end and the synchronism sensor 1115 or 1116 for a scan finish end are common between the neighboring optical scan modules 1101 and 1102, or 1102 and 1103, respectively. In this sixth embodiment, the mirrors 1110, 1111, 1112, and 1113 are disposed just in front of the elongate lens 1109 to thereby restrict the scan regions, preventing an invasion of light beam to a neighboring lens face of the elongate lens 1109.

Figure 28:
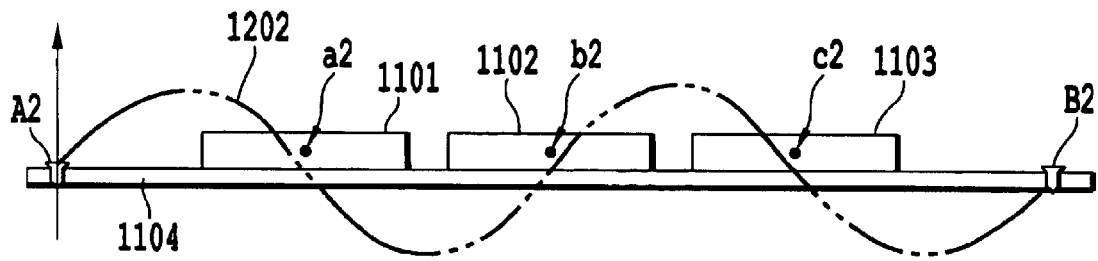
FIG. 28 is a schematic side view of the optical scanner of the sixth embodiment having three optical scan modules disposed on a circuit substrate.

FIG. 28 is a schematic side view of an optical scanner having three optical scan modules arrayed in a principal scan direction on a circuit substrate. As shown in FIG. 28, the circuit substrate 1104 is fastened at a part A2 and at a part B2 to given support members. Deflectors 1005 are disposed at specified parts a2, b2, and c2 in the optical scan modules 1101 to 1103, respectively. In a case in which the circuit substrate 1104 supporting the optical scan modules 1101 to 1103 has a vibration mode between the parts A2 and B2 as fulcrums as illustrated by a curve 1202, when the circuit substrate 1104 vibrates, the deflectors 1005 positioned at the parts a2, b2, and c2 in the optical scan modules 1101 to 1103 are located at positions that constitute nodes of the vibration. In this case, because the deflectors 1005 are disposed at positions constituting nodes of a vibration of the circuit substrate 1104, they hardly receive effects of vibration of the circuit substrate 1104.

Figure 29:
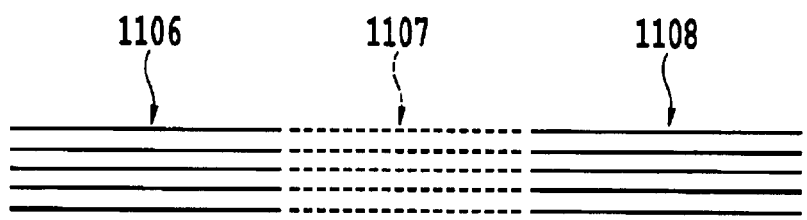
FIG. 29 is an illustration of modeled traces of scan lines on a surface scanned by the optical scan modules of FIG. 28.

FIG. 29 is a diagram illustrating modeled loci of scan lines on a scanned surface by the optical scan modules of FIG. 28. As illustrated in FIG. 29, the scan lines 1106, 1107, and 1108 on the scanned surface 1105 by the optical scan modules 1101 to 1103 are substantially free from effects of vibration of the circuit substrate 1104. It should be noted that the optical scan modules 1101 to 1103 may have deflectors 1005 disposed in vicinities of nodes of a vibration when the circuit substrate 1104 vibrates, or may have deflectors 1005 disposed at positions spaced at predetermined distances from lobes of a vibration when the circuit substrate 1104 vibrates. In this case, the deflectors 1005 receive little effects of vibration of the circuit substrate 1104. Further, the plurality of optical scan modules 1101 to 1103 may be mutually asymmetrically arrayed on the circuit substrate 1104. For example, neighboring two of the plurality of optical scan modules 1101 to 1103 may be rotated at 180 degrees relative to each other, for disposition. In this case also, the deflectors 1005 are spaced at predetermined distances from lobes of a vibration when the circuit substrate 1104 vibrates, and receive little effects of vibration of the circuit substrate 1104.

Figure 30:
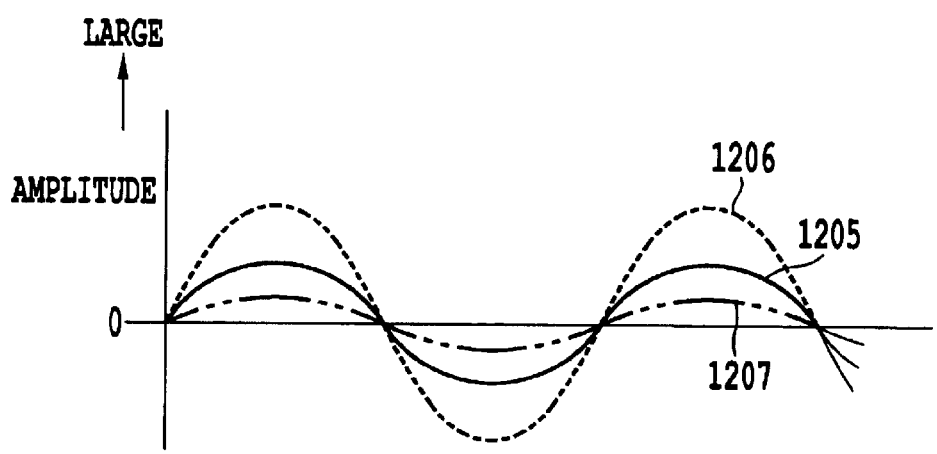
FIG. 30 is a graph describing vibrations of a body and the circuit substrate of the optical scanner of FIG. 27.

FIG. 30 is a graph showing vibrating conditions of an apparatus body and a circuit substrate. A curve 1205 illustrates a vibration mode of the body of an electronic photographic image generator. In a case in which a deflection frequency of vibration caused by a deflector 1005 in resonant with a vibration frequency of the body, the amplitude of vibration of the circuit substrate 1104 is increased, as illustrated by a curve 1206. In a case in which a deflection frequency of vibration caused by a deflector 1005 and a vibration frequency of the body cancel each other, the amplitude of vibration of the circuit substrate 1104 is decreased, as illustrated by a curve 1207.

Figure 31:
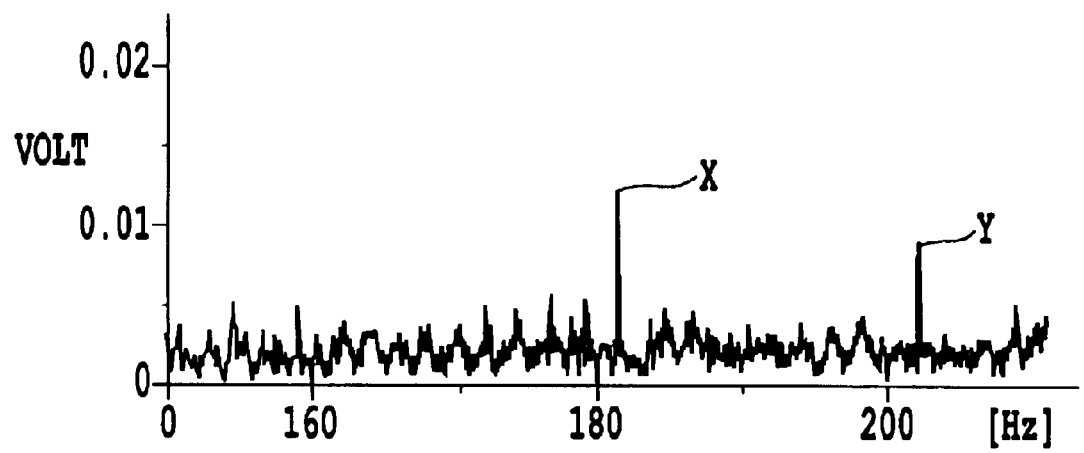
FIG. 31 is a graph describing proper vibration frequencies of a deflector and the body of the optical scanner of FIG. 27.
Figure 32:
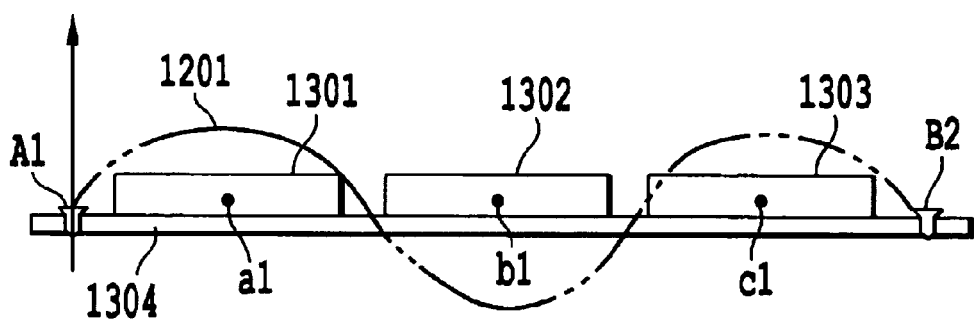
FIG. 32 is a schematic side view of a conventional optical scanner having three optical scan modules disposed on a circuit substrate.
Figure 33:
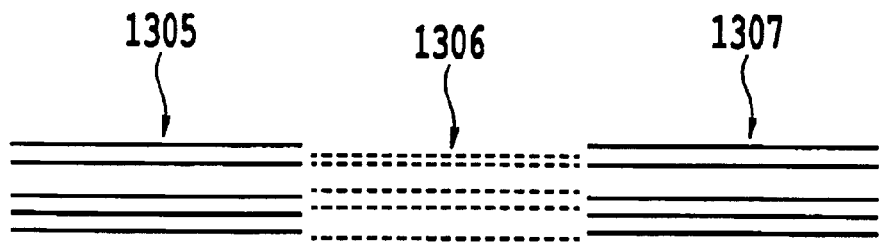
FIG. 33 is an illustration of modeled traces of scan lines on a surface scanned by the optical scan modules of the conventional optical scanner of FIG. 32.

FIG. 31 is a graph showing proper vibration frequencies of a deflector and the apparatus body. The deflector 1005 has a proper vibration frequency of a value noted by X, and the body has a proper vibration frequency of a value noted by Y. As shown in FIG. 31, it is necessary to make the proper vibration frequency of the deflector 1005 different from the proper vibration frequency of the body by a greater difference than a predetermined value.

It should be noted that, like the case of FIG. 27, by provision of a plurality of optical scan modules 1101 to 1103 arranged with a matching scan direction of scan line on an identical circuit substrate 1104, there can be achieved an integration of an elongate lens 1109, a facilitated disposition of mirrors 1110 to 1113 to be disposed between the circuit substrate 1104 and a surface 1105 to be scanned, and a common use of a mirror for detecting a scan finish end of a scan line and a scan start end of another scan line between neighboring optical scan modules 1101 and 1102 or 1102 and 1103.

The present invention is applicable not simply to a writing optical system of an electronic photographic image generator, such as of a printer, a digital copier, a digital facsimile, or a digital printer, but also to any apparatus that employs an optical scanner.

As explained in detail above, according to this invention, because terminals concurrently serve as mounting unit, and the mounting unit are constituted by use of the terminals without providing extra mounting unit, constitution of an optical scan module can be simplified by the concurrent use of components, and because necessary terminals are simply for external connections of drive circuit for light emission element, the number of terminals can be reduced to make the optical scan module compact, and it also is possible by combination of a plurality of optical scan modules to constitute a high-precision optical scanner with ease in accordance with the need, aiming at an enhanced productivity.

Furthermore, the movable portion can be tight-sealed with an enhanced security, permitting facilitated internal and external electrical connections.

Furthermore, by piling the light emission source part substrate between the electrode substrate and the sealing substrate, there can be easily secured a precision of disposition of a light emission source and a deflection unit, permitting the fabrication process to be simplified, with an enhanced production efficiency.

Furthermore, by piling the light emission source part substrate on the electrode substrate, a light emission source and a deflection unit can be disposed in a vertically piled relationship to make the apparatus size compact, and further the light emission source and a movable portion of the deflection unit can be enclosed to be tight-sealed with an enhanced security, while permitting facilitated internal and external electrical connections.

Furthermore, when a light emission source and a deflection unit are disposed in a vertically piled relationship, the transmission of a light beam can be set simply by a layered piling, without troublesome positioning, thus permitting the fabrication process to be simplified, with an enhanced production efficiency.

Furthermore, because a light beam projected from a deflection unit can be projected in a particular direction, it is allowed, when soldering the optical scan module for fixation to an application surface, to adjust scan line inclinations and scan positions on a scanned surface with ease by adjusting the application angle and position on the application surface, with eliminated needs such as screw fastening, thus permitting a simplified fabrication process with an enhanced production efficiency.

Furthermore, because a frame for accommodating a movable portion of a deflection unit is disposed in a piled relationship between the electrode substrate and the sealing substrate, and a second reflection unit is integrally formed with the frame, there can be secured a precision of the direction of projection simply by a layered piling, without troublesome positioning, thus permitting the fabrication process to be simplified, with an enhanced production efficiency.

Furthermore, a second reflective surface and a focusing unit are integrally constituted, whereby the constitution of a focus system is simplified, in addition to that because of an integral prefabrication the precision of optical disposition can also be enhanced in comparison with an individual positioning for application.

Furthermore, because a scan lens for focusing, on a scanned surface, a light beam deflection-scanned by a deflection unit is provided in part on the sealing substrate, there can be secured a precision of disposition of the scan lens, a light source, and the deflection unit simply a layered piling, without troublesome positioning, thus permitting the fabrication process to be simplified, with an enhanced production efficiency.

Furthermore, the scan lens is integrally constituted in part with a focusing unit, whereby the constitution of a focus system is simplified, in addition to that because of an integral prefabrication the precision of optical disposition can also be enhanced in comparison with an individual positioning for application.

Furthermore, because heat of a light emission source great of heat generation can be radiated by a heat radiation plate, an accommodation space on the holder can be made small, and because the heat radiation plate can be formed as part of a lead frame, it is possible to provide an optical scan module compact in size and good at productivity.

Furthermore, for external electrical connection of an optical scan module having existing wiring between a light emission source and a drive circuit for the light emission source, simply an external connection for the drive circuit can do well, permitting the number of terminals to be reduced to render the optical scan module compact in size, allowing for an enhanced productivity to be achieved.

Furthermore, identical optical scan modules can be mass-produced for preparation to allow for an adequate number thereof to be combined, thereby permitting an optical scanner to be implemented with ease for adaptation to a scan of a voluntary standard size.

Furthermore, identical optical scan modules can be combined for disposition on the same circuit substrate, thereby permitting an optical scanner to be implemented with ease for adaptation to a scan of a voluntary standard size.

Furthermore, respective optical scan modules can be arrayed on the same circuit substrate, with a matching scan direction, and further in a process of adjusting their relative inclinations on the circuit substrate, scan line inclinations between a plurality of optical scan modules can be corrected with ease and sure, permitting their fixation under best adjustment, so that it is possible to provide an optical scanner with image quality repressed against degrading at joints, allowing image generation with high quality.

Furthermore, respective optical scan modules can be arrayed on the same circuit substrate, with a matching scan direction, and further in a process of adjusting their relative positions in a subsidiary scan direction on the circuit substrate, scan positions between a plurality of optical scan modules can be corrected with ease and sure, permitting their fixation under best adjustment, so that it is possible to provide an optical scanner with image quality repressed against degrading at joints, allowing image generation with high quality.

Furthermore, by use of photo detection unit, scan time variations therebetween can be fed back to optical scan modules to thereby control record widths, so that it is possible to provide an optical scanner with image quality repressed in a principal scan direction also against degrading at joints, allowing image generation with high quality.

Furthermore, by measuring a variation of occurrence timing between a photo detection signal of a light beam at a scan finish end of a respective optical scan module and a detection signal at a scan start end of a neighboring optical scan module on the side of the scan finish end, the image record width can be corrected, under conditions to be sufficient with a short distance and a minimum measurement time, allowing a counter resolution to be enhanced, so that it is possible to provide an optical scanner with image quality repressed against degrading at joints, allowing image generation with high quality.

Furthermore, focus elements are continuously and integrally formed in an array direction of optical scan modules, whereby between focus lines of respective focus elements the precision of disposition can be maintained, so that it is possible to provide an optical scanner with image quality repressed against degrading at joints, allowing image generation with high quality.

Furthermore, even when a close distance is set between a record finish end position at a neighboring optical scan module and a neighboring record start position, the invasion of light beam to a neighboring focus element can be prevented, so that by use of continuously and integrally formed focus elements it is possible to provide an optical scanner with image quality repressed against degrading at joints of lines, allowing image generation with high quality.

Furthermore, because the scan width restriction unit has a reflection function, a reflected light beam can be detected by the photo detection unit, of which a result can be based on to render close distances between a record finish end position and a scan finish end detection position and between a record start position and a scan start end detection position, for reducing the difference between a record width and a scan width to predict an accurate variation of the record width, so that it is possible to provide an optical scanner with image quality repressed against degrading at a joint of neighboring lines, allowing image generation with high quality.

Furthermore, because partial image data corresponding to respective optical scan modules can be written out in order of the array, to be processed line by line, irrespective of dividing positions, it is ensured to suppress positional deviations in a subsidiary scan direction within one line, allowing pulse widths of joints as well as dot numbers to be increased or decreased every line to thereby render the joints inconspicuous, so that it is possible to provide an optical scanner adapted for high-grade image generation.

Furthermore, because an image recording is performed in order of array of respective optical scan modules, it is possible to provide an optical scanner adapted for generation of high-grade image with inconspicuous positional deviations in a subsidiary scan direction.

Furthermore, because synchronism detection signals of respective optical scan modules are ensured to occur in order of the array, it is possible to provide an optical scanner adapted for generation of high-grade image with inconspicuous positional deviations in a subsidiary scan direction.

Furthermore, synchronism detection signals of respective optical scan modules are ensured to occur in order of the array, so that it is possible to provide an optical scanner adapted for generation of high-grade image with inconspicuous positional deviations in a subsidiary scan direction.

Furthermore, a plurality of optical scan modules and optical detection unit for detecting synchronism detection signals are integrally held on an identical substrate, whereby even in a case of replacement of an optical scanner, it is unnecessary to re-adjust relationships between the optical scan modules, allowing the relationships to be maintained with the time, so that it is possible to provide an optical scanner adapted for generation of high-grade image with inconspicuous positional deviations in a subsidiary scan direction.

Furthermore, since deflectors are disposed at locations spaced at predetermined distances from positions constituting lobes of a vibration when a substrate vibrates, the deflectors receive little effects of vibration of the substrate, allowing a banding to be reduced, permitting a plurality of optical scan modules to have reduced deviations at joints of their scan lines in a subsidiary scan direction, so that it is possible to prevent image deterioration.

Furthermore, since deflectors are disposed at or in vicinities of positions constituting nodes of a vibration when a substrate vibrates, the deflectors hardly receive effects of vibration of the substrate, allowing a banding to be reduced, permitting a plurality of optical scan modules to have reduced deviations at joints of their scan lines in a subsidiary scan direction, so that it is possible to prevent image deterioration.

Furthermore, since optical scan modules are mutually asymmetrically arrayed on a substrate, deflectors receive little effects of vibration of the substrate, allowing a banding to be reduced, permitting a plurality of optical scan modules to have reduced deviations at joints of their scan lines in a subsidiary scan direction, so that it is possible to prevent image deterioration.

Furthermore, since optical scan modules are arrayed on an identical substrate with a matching scan direction, deflectors hardly receive effects of vibration of the substrate, allowing a banding to be reduced, permitting a plurality of optical scan modules to have reduced deviations at joints of their scan lines in a subsidiary scan direction, so that it is possible to prevent image deterioration and to facilitate disposition of an optical system.

Furthermore, it is possible by correction of a record width to control a record finish end position and a neighboring scan start position to be free of deviation, for a match to be always kept at a joint between scan lines of neighboring optical scan modules.

Furthermore, it is possible to provide an image generator configured in compact with advantages of optical scan modules as well as of an optical scanner, and adapted for high image quality.

Furthermore, it is possible to provide an image reader configured in compact with advantages of optical scan modules as well as of an optical scanner, and adapted for high image quality.

The present document incorporates by reference the entire contents of Japanese priority documents, 2000-019371 filed in Japan on Jan. 27, 2000, and 2000-041130 filed in Japan on Feb. 18, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical scan module configured to be a single integral solid body, the optical scan module comprising:
a holder configured to hold a light emission source, a deflection unit, and terminals connected to a drive circuit for the light emission source or to a drive circuit for the deflection unit, wherein the holder is further configured with an exterior facing abutment portion configured to be brought into abutment with an exterior mounting member outside of the optical scan module, and wherein the terminals are configured to fix the holder to the exterior mounting member.

2. The optical scan module according to claim 1, wherein the optical scan module further comprises a frame having a heat radiation plate projecting outside an outline of the holder, and the light emission source is joined to the heat radiation plate.

3. The optical scan module according to claim 1, wherein the holder is applied with at least one of the light emission source and the drive circuit for the light emission source.

4. The optical scan module according to claim 1, wherein a focus unit and the holder are integrally provided, and scanning is allowed with a width corresponding to 1/k, k is a positive integer, of a paper sheet width of a standard size.

5. An optical scan module comprising a light emission source and a deflection unit configured to deflect a light beam from the light emission source to repeat scanning,
wherein the optical scan module further includes a holder provided with electrodes configured to provide electrical wiring to the light emission source and the deflection unit and configured to hold a movable portion of the deflection unit and a sealing substrate provided together with the holder in a stacked relationship configured to envelop and seal the light emission source and the movable portion of the deflection therebetween.

6. The optical scan module according to claim 5, wherein a light source portion substrate configured to hold at least the light emission source and a monitor unit configured to detect a light quantity of light beam from the light emission source, the light source portion substrate also being configured to be between the holder and the sealing substrate.

7. The optical scan module according to claim 5, wherein a frame substrate integrally formed with a first reflection unit configured to conduct a light beam from the light emission source to the deflection unit is configured to be provided between the electrode substrate and the sealing substrate.

8. The optical scan module according to claim 5, further comprising a second reflection unit configured to project a light beam deflection-scanned by the deflection unit in a direction non-parallel to a lamination surface.

9. The optical scan module according to claim 8, wherein a frame substrate configured to envelop the movable portion of the deflection unit is to be provided between the holder and the sealing substrate, and the second reflection unit is integrally formed on the frame substrate.

10. The optical scan module according to claim 8, wherein the sealing substrate is configured to envelop the movable portion of the deflection unit, and the second reflection unit is integrally provided with a focus unit disposed between the light emission source and the deflection unit.

11. The optical scan module according to claim 8, wherein a scan lens configured to focus the light beam deflection-scanned by the deflection unit onto a scanned surface is provided in part on the holder or the sealing substrate.

12. The optical scan module according to claim 11, wherein the scan lens is integrally provided in part with a focus unit disposed between the light emission source and the deflection unit.

13. The optical scan module according to claim 5, wherein the optical scan module further comprises a frame having a heat radiation plate projecting outside an outline of the holder, and the light emission source is joined to the heat radiation plate.

14. The optical scan module according to claim 5, wherein the holder is configured to hold at least one of the light emission source and the drive circuit for the light emission source.

15. The optical scan module according to claim 5, wherein a focus unit and the holder are integrally provided, and the scanning is allowed with a width corresponding to 1/k, k is a positive integer, of a paper sheet width of a standard size.

16. An optical scan module comprising a light emission source and a deflection unit configured to deflect a light beam from the light emission source to repeat scanning,
wherein, the optical scan module further includes an electrode substrate configured to provide support for electrodes connected to the light emission source and the deflection unit and to support a bearing of the deflection unit, a light source portion substrate configured to support the light emission source and a monitor unit configured to detect a light quantity of light beam from the light emission source, and a deflection portion substrate configured to hold a movable portion of the deflection unit, the electrode substrate, the light source portion substrate and the deflection portion substrate being stacked together and sealed with a sealing substrate, whereby at least the light emission source and the movable portion of the deflection unit are enveloped and tight-closed.

17. The optical scan module according to claim 16, wherein a frame substrate integrally formed with a first reflection unit configured to conduct a light beam from the light emission source to the deflection unit is provided between the electrode substrate and the sealing substrate.

18. The optical scan module according to claim 16, further comprising a second reflection unit configured to project a light beam deflection-scanned by the deflection unit in a direction non-parallel to a lamination surface.

19. The optical scan module according to claim 18, wherein a frame substrate configured to envelop the movable portion of the deflection unit is provided between the electrode substrate and the sealing substrate, and the second reflection unit is integrally formed on the frame substrate.

20. The optical scan module according to claim 18, wherein the sealing substrate is configured to envelop the movable portion of the deflection unit, and the second reflection unit is integrally provided with a focus unit disposed between the light emission source and the deflection unit.

21. The optical scan module according to claim 18, wherein a scan lens configured to focus the light beam deflection-scanned by the deflection unit onto a scanned surface is provided in part on the holder or the sealing substrate.

22. The optical scan module according to claim 21, wherein the scan lens is integrally provided in part with a focus unit disposed between the light emission source and the deflection unit.

23. The optical scan module according to claim 16, wherein the optical scan module further comprises a frame having a heat radiation plate projecting outside an outline of the holder, and the light emission source is joined to the heat radiation plate.

24. The optical scan module according to claim 16, wherein the electrode substrate is configured to hold at least one of the light source portion substrate or a drive circuit for the light emission source.

25. The optical scan module according to claim 16, wherein a focus unit and the electrode substrate are integrally provided so that the scanning is allowed with a width corresponding to 1/k, k is a positive integer, of a paper sheet width of a standard size.

26. An optical scanner comprising a plurality of optical scan modules fixed on an external circuit substrate,
   each optical scan module being configured as a single integral solid body including a light emission source and a deflection unit configured to deflect a light beam from the light emission source to perform repeat scanning,
   wherein each optical scan module further includes the light emission source, the deflection unit, and terminals connected to a drive circuit for the light emission source or a drive circuit for the deflection unit being integrally fixed to a holder, the holder being configured to have an exterior facing abutment portion configured to be brought into abutment with the external circuit substrate, and the terminals being configured to fix the holder to the external circuit substrate.

27. The optical scanner according to claim 26, wherein the plurality of optical scan modules are positioned on the external circuit substrate to provide respective relative inclinations of said plurality of optical scan modules in an aligned scan direction.

28. The optical scanner according to claim 27, wherein the plurality of optical scan modules are positioned on the external circuit substrate to provide respective relative positions of said plurality of scan modules adjusted in a subsidiary scan direction perpendicular to the scan direction.

29. The optical scanner according to claim 26, further comprising a photo detection unit configured to detect a scan start end and a scan finish end defined by light projected from each respective optical scan module.

30. The optical scanner according to claim 29, further comprising a measurement unit configured to measure a variation of occurrence timing between a photo detection signal of light at a scan finish end by light of the respective optical scan module and a detection signal at a scan start end by light of a neighboring optical scan module on the side of the scan finish end.

31. The optical scanner according to claim 26, wherein focus elements adapted to focus light projected from the plurality of optical scan modules onto a scanned surface at least in a subsidiary scan direction perpendicular to the scan direction are continuously and integrally provided in an array direction of the optical scan modules.

32. The optical scanner according to claim 31, wherein a scan width restriction unit configured to restrict respective scan widths by light of the plurality of optical scan modules is disposed in a light path from each optical scan module to the focus elements.

33. The optical scanner according to claim 32, wherein the scan width restriction unit comprises a plurality of reflective members, and each reflected light beam is detected by at least one of a plurality of sensors making up the photo detection unit.

34. The optical scanner according to claim 26, further comprising a plurality of buffer units configured to temporally store image data in correspondence to the plurality of optical scan modules, a switch unit configured to divide a single line of image data for allotment to each respective optical scan module to effect distribution to a corresponding buffer unit, and a count unit configured to count a number of allotted image data.

35. The optical scanner according to claim 34, wherein, for each respective optical scan module, a detection enable interval is provided every line based on a synchronism detection signal of a neighboring optical scan module on a scan start side, and a reading control of image data from the corresponding buffer unit is executed based on a detection signal detected in the detection enable interval.

36. The optical scanner according to claim 34, wherein each respective optical scan module has a phase control unit configured to control a phase of a rotation speed reference signal applied to the deflection unit, and the synchronism detection signal of the respective optical scan module is detected at least with a delay from the synchronism detection signal of a neighboring optical scan module on a scan start side.

37. The optical scanner according to claim 36, wherein the plurality of optical scan modules and the photo detection unit configured to detect the synchronism detection signal are integrally held on the external circuit substrate.

38. The optical scanner according to claim 34, wherein each respective optical scan module has a detection position control unit configured to control a principal scan position of an incident beam to the photo detection unit, and the synchronism detection signal of the respective optical scan module is detected at least with a delay from the synchronism detection signal of a neighboring optical scan module on a scan start side.

39. An optical scanner comprising a plurality of optical scan modules fixed on an external circuit substrate,
   the plurality of optical scan modules each including a light emission source and a deflection unit configured to deflect a light beam from the light emission source to repeat scanning,
   wherein each optical scan module includes a holder configured to hold a movable portion of the deflection unit and to provide electrodes for electrical wiring to the light emission source and the deflection and a sealing substrate, the holder and the sealing substrate together being configured to envelop and seal the light emission source and the movable portion of the deflection unit.

40. The optical scanner according to claim 39, wherein the plurality of optical scan modules are positioned on the external circuit substrate to provide respective relative inclinations of said plurality of optical scan modules in an aligned scan direction.

41. The optical scanner according to claim 40, wherein the plurality of optical scan modules are positioned on the external circuit substrate to provide respective relative positions of said plurality of scan modules adjusted in a subsidiary scan direction perpendicular to the scan direction.

42. The optical scanner according to claim 39, further comprising a photo detection unit configured to detect a scan start end and a scan finish end defined by light projected from each respective optical scan module.

43. The optical scanner according to claim 42, further comprising a measurement unit configured to measure a variation of occurrence timing between a photo detection signal of light at a scan finish end by light of the respective optical scan module and a detection signal at a scan start end by light of a neighboring optical scan module on the side of the scan finish end.

44. The optical scanner according to claim 39, wherein focus elements adapted to focus light projected from the plurality of optical scan modules onto a scanned surface at least in a subsidiary scan direction perpendicular to the scan direction are continuously and integrally provided in an array direction of the optical scan modules.

45. The optical scanner according to claim 44, wherein a scan width restriction unit configured to restrict respective scan widths by light of the plurality of optical scan modules is disposed in a light path from each optical scan module to the focus elements.

46. The optical scanner according to claim 45, wherein the scan width restriction unit comprises a plurality of reflective members, and each reflected light beam is detected by at least one of a plurality of sensors making up the photo detection unit.

47. The optical scanner according to claim 39, further comprising a plurality of buffer units configured to temporally store image data in correspondence to the plurality of optical scan modules, a switch unit configured to divide a single line of image data for allotment to each respective optical scan module to effect distribution to a corresponding buffer unit, and a count unit configured to count a number of allotted image data.

48. The optical scanner according to claim 47, wherein, for each respective optical scan module, a detection enable interval is provided every line based on a synchronism detection signal of a neighboring optical scan module on a scan start side, and a reading control of image data from the corresponding buffer unit is executed based on a detection signal detected in the detection enable interval.

49. The optical scanner according to claim 47, wherein each respective optical scan module has a phase control unit configured to control a phase of a rotation speed reference signal applied to the deflection unit, and the synchronism detection signal of the respective optical scan module is detected at least with a delay from the synchronism detection signal of a neighboring optical scan module on a scan start side.

50. The optical scanner according to claim 49, wherein the plurality of optical scan modules and the photo detection unit configured to detect the synchronism detection signal are integrally held on the external circuit substrate.

51. The optical scanner according to claim 47, wherein each respective optical scan module has a detection position control unit configured to control a principal scan position of an incident beam to the photo detection unit, and the synchronism detection signal of the optical scan module is detected at least with a delay from the synchronism detection signal of a neighboring optical scan module on a scan start side.

52. An optical scanner comprising a plurality of optical scan modules fixed on an external circuit substrate,
each optical scan module including a light emission source and a deflection unit configured to deflect a light beam from the light emission source to repeat scanning,
wherein, each optical scan module further includes an electrode substrate configured to provide support for electrodes connected to the light emission source and the deflection unit and to support a bearing of the deflection unit, a light source portion substrate configured to support the light emission source and a monitor unit configured to detect a light quantity of light beam from the light emission source, and a deflection portion substrate configured to hold a movable portion of the deflection unit, the electrode substrate, light source portion substrate, and the deflection portion substrate being stacked together and sealed with a sealing substrate, whereby at least the light emission source and the movable portion of the deflection unit are enveloped and tight-closed.

53. The optical scanner according to claim 52, wherein the plurality of optical scan modules are positioned on the external circuit substrate to provide respective relative inclinations of said plurality of optical scan modules in an aligned scan direction.

54. The optical scanner according to claim 53, wherein plurality of optical scan modules are positioned on the external circuit substrate to provide respective relative positions of said plurality of scan modules adjusted in a subsidiary scan direction perpendicular to the scan direction.

55. The optical scanner according to claim 52, further comprising a photo detection unit configured to detect a scan start end and a scan finish end defined by light projected from each respective optical scan module.

56. The optical scanner according to claim 55, further comprising a measurement unit configured to measure a variation of occurrence timing between a photo detection signal of light at a scan finish end by light of the respective optical scan module and a detection signal at a scan start end by light of a neighboring optical scan module on the side of the scan finish end.

57. The optical scanner according to claim 52, wherein focus elements adapted to focus light projected from the plurality of optical scan modules onto a scanned surface at least in a subsidiary scan direction perpendicular to the scan direction are continuously and integrally provided in an array direction of the optical scan modules.

58. The optical scanner according to claim 57, wherein a scan width restriction unit configured to restrict respective scan widths by light of the plurality of optical scan modules is disposed in a light path from each optical scan module to the focus elements.

59. The optical scanner according to claim 58, wherein the scan width restriction unit comprises a plurality of reflective members, and each reflected light beam is detected by at least one of a plurality of sensor making up the photo detection unit.

60. The optical scanner according to claim 52, further comprising a plurality of buffer units configured to temporally store image data in correspondence to the plurality of optical scan modules, a switch unit configured to divide a single line of image data for allotment to each respective optical scan module to effect distribution to a corresponding buffer unit, and a count unit configured to count a number of allotted image data.

61. The optical scanner according to claim 60, wherein, for each respective optical scan module, a detection enable interval is provided every line based on a synchronism detection signal of a neighboring optical scan module on a scan start side, and a reading control of image data from the corresponding buffer unit is executed based on a detection signal detected in the detection enable interval.

62. The optical scanner according to claim 60, wherein each respective optical scan module has a phase control unit configured to control a phase of a rotation speed reference signal applied to the deflection unit, and the synchronism detection signal of the respective optical scan module is detected at least with a delay from the synchronism detection signal of a neighboring optical scan module on a scan start side.

63. The optical scanner according to claim 62, wherein the plurality of optical scan modules and the photo detection unit configured to detect the synchronism detection signal are integrally held on the external circuit substrate.

64. The optical scanner according to claim 60, wherein each respective optical scan module has a detection position control unit configured to control a principal scan position of an incident beam to the photo detection unit, and the synchronism detection signal of the respective optical scan module is detected at least with a delay from the synchronism detection signal of a neighboring optical scan module on a scan start side.

65. An optical scanner in which an external substrate has arrayed thereon a plurality of optical scan modules, each optical scan module including optical systems which have a light emission source and a deflector configured to deflect a light beam from the light emission source to repeat a scanning and being configured to be accommodated in an identical holder frame, wherein the deflector is disposed at a position spaced at a predetermined distance from a position where a loop of vibration occurs when the substrate vibrates.

66. The optical scanner according to claim 65, wherein the optical scan modules are arrayed on the external substrate in an aligned light beam scan direction.

67. An optical scanner in which an external substrate has arrayed thereon a plurality of optical scan modules, each optical scan module including optical systems which have a light emission source and a deflector configured to deflect a light beam from the light emission source to repeat a scanning and the optical systems being configured to be accommodated in an identical holder frame, wherein the deflector is disposed at a position where a node of vibration occurs when the substrate vibrates, or in a vicinity of the node.

68. The optical scanner according to claim 67, wherein the optical scan modules are arrayed on the external substrate in an aligned light beam scan direction.

69. An optical scanner in which an external substrate has arrayed thereon a plurality of optical scan modules, each optical scan module including optical systems which have alight emission source and a deflector configured to deflect a light beam from the light emission source to repeat a scanning and the optical systems being configured to be accommodated in an identical holder frame, wherein the optical scan modules are arrayed on the substrate asymmetrically to each other.

70. The optical scanner according to claim 69, wherein the optical scan modules are arrayed on the external substrate in an aligned light beam scan direction.

71. An optical scan method, including providing a plurality of k, k is a positive integer, optical scan modules in a principal scan direction, correcting the scan width of a k-th optical scan module, said correcting step including combining a variation up to a scan finish end detection relative to a record finish end position by the k-th optical scan module and a variation up to a record start end position relative to a scan start end detection by a (k+1)-th optical scan module.

72. An image generator in which a latent image is formed by irradiation of light from an optical writing unit on a uniformly charged photo-sensitive body and changed to a visible image to be transferred on a record medium to have a recorded image,
wherein the optical writing unit includes an optical scanner comprising a plurality of optical scan modules fixed on an exterior member,
wherein each optical scan module is configured as a single integral solid body including a light emission source and a deflection unit configured to deflect a light beam from the light emission source to perform repeat scanning, and
wherein each optical scan module further includes the light emission source, the deflection unit, and terminals connected to a drive circuit for the light emission source or a drive circuit for the deflection unit being integrally fixed to a holder, the holder being configured to have an exterior facing abutment portion configured to be brought into abutment with the exterior member, and the terminals being configured to fix the holder to the exterior member.

73. An image generator in which a latent image is formed by irradiation of light from an optical writing unit on a uniformly charged photo-sensitive body and changed to a visible image to be transferred on a record medium to have a recorded image,
wherein the optical writing unit includes an optical scanner comprising a plurality of optical scan modules fixed on an exterior member,
wherein each optical scan module includes a light emission source and a deflection unit configured to deflect a light beam from the light emission source to repeat scanning,
wherein each optical scan module further includes a holder configured to hold a movable portion of the deflector unit and to provide electrodes for electrical wiring to the light emission source and the deflection unit and a sealing substrate, the holder and the sealing substrate together being configured to envelop and seal at least the light emission source and the movable portion of the deflection unit.

74. An image generator in which a latent image is formed by irradiation of light from an optical writing unit on a uniformly charged photo-sensitive body and changed to a visible image to be transferred on a record medium to have a recorded image,
wherein the optical writing unit includes an optical scanner comprising a plurality of optical scan modules fixed on an exterior member,
wherein each optical scan module includes a light emission source and a deflection unit configured to deflect a light beam from the light emission source to repeat scanning,
wherein, each optical scan module further includes an electrode substrate configured to provide support for electrodes connected to the light emission source and the deflection unit and to support a bearing of the deflection unit, a light source portion substrate configured to support the light emission source and a monitor unit configured to detect a light quantity of light beam from the light emission source, and a deflection portion substrate configured to hold a movable portion of the deflection unit, the electrode substrate, light source portion substrate, and the deflection portion substrate being stacked together and sealed with a sealing substrate, whereby at least the light emission source and the movable portion of the deflection unit are enveloped and tight-closed.

75. An image reader comprising a placement unit configured to place a readable text thereon, a scan unit configured to project scanning light onto the text on the placement unit, and a read unit configured to receive the light projected from the scan unit after interaction with the text on the placement unit,
wherein the scan unit is an optical scanner comprising a plurality of optical scan modules fixed on an exterior member,
wherein each optical scan module being configured as a single integral solid body including a light emission source and a deflection unit configured to deflect a light beam from the light emission source to perform repeat scanning, and
wherein each optical scan module further includes the light emission source, the deflection unit, and terminals connected to a drive circuit for the light emission source or a drive circuit for the deflection unit being integrally fixed to a holder, the holder being configured to have an exterior facing abutment portion configured to be brought into abutment with the exterior member, and the terminals being configured to fix the holder to the exterior member.

76. An image reader comprising a placement unit configured to place a readable text thereon, a scan unit configured to project scanning light onto the text on the placement unit, and a read unit configured to receive the light projected from the scan unit after interaction with the text on the placement unit, wherein the scan unit is an optical scanner comprising a plurality of optical scan modules fixed on another an exterior member, wherein each optical scan module includes a light emission source and a deflection unit which deflects a light beam from the light emission source to repeat scanning, wherein each optical scan module further includes a holder configured to hold a movable portion of the deflector unit and to provide electrodes for electrical wiring to the light emission source and the deflection unit a sealing substrate, the holder and the sealing substrate together being configured to envelop and seal relationship at least the light emission source and the movable portion of the deflection unit.

77. An image reader comprising a placement unit configured to place a readable text thereon, a scan unit configured to project scanning light onto the text on the placement unit, and a read unit configured to receive the light projected from the scan unit after interaction with the text on the placement unit, wherein the scan unit is an optical scanner comprising an a plurality of optical scan modules fixed on an exterior member, wherein each optical scan module includes a light emission source and a deflection unit configured to deflect a light beam from the light emission source to repeat scanning, wherein, each optical scan module further includes an electrode substrate configured to provide support for electrodes connected to the light emission source and the deflection unit and to support a bearing of the deflection unit, a light source portion substrate configured to support the light emission source and a monitor unit configured to detect a light quantity of light beam from the light emission source, and a deflection portion substrate configured to hold a movable portion of the deflection unit, the electrode substrate, light source portion substrate, and the deflection portion substrate being stacked together and sealed with a sealing substrate, whereby at least the light emission source and the movable portion of the deflection unit are enveloped and tight-closed.

* * * * *